(12) United States Patent
Okigawa

(10) Patent No.: US 9,538,070 B2
(45) Date of Patent: Jan. 3, 2017

(54) IMAGE PROCESSING DEVICE, IMAGING DEVICE, IMAGE PROCESSING METHOD AND COMPUTER READABLE MEDIUM

(71) Applicant: FUJIFILM Corporation, Tokyo (JP)

(72) Inventor: Mitsuru Okigawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/864,164

(22) Filed: Sep. 24, 2015

(65) Prior Publication Data

US 2016/0014329 A1 Jan. 14, 2016

Related U.S. Application Data

(63) Continuation of application No. PCT/JP2013/080323, filed on Nov. 8, 2013.

(30) Foreign Application Priority Data

Mar. 29, 2013 (JP) ................................. 2013-074386

(51) Int. Cl.
*H04N 5/232* (2006.01)
*G02B 7/36* (2006.01)
(Continued)

(52) U.S. Cl.
CPC ............ *H04N 5/23212* (2013.01); *G02B 7/36* (2013.01); *H04N 5/2351* (2013.01);
(Continued)

(58) Field of Classification Search
CPC  H04N 5/23212; H04N 5/3696; H04N 5/2351; H04N 5/23293; H04N 13/0217; G02B 7/36
See application file for complete search history.

(56) References Cited

U.S. PATENT DOCUMENTS

2005/0191047 A1* 9/2005 Toji .................... H04N 5/23212
                                                                396/111
2009/0153693 A1   6/2009 Onuki et al.
2012/0212661 A1* 8/2012 Yamaguchi ........ H04N 5/23293
                                                                348/346

FOREIGN PATENT DOCUMENTS

JP        2001-309210 A    11/2001
JP        2009-147665 A    7/2009

OTHER PUBLICATIONS

International Search Report, issued in PCT/JP2013/080323, dated Dec. 10, 2013.
(Continued)

*Primary Examiner* — Gevell Selby
(74) *Attorney, Agent, or Firm* — Birch, Stewart, Kolasch & Birch, LLP

(57) ABSTRACT

A generation section generates a first display image based on an image signal output from an image pick-up device, and a second display image based on first and second image signals output from the image pick-up device. An identification section identifies an image region in the second display image generated by the generation section satisfying both a first condition and a second condition. The image region identified by the identification section is then displayed so as to be distinguishable from other regions in the second display image. The first condition indicates a condition of the magnitude of contrast being a first specific value or greater, and the second condition indicates a degree of matching between the first image and the second image being a second specific value or greater.

18 Claims, 44 Drawing Sheets

(51) Int. Cl.
H04N 13/02 (2006.01)
H04N 5/235 (2006.01)
H04N 5/369 (2011.01)

(52) U.S. Cl.
CPC ....... *H04N 5/23293* (2013.01); *H04N 5/3696* (2013.01); *H04N 13/0217* (2013.01)

(56) References Cited

OTHER PUBLICATIONS

Written Opinion of the International Searching Authority, issued in PCT/JP2013/080323, dated Dec. 10, 2013.

* cited by examiner

FIG.21
BEFORE CORRECTION
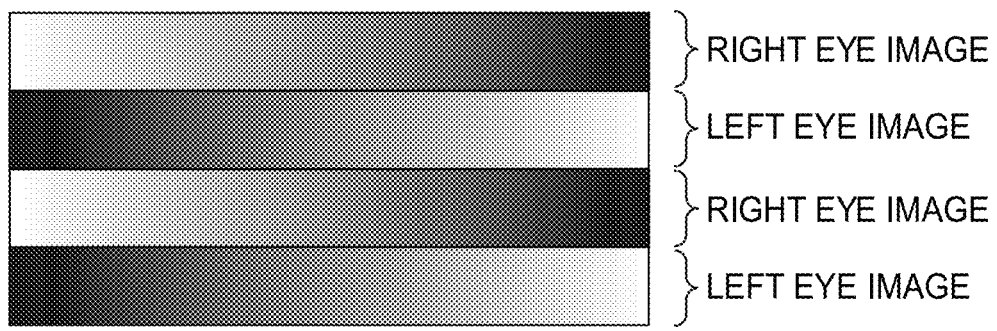
AFTER CORRECTION
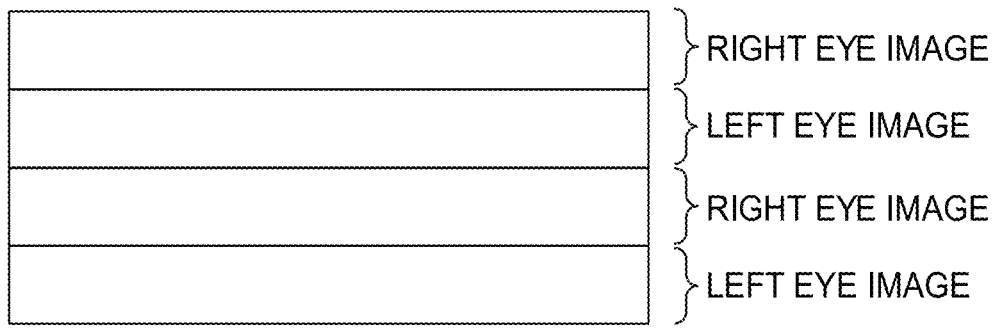

IMAGE PROCESSING DEVICE, IMAGING DEVICE, IMAGE PROCESSING METHOD AND COMPUTER READABLE MEDIUM

CROSS-REFERENCE TO RELATED APPLICATIONS

This application is a continuation application of International Application No. PCT/JP2013/080323, filed Nov. 8, 2013, the disclosure of which is incorporated herein by reference in its entirety. Further, this application claims priority from Japanese Patent Application No. 2013-074386, filed Mar. 29, 2013, the disclosure of which is incorporated herein by reference in its entirety.

TECHNICAL FIELD

The present invention relates to an image processing device, an imaging device, an image processing method and a computer readable medium.

RELATED ART

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking an imaging-subject, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging-subject easier for a user (such as a photographer) when in manual focus mode. Split-image refers to a divided image in which, for example, a display region has been divided into plural sections (such as each image divided in the up-down direction), and in which displacement is imparted in the parallax generation direction (such as the left-right direction) according to focus misalignment, and is a divided image in which the displacement in the parallax generation direction disappears in an in-focus state. The user operates a manual focus ring (hereafter referred to as a "focus ring") to match the focus so that displacement of the split-image (such as each image divided in the up-down direction) is removed.

Explanation follows regarding the principles of split images using an imaging device as described in Japanese Patent Application Laid-Open (JP-A) No. 2009-147665. Out of light rays from an imaging optical system, a first subject-image and a second subject-image formed by light rays divided by a pupil divider are photoelectrically converted to generate a first image and a second image, respectively. The first and the second images are employed to generate a split-image, and a third subject-image formed by the light rays not divided by the pupil divider is photoelectrically converted to generate a third image. The third image is then displayed on a display, and an image is configured by displaying the generated split image within the third image. Moreover, color data extracted from the third image can be applied to the split-image. By applying color data extracted is this manner from the third image to the split-image in this way, excellent visibility of the split-image can be achieved.

In addition, focus peaking is known as a technique to assist determination that an in focus state has been achieved by displaying with emphasis a region where the magnitude of contrast is a specific value of greater (see, for example, JP-A No. 2001-309219).

However, in focusing determination methods utilizing a split-image, there is a need to visually determine whether or not displacement has disappeared while visually checking continuously moving image displacement, so that time is required to perform focusing. In contrast thereto, in a focusing determination method utilizing focus peaking, determination as to whether or not there is a high contrast region (whether or not there is a region of a specific contrast or greater) can be performed in a short time compared to a focusing determination method employing a split-image. However, due to all high contrast regions being displayed with emphasis, there is a concern that a user might misdetermine a high contrast region that is in an unfocussed state as being in an in focus state.

In the light of the above circumstances, an object of the present invention is to provide an image processing device, an imaging device, an image processing method, and an image processing program capable of facilitating visual verification of whether or not an in focus state has been achieved.

SUMMARY

An image processing device of a first aspect of the present invention includes: an image pick-up device including first and second pixel groups outputting first and second image signals due to respective images being formed by a pupil-divided subject-image that has passed through first and second regions of an imaging lens; a generation section that generates a first display image based on an image signal output from the image pick-up device, and generates a second display image for use in focus verification based on the first and second image signals; an identification section that identifies an image region in the second display image satisfying both a first condition of a magnitude of contrast being a first specific value or greater, and a second condition of a degree of matching between the first image signal and the second image signal being a second specific value or greater; a display section that displays images; and a display controller that performs control to display the first display image on the display section, to display the second display image within a display region of the first display image, and to display the image region identified by the identification section so as to be distinguishable from other regions in the second display image. This thereby enables whether or not an in focus state has been achieved to be verified visually more easily than in cases lacking the present configuration.

An image processing device according to a second aspect of the present invention includes: an image pick-up device including first and second pixel groups outputting first and second image signals due to respective images being formed by a pupil-divided subject-image that has passed through first and second regions of an imaging lens; a generation section that generates a first display image based on an image signal output from the image pick-up device, and generates a second display image for use in focus verification based on the first and second image signals; an identification section that identifies an image region in the second display image satisfying both a first condition of a magnitude of contrast being a first specific value or greater, and a second condition of a degree of matching between the first image signal and the second image signal being a second specific value or greater; a display section that displays images; and a display controller that performs control to display the second display image on the display section, and to display the image region identified in the by the identification section so as to be distinguishable from other regions in the second display image. This thereby enables whether or not an in focus state has been achieved to be verified visually more easily than in cases lacking the present configuration.

A third aspect of the present invention is the first aspect or second aspect of the present invention, wherein: the image pick-up device further includes a third pixel group, on which an image of a subject-image that has passed through the imaging lens is formed without being pupil-divided, and that outputs a third image signal; and the generation section generates the first display image based on the third image signal. This thereby enables, with a simple configuration, the quality of the first display image to be raised compared to cases lacking the present configuration.

A fourth aspect of the present invention is the third aspect of the present invention wherein: the magnitude of contrast is determined based on the third image signal. This thereby enables satisfaction of the first condition between pixels to be identified with higher precision than in cases lacking the present configuration.

A fifth aspect of the present invention is the fourth aspect of the present invention, wherein: the first pixel group includes plural first pixels disposed in a pupil division direction and a direction orthogonal to the pupil division direction; the second pixel group includes plural second pixels respectively disposed in alternation with the plural first pixels in at least the pupil division direction from among the pupil division direction and the orthogonal direction; the third pixel group includes third pixels disposed in between the first pixels and the second pixels in at least the pupil division direction from among the pupil division direction and the orthogonal direction; and the magnitude of contrast is determined based on a signal level of the third pixels. This thereby enables between pixels satisfying the first condition between the first pixels and the second pixels to be identified with higher precision than in cases lacking the present configuration.

A sixth aspect of the present invention is the fifth aspect of the present invention, wherein the magnitude of contrast is determined based on an average signal level of a specific number of pixels of the third pixels in the orthogonal direction. This thereby enables between pixels satisfying of the first condition between the first pixels and the second pixels to be identified with even higher precision.

A seventh aspect of the present invention is the fourth aspect of the present invention, wherein: the first pixel group includes plural first pixels that are disposed in a pupil division direction and a direction orthogonal to the pupil division direction; the second pixel group includes plural second pixels respectively disposed in alternation with the plural first pixels in at least the pupil division direction from among the pupil division direction and the orthogonal direction; the third pixel group includes plural third pixels that are disposed between the first pixels and the second pixels in at least the pupil division direction from among the pupil division direction and the orthogonal direction; and the magnitude of contrast is determined based on a change ratio in signal level of the plural third pixels disposed between the first pixels and the second pixels in the pupil division direction. This thereby enables between pixels satisfying the first condition between the first pixels and the second pixels to be identified with higher precision than in cases lacking the present configuration.

An eighth aspect of the present invention is the seventh aspect of the present invention, wherein the magnitude of contrast is determined based on the change ratio in average signal level of a specific number of pixels in the orthogonal direction for each of the plural third pixels. This thereby enables satisfaction of the first condition between the first pixels and the second pixels to be identified between pixels with even higher precision.

A ninth aspect of the present invention is any one of the fourth aspect to the eighth aspect of the present invention, wherein the magnitude of contrast is determined based on the third image signal from pixels in the third pixel group with a signal level in a non-saturated state from out of the third image signal. This thereby enables mis-identification of an image region that can occur when the signal level of pixels included in the third pixel group are in a saturated state to be suppressed compared to cases lacking the present configuration.

A tenth aspect of the present invention is any one of the first aspect to the fourth aspect of the present invention, wherein the first pixel group includes plural first pixels disposed in a pupil division direction and a direction orthogonal to the pupil division direction, and the second pixel group includes plural second pixels that are respectively disposed adjacently in alternation with the plural first pixels in at least the pupil division direction from among the pupil division direction and the orthogonal direction. This thereby enables an image region with higher spatial frequency to be identified as an image region corresponding to between pixels satisfying both the first condition and the second condition than in cases lacking the present configuration.

An eleventh aspect of the present invention is any one of the first aspect to the tenth aspect of the present invention, further including: a correction section that derives a correction coefficient according to light reduction characteristics based on light incident through the first region of pixels in an pupil division direction of the first pixel group, and light incident through the second region of pixels in the pupil division direction of the second pixel group, and corrects the first and second image signals based on the derived correction coefficient; wherein the second condition is a condition of a degree of matching between the first image signal and the second image signal respectively corrected by the correction section being the second specific value or greater. This thereby enables mis-identification of an image region caused by light reduction characteristics based on light incident through the first and second regions of pixels in the pupil division direction in the first and second pixel groups to be suppressed compared to cases lacking the present configuration.

A twelfth aspect of the present invention is any one of the first aspect to the eleventh aspect of the present invention, wherein the identification section identifies the image region satisfying the second condition based on a separation in a pupil division direction between pixels identified respectively in the first and second image signals as having maximum values of signal level. This thereby enables an image region satisfying the second condition to be identified with higher precision than in cases lacking the present configuration.

A thirteenth aspect of the present invention is the twelfth aspect of the present invention, wherein the identification section estimates the separation based on respective derivative values of the first and second image signals, and identifies the image region satisfying the second condition based on the estimated separation. This thereby enables an image region satisfying the second condition to be identified with even higher precision.

The fourteenth aspect of the present invention is any one of the first aspect to the thirteenth aspect of the present invention, wherein at least one of the first specific value or the second specific value is determined based on an aperture value. This thereby enables at least one of the first specific value or the second specific value to be derived with higher precision that in cases lacking the present configuration.

An imaging device according to a fifteenth aspect of the present invention includes: the image processing device of any one of the first aspect to the fourteenth aspect; an image pick-up device including the first and second pixel groups; and a storage section that stores images generated based on image signals output from the image pick-up device. This thereby enables whether or not an in focus state has been achieved to be verified visually more easily than in cases lacking the present configuration.

An image processing method according to a sixteenth aspect of the present invention includes: generating a first display image based on an image signal output from an image pick-up device including first and second pixel groups outputting first and second image signals due to respective images being formed by a pupil-divided subject-image that has passed through first and second regions of an imaging lens, and generating a second display image for use in focus verification based on the first and second image signals; identifying an image region in the second display image satisfying both a first condition of a magnitude of contrast being a first specific value or greater, and a second condition of a degree of matching between the first image signal and the second image signal being a second specific value or greater; and performing control to display the first display image on a display section that displays images, to display the second display image within a display region of the first display image, and to display the image region identified by the identification section so as to be distinguishable from other regions in the second display image. This thereby enables whether or not an in focus state has been achieved to be verified visually more easily than in cases lacking the present configuration.

An image processing method according to a seventeenth aspect of the present invention includes: generating a first display image based on an image signal output from an image pick-up device including first and second pixel groups outputting first and second image signals due to respective images being formed by a pupil-divided subject-image that has passed through first and second regions of an imaging lens, and generating a second display image for use in focus verification based on the first and second image signals; identifying an image region in the second display image satisfying both a first condition of a magnitude of contrast being a first specific value or greater, and a second condition of a degree of matching between the first image signal and the second image signal being a second specific value or greater; and performing control to display the second display image on a display section that displays images, and to display the image region identified by the identification section so as to be distinguishable from other regions in the second display image. This thereby enables whether or not an in focus state has been achieved to be verified visually more easily than in cases lacking the present configuration.

An image processing program according to an eighteenth aspect of the present invention causes a computer to function as the generation section, the identification section, and the display control section of the image processing device of any one of the first aspect to the fourteenth aspect of the present invention. This thereby enables whether or not an in focus state has been achieved to be verified visually more easily than in cases lacking the present configuration.

The image processing device of the first aspect of the present invention obtains the advantageous effect of enabling whether or not an in focus state has been achieved to be verified visually more easily than in cases lacking the present configuration.

BRIEF DESCRIPTION OF THE DRAWINGS

Exemplary embodiments of the present invention will be described in detail based on the following figures, wherein:

FIG. 21 is a schematic diagram illustrating an example of the effect of light reduction characteristics on the left eye image and right eye image before and after correction;

DETAILED DESCRIPTION

Explanation follows regarding examples of exemplary embodiments of an imaging device according to the present invention, with reference to the drawings.

First Exemplary Embodiment

Figure 1:
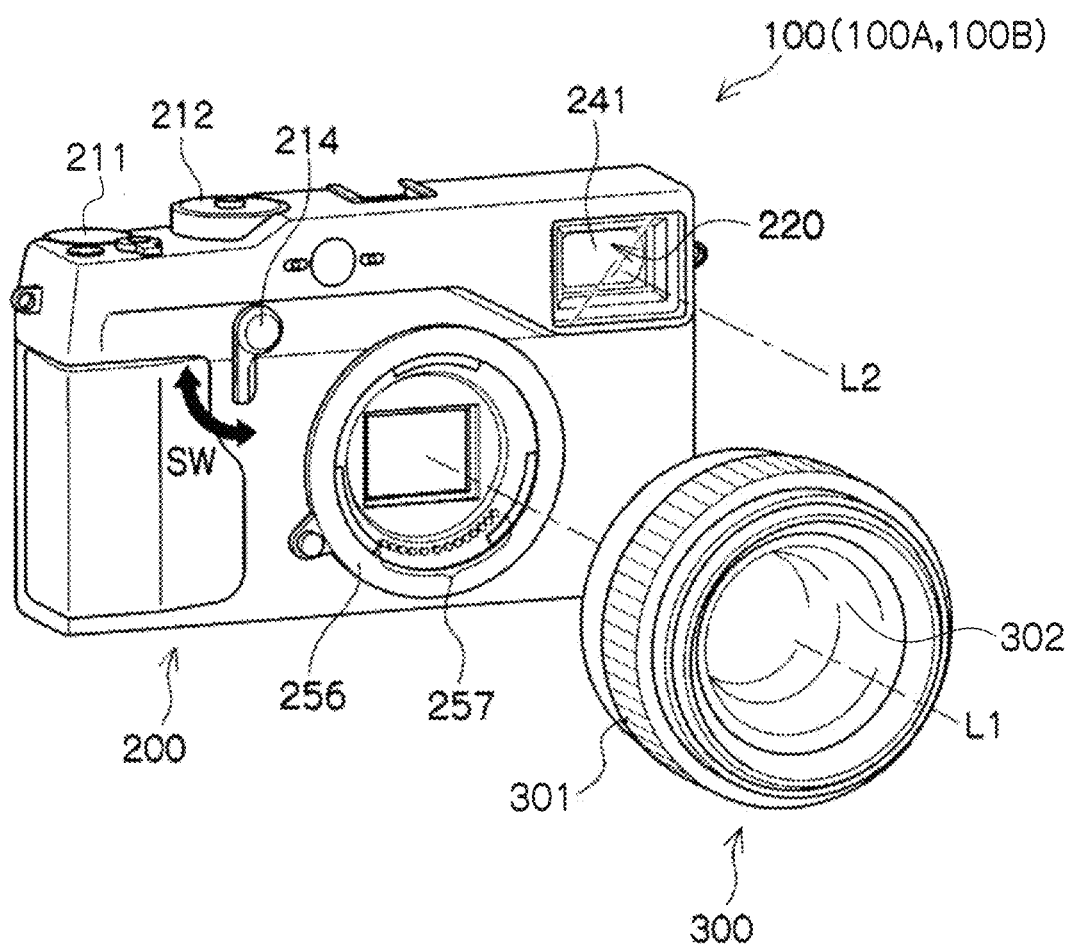
FIG. 1 is a perspective view illustrating an example of an external appearance of an interchangeable lens camera that is an imaging device according to a first to third exemplary embodiment.
Figure 2:
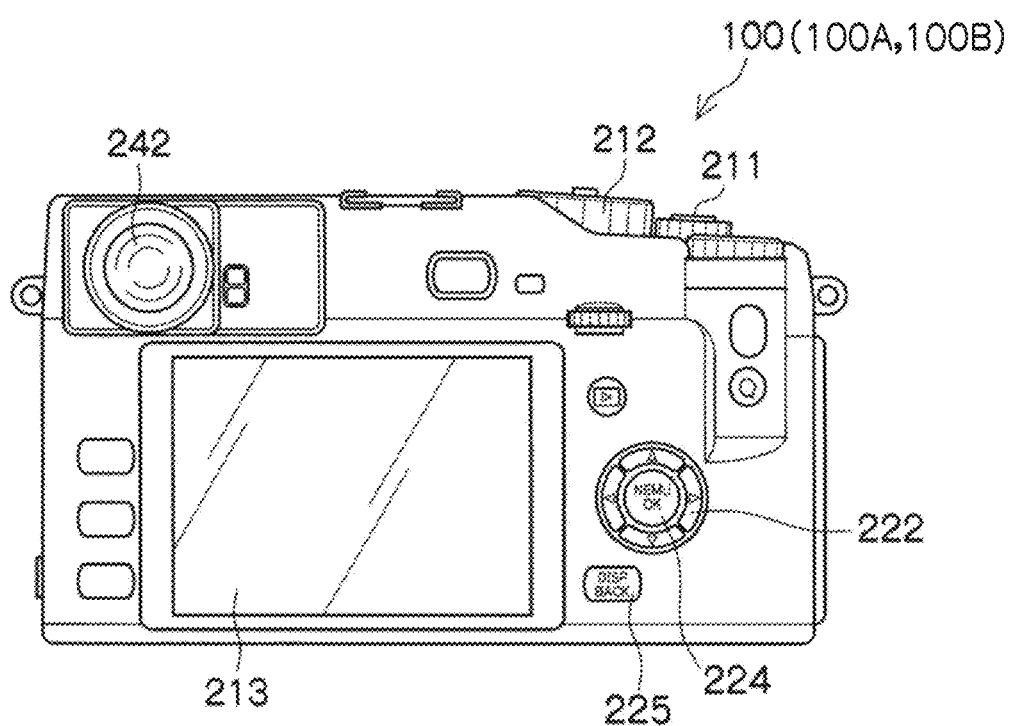
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera. Moreover, the imaging device 100 is a digital camera with a camera body 200 and an interchangeable lens 300 that is interchangeably mounted to the camera body 200, and without a reflex mirror. The interchangeable lens 300 includes imaging lenses 16 that include a focusing lens 302 capable of being moved along the optical axis direction by manual operation (see FIG. 3). A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below)

The interchangeable lens 300 is interchangeably mounted to the camera body 200. A focus ring 301 is provided to a mirror cylinder of the interchangeable lens 300 and employed when in manual focus mode. The focusing lens 302 is moved in the optical axis direction as the focus ring 301 is rotationally operated by hand, such that subject light forms an image on an image pick-up device 20 (see FIG. 3), described later, at an in-focus position according to the subject distance.

An OVF finder window 241 included in the HYBRID FINDER 220 is provided on the front face of the camera body 200. A finder switching lever (finder switching section) 214 is also provided on the front face of the camera body 200. Switching (described below) is performed between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 300. The top face of the camera body 200 is mainly provided with a release button 211 and a dial 212 to set imaging mode, replay mode, and the like.

The release button 211 serving as an imaging preparation instruction section and an imaging instruction section is configured capable of detecting two stages of press operation: an imaging preparation instruction state and an imaging instruction state. The imaging preparation instruction state indicates, for example, a state pressed from a standby position to an intermediate position (half pressed position). The imaging instruction state indicates a state pressed past the intermediate position to the final press position (full press position). In the following a "state pressed from the standby position to the half pressed position" is referred to as a "half pressed state", and "a state pressed from the standby position to the fully pressed position" is referred to as the "fully pressed state".

In the imaging device 100 according to the first exemplary embodiment, the imaging mode and the replay mode are selectably set as the operation mode according to instructions of a user. A manual focus mode and an autofocus mode are selectably set as the imaging mode according to instructions of a user. In the autofocus mode, adjustment is performed to imaging conditions by placing the release button 211 in a half pressed state, then exposure (imaging) is performed by continuing to a fully pressed state. Namely, the Automatic Exposure (AE) function is actuated by placing the release button 211 in the half pressed state to set the exposure state, and then the Auto Focus (AF) function is actuated to perform focus control, and imaging is performed when the release button 211 is then placed in the fully pressed state.

The back face of the camera body 200 illustrated in FIG. 2 is provided with an OVF finder eyepiece 242, a display section 213, a directional pad 222, a MENU/OK key 224, and a BACK/DISP button 225.

The directional pad 222 functions as a multifunction key to output various instruction signals, such as selection of one or plural menus, zoom, and frame advance. The MENU/OK key 224 is an operation key that functions as a menu button to instruct display of one or plural menus on the screen of the display section 213, and also doubles as an OK button function to confirm selected content, to instruct execution, or the like. The BACK/DISP button 225 is used when erasing a desired object, such as a selected item, erasing specified content, or returning to the one-previous operation state, and so on.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display menu screens and the like.

Figure 3:
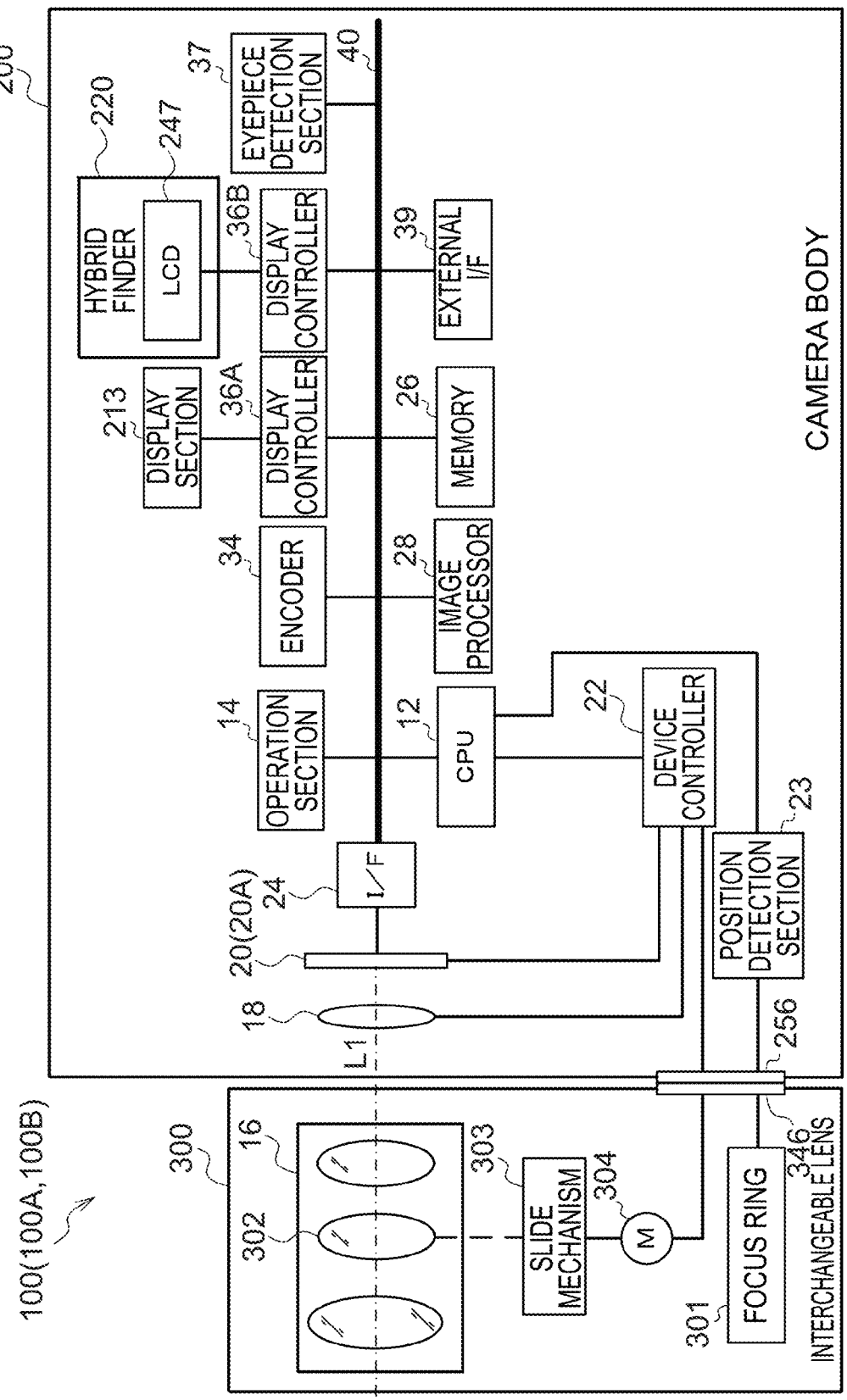
FIG. 3 is a block diagram illustrating an example of a configuration of an electrical system of the imaging device illustrated in FIG. 1.

FIG. 3 is a block diagram illustrating an example of a configuration (internal configuration) of an electrical system of the imaging device 100 according to the first exemplary embodiment.

The imaging device 100 includes a mount 256 provided to the camera body 200, and a mount 346 on the interchangeable lens 300 side that corresponds to the mount 256. The interchangeable lens 300 is interchangeably mounted to the camera body 200 by connecting the mount 346 to the mount 256.

The interchangeable lens 300 includes a slide mechanism 303 and a motor 304. The slide mechanism 303 moves the focusing lens 302 along the optical axis L1 direction by operation of the focus ring 301. The focusing lens 302 is attached to the slide mechanism 303 so as to be capable of sliding in the optical axis L1 direction. The motor 304 is connected to the slide mechanism 303, and the slide mechanism 303 slides the focusing lens 302 along the optical axis L1 direction on receipt of motive force from the motor 304.

The motor 304 is connected to the camera body 200 through the mounts 256, 346, and driving is controlled under instruction from the camera body 200. In the first exemplary embodiment a stepping motor is employed as an example of the motor 304. The motor 304 operates in synchronization with pulse power under command from the camera body 200.

The imaging device 100 is a digital camera that records still images and video images that have been imaged. Overall operation of the camera is controlled by a central processing unit (CPU) 12. The imaging device 100 also includes an operation section 14, an interface section 24, memory 26, and an encoder 34. The imaging device 100 also includes display control sections 36A, 36B that are examples of display controllers according to the present invention. The imaging device 100 also includes an eyepiece detection section 37. The imaging device 100 also includes an image processor 28 that is an example of a correction section, a generation section, and an identification section according to the present invention. When there is no need to discriminate between the display control sections 36A, 36B, they are referred to below as "display control section 36". In the first exemplary embodiment, the display controller 36 is provided as a separate hardware configuration to the image processor 28, however there is no limitation thereto. The image processor 28 may include a function similar to that of the display controller 36, and in such cases the display controller 36 is not required.

The CPU 12, the operation section 14, the interface section 24, the memory 26 that is an example of a storage section, the image processor 28, the encoder 34, the display controllers 36A, 36B, the eyepiece detection section 37, and an external interface (I/F) 39 are connected together through a bus 40. The memory 26 includes a non-volatile storage region (for example EEPROM) stored with parameters, programs, and the like, and a volatile storage region (for example SDRAM) temporarily stored with various data related to images and the like.

In the imaging device 100 according to the first exemplary embodiment, when in auto-focus mode, the CPU 12 performs focusing control by controlling the driving of the motor 304 such that the contrast value of the image obtained by imaging is at a maximum. When in auto-focus mode, the CPU 12 computes AE data that is physical data indicating the brightness of the image obtained by imaging. When the release button 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by a user when giving various instructions to the imaging device 100. Various instructions received by the operation section 14 are output to the CPU 12 as operation signals, and the CPU 12 executes processing according to the operation signals input from the operation section 14.

The operation section 14 includes the release button 211, the focus mode switching section 212 for selecting imaging modes and the like, the finder switching lever 214, the directional pad 222, the MENU/OK key 224, and the BACK/DISP button 225. The operation section 14 includes a touch panel for receiving various information. The touch panel is, for example, superimposed on the display screen of the display section 213.

The camera body 200 includes a position detection section 23. The position detection section 23 is connected to the CPU 12. The position detection section 23 is connected to the focus ring 301 through the mounts 256, 346, detects the angle of rotation of the focus ring 301, and outputs rotation angle data representing the rotation angle of the detection result to the CPU 12. The CPU 12 executes processing according to rotation angle data input from the position detection section 23.

When the imaging mode has been set, image light representing an imaging-subject is formed as an image on a light receiving face of the color image pick-up device (for example a CMOS sensor) 20 through the imaging lenses 16 that include the focusing lens 302 that is movable by manual operation, and a shutter 18. The signal charges accumulated in the image pick-up device 20 are read in sequence as digital signals according to the signal charges (voltage) arising due to application of a read signal from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
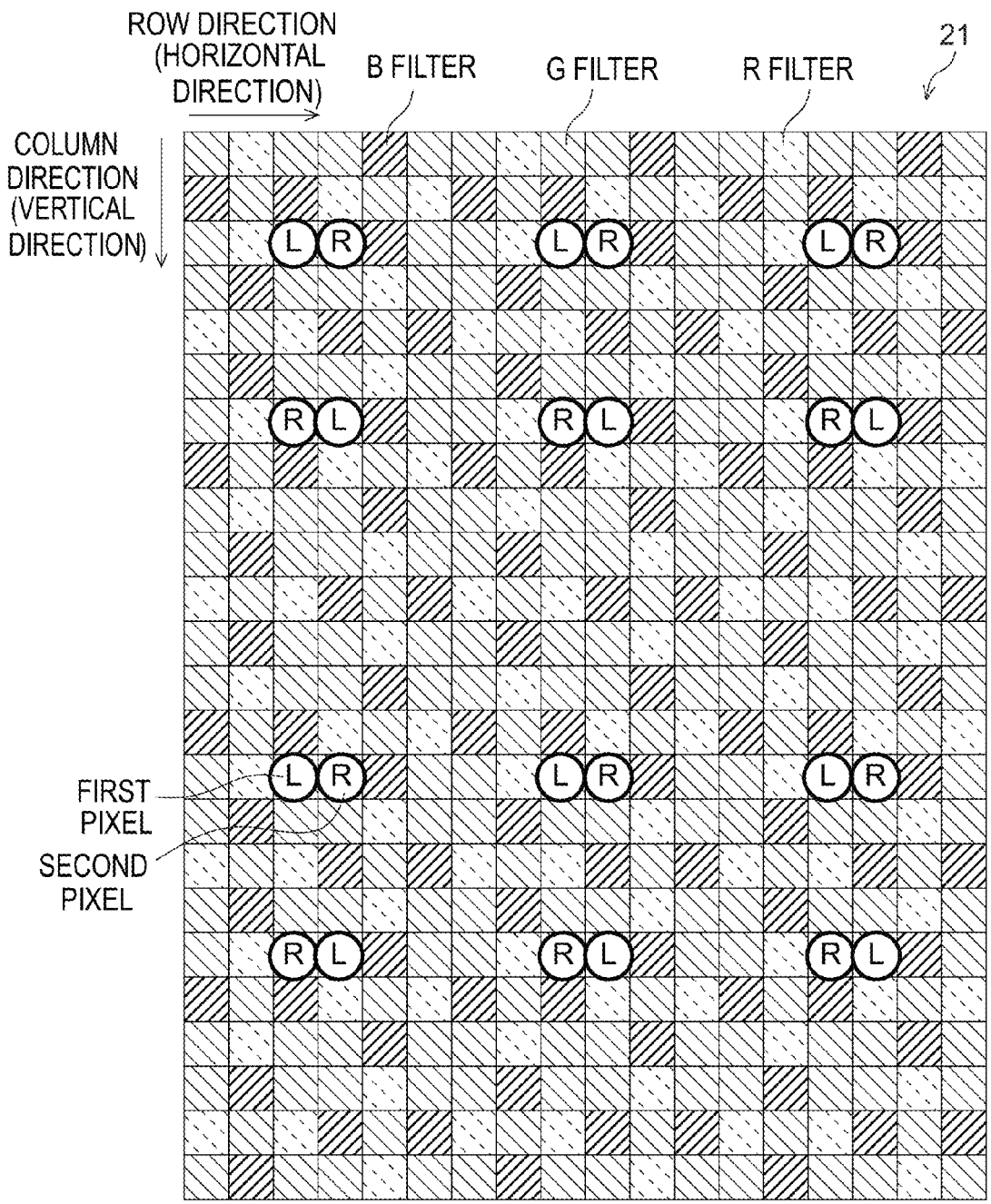
FIG. 4 is a schematic layout diagram illustrating an example layout of a color filter provided to an image pick-up device included in an imaging device according to the first exemplary embodiment, and an example of placement of phase difference pixels on the color filter.

The image pick-up device 20 includes a color filter 21 as illustrated in the example in FIG. 4. The color filter 21 includes a G filter G corresponding to green (G) that contributes most to obtaining the brightness signal, an R filter R corresponding to red (R), and a B filter B corresponding to blue (B). In the example illustrated in FIG. 4, 4896×3264 pixels are employed as an example of the number of pixels in the image pick-up device 20. G filters, R filters, and B filters are placed on these pixels with specific periodicities in the row direction (horizontal direction) and the column direction (vertical direction), respectively. The imaging device 100 is accordingly able to perform processing according to a repeating pattern when performing synchronization (interpolation) processing etc. on R, G, B signals. Synchronization processing is processing to compute all color data for every pixel from a mosaic image corresponding to the color filter array of a 1-chip color image pick-up device. For example, in cases in which an image pick-up device using a RGB three-color filter is employed, synchronization processing indicates processing to compute all RGB color data for every pixel from an RGB mosaic image.

The image pick-up device 20 includes first pixels L, second pixels R, and normal pixels N (an example of third pixels) (described below). The imaging device 100 detects a phase displacement amount based on signal output values (referred to below as pixel values) from pixels of the first pixels L and the pixel values of the second pixels R by operating a phase difference AF function. The in-focus position of the imaging lens is adjusted based on the detected phase displacement amount.

Figure 5:
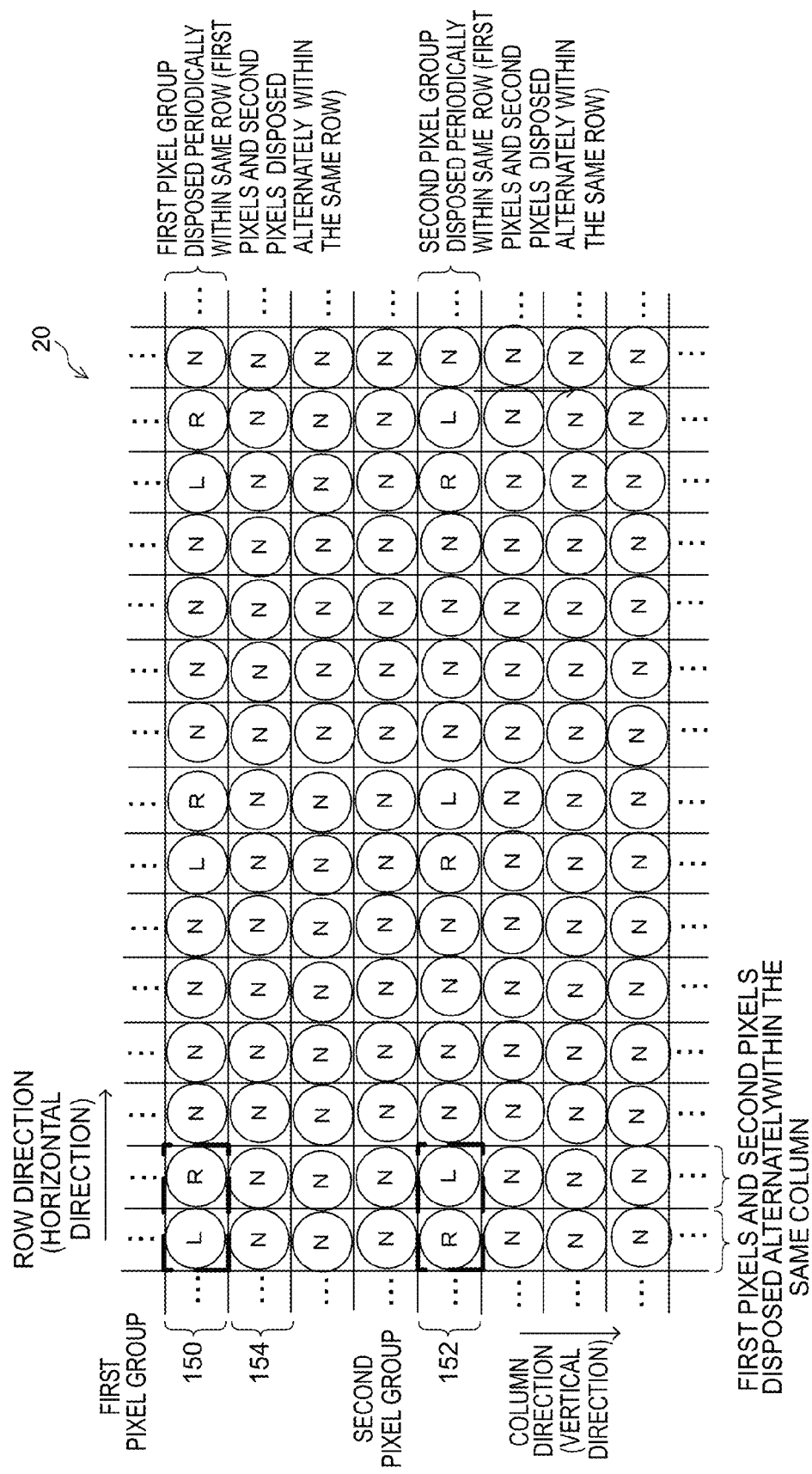
FIG. 5 is a schematic layout diagram illustrating an example of a placement of first pixels, second pixels, and normal pixels included in an image pick-up device according to a first exemplary embodiment.

As illustrated in the example in FIG. 5, the image pick-up device 20 includes first pixel rows 150, second pixel rows 152, and third pixel rows 154. First pixel groups are included within a given row of the first pixel rows 150, and the first pixel groups are disposed periodically in the row direction with plural normal pixels N (4 normal pixels N in the example illustrated in FIG. 5) interposed therebetween. The first pixel group indicates a pair of a first pixel L and a second pixel R adjacent in a first sequence in the row direction (a sequence in which a first pixel L is positioned on the left side facing the drawing, and a second pixel R is positioned on the right side facing the drawing).

Second pixel groups are included within a given row in the second pixel rows 152, and the second pixel group are disposed periodically in the row direction with plural normal pixels N (4 normal pixels N in the example illustrated in FIG. 5) interposed therebetween. The second pixel group indicates a pair of a first pixel L and a second pixel R adjacent in a second sequence in the row direction (the reverse sequence to the first sequence). Plural normal pixels N are disposed adjacent to each other in a given row in the third pixel rows 154.

The first pixel rows 150 and the second pixel rows 152 are disposed alternately in the column direction with plural of the third pixel rows 154 interposed therebetween (in the first exemplary embodiment, third pixel rows 154 having different row numbers are disposed periodically in the column direction).

Figure 6:
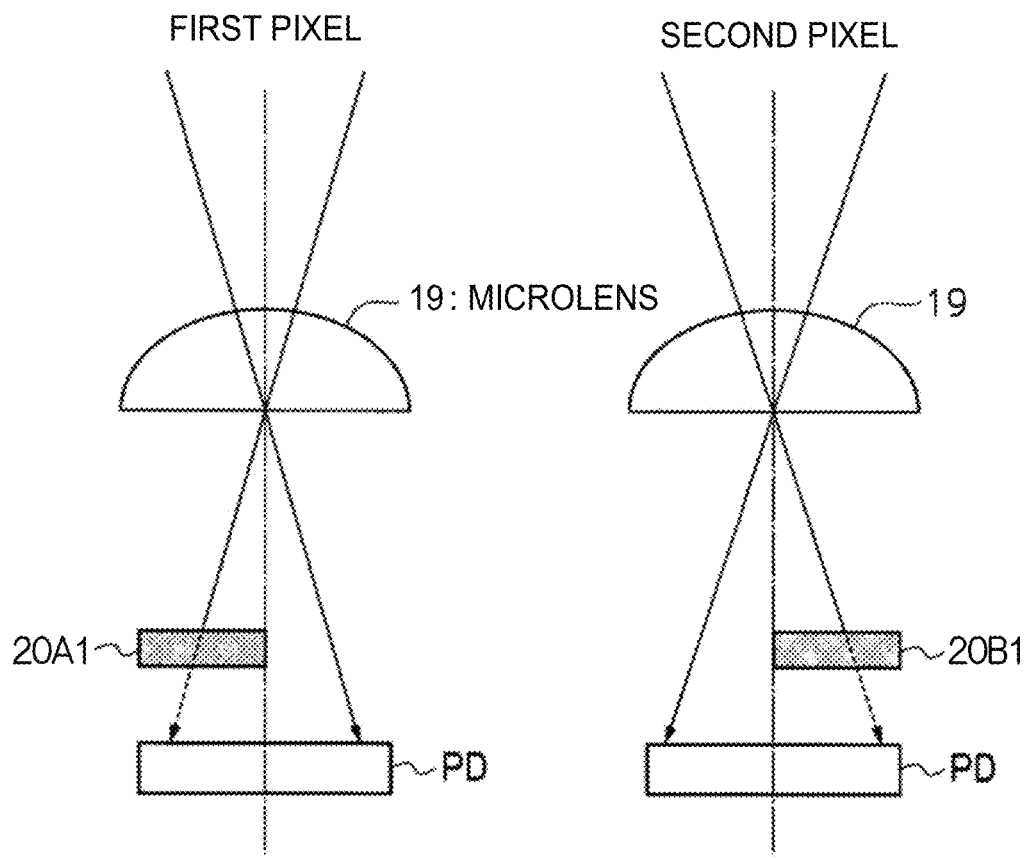
FIG. 6 is a schematic diagram illustrating an example of respective configurations of a first pixel and a second pixel included in the image pick-up device illustrated in FIG. 5.

As illustrated in the example of FIG. 6, the first pixels L are pixels in which light to the left half portion in the row direction of the light receiving face is blocked by light-blocking members 20A1 (the left side when facing an imaging-subject from the light receiving face (in other words the right side when facing the light receiving face from the imaging-subject)). As illustrated in the example of FIG. 6, the second pixels R are pixels in which light to the right half portion in the row direction of the light receiving face is blocked by light-blocking members 20B1 (the right side facing an imaging-subject from the light receiving face (in other words the left side when facing the light receiving face from the imaging-subject)). In the following the first pixels L and the second pixels R will be referred to as "phase difference pixels", when there is no need to discriminate therebetween in the explanation.

Figure 7:
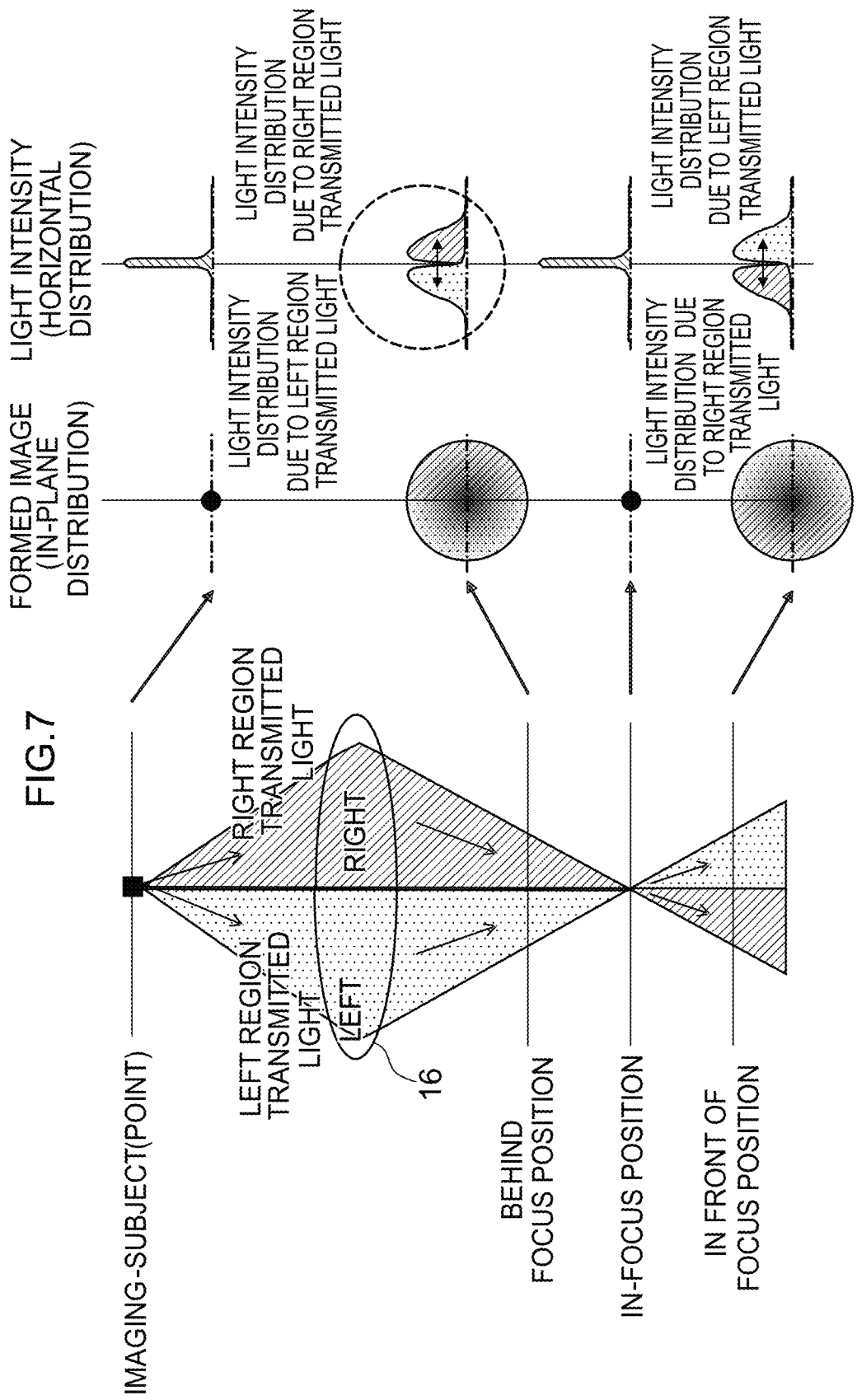
FIG. 7 is a schematic diagram illustrating an example of a path of light that has passed through an imaging lens included in the imaging device illustrated in FIG. 1, and light intensity distributions of left region transmitted light and right region transmitted light in a plan view of a formed image and an image formed region.

As illustrated in the example in FIG. 7, rays of light passing through the exit pupil of the imaging lenses 16 are broadly divided into light passing through a left region and light passing through a right region. The left region transmitted light indicates rays of light in the left half portion of the rays of light passing through the exit pupil of the imaging lenses 16, and the right region transmitted light indicates rays of light in the right half portion of the rays of light passing through the exit pupil of the imaging lenses 16. Portions of the left region transmitted light and the right region transmitted light that are in focus (in an in-focus state) form an image at the same position on the image pick-up device 20. In contrast, portions of the left region transmitted light and the right region transmitted light that are in front of focus or behind focus are each incident to different positions on the image pick-up device 20 to each other (with displaced phase). Thus on the light receiving face, the light intensity distribution due to the left region transmitted light and the light intensity distribution due to the right region transmitted light are separated in the row direction, and form a blurred image. Moreover, the distribution positions on the light receiving face of the light intensity distribution due to the left region transmitted light, and the light intensity distribution due to the right region transmitted light, are the opposite of each other with regards to being in front of focus or behind focus.

As illustrated in the example of FIG. 6, microlenses 19 and the light-blocking members 20A1, 20B1 function as a pupil divider. Namely, rays of light passing through the exit pupil of the imaging lenses 16 are divided to the left and right by the microlenses 19 and the light-blocking members 20A1, 20B1, with the first pixels L receiving light of the left region transmitted light, and the second pixels R receiving light of the right region transmitted light. As a result, the subject-image corresponding to the left region transmitted light and the subject-image corresponding to the right region transmitted light are acquired as parallax images with different parallax to each other (referred to below as a left eye image and a right eye image). The light-blocking members 20A1, 20B1 are referred to in the following as "light-blocking members" with no reference numerals allocated thereto when there is no need to discriminate in the explanation therebetween.

The image pick-up device 20 is classified into a first pixel group, a second pixel group, and a third pixel group. The first pixel group indicates the plural first pixels L arrayed in a matrix shape as illustrated in the example of FIG. 5. The second pixel group indicates the plural second pixels R arrayed in a matrix shape as illustrated in the example of FIG. 5. The third pixel group indicates the plural normal pixels N as illustrated in the example of FIG. 5. Normal pixels refers to pixels other than the phase difference pixels (for example, pixels not provided with light-blocking members 20A1, 20B1). In the following a RAW image output from the first pixel group is referred to as a "first image", a RAW image output from the second pixel group is referred to as a "second image", and a RAW image output from the third pixel group is referred to as a "third image".

Returning to FIG. 3, the image pick-up device 20 outputs the first image (digital signal representing the pixel values of each of the first pixels L) from the first pixel group, and outputs the second image (digital signal representing the pixel values of each of the second pixels R) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels N. The first image, the second image, and the third image output from the image pick-up device 20 are temporarily stored in the volatile storage region in the memory 26 through the interface section 24.

Figure 8:
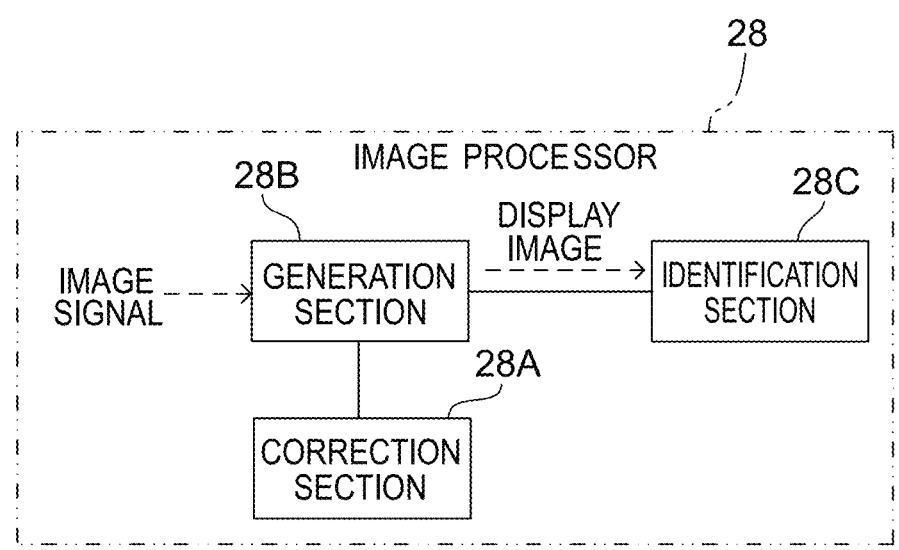
FIG. 8 is a functional block diagram illustrating an example of relevant configuration of an image processing section included in the imaging device illustrated in FIG. 1.

The image processor 28 performs various image processing on the first to third images stored in the memory 26. As illustrated in the example of FIG. 8, the image processor 28 includes a correction section 28A, a generation section 28B, and an identification section 28C. The image processor 28 is implemented by plural functional circuits related to image processing configured by an Application Specific Integrated Circuit (ASIC) that is a single integrated circuit. However, the hardware configuration is not limited thereto, and another hardware configuration may be employed, for example a programmable logic device, or a computer including a CPU, ROM, and RAM.

The correction section 28A derives a correction coefficient according to light reduction characteristics based on the left region transmitted light and the right region transmitted light, and corrects the first image and the second image based on the derived correction coefficient.

The generation section 28B generates a display image based on image signals output from the image pick-up device 20. The display image includes, for example, a first display image generated based on the third image output from the image pick-up device 20, and a second display image employed in focus checking generated based on the first image and the second image corrected by the correction section 28A.

The identification section 28C identifies an image region that satisfies both a first condition and a second condition in the second display image generated by the generation section 28B. The first condition indicates here that the magnitude of contrast is a first specific value or greater, and the second condition indicates that the level of matching between the first image and the second image is a second specific value or greater. Reference here to an "image region" indicates, for example, an image region corresponding to the first pixels L and the second pixels R where both the first condition and the second condition are satisfied in the second display image (for example, an image region present at a position corresponding to positions of the first pixels L and the second pixels R).

Figure 9A:
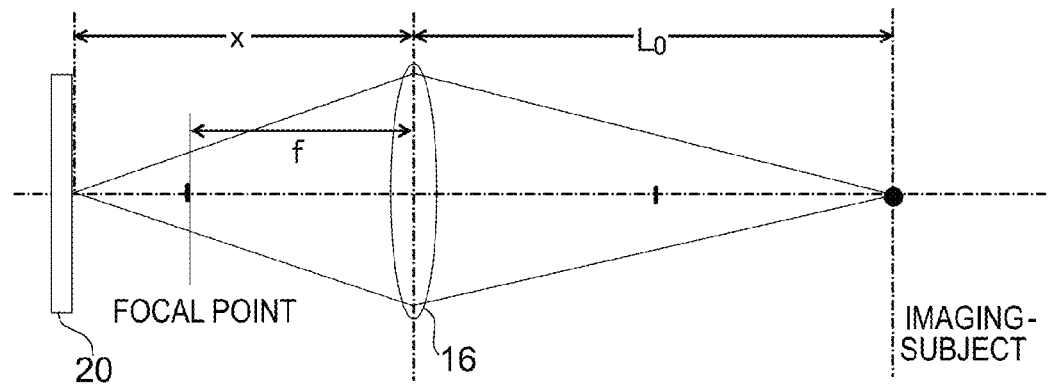
FIG. 9A is schematic diagram illustrating an example of a positional relationship between an imaging-subject, imaging lens, and image pick-up device when in a focused state (perfect focus)
Figure 9B:
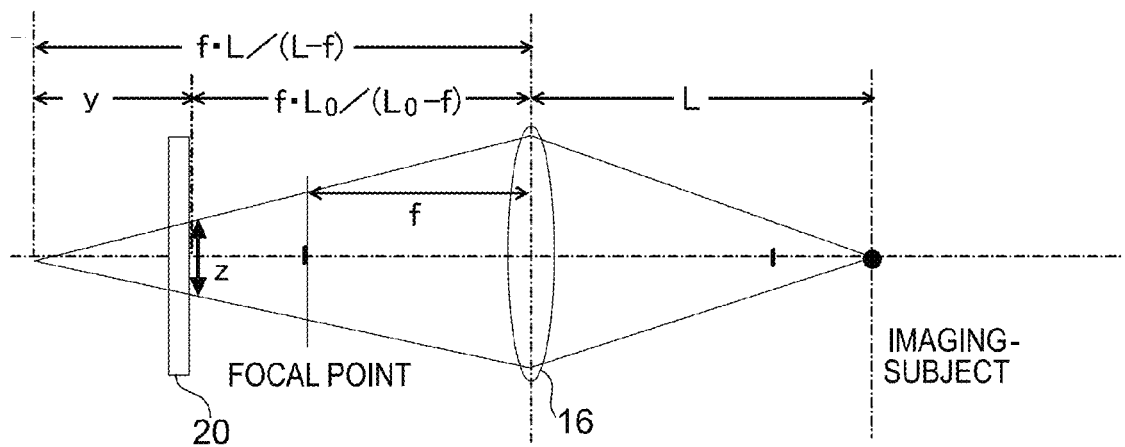
FIG. 9B is a schematic diagram illustrating an example of a positional relationship between an imaging-subject, imaging lens, and image pick-up device when in an unfocused state.

The image displacement amount corresponding to the amount of blurring of the image formed on the light receiving face of the image pick-up device 20 (the displacement amount between the light intensity distribution due to the left region transmitted light and the light intensity distribution due to the right region transmitted light) is known to depend on the F number of the imaging lenses 16, as expressed by the following Equation (1). Equation (1) is derived from the positional relationship between the imaging lenses 16 and the image pick-up device 20 when an imaging-subject is in focus (perfect focus), as illustrated in an example in FIG. 9A, and the positional relationship between the imaging lenses 16 and the image pick-up device 20 when an imaging-subject is not in focus, as illustrated in an example in FIG. 9B. Namely, the displacement amount Δ is expressed by Equation (2) below, and "z" in Equation (2) is expressed by Equation (3) below. "y" in Equation (3) is expressed by Equation (4) below.

Equation (1)

$$\Delta = \frac{\kappa(L_0 - L) \cdot f^2}{L \cdot F \cdot (L_0 - f)} \tag{1}$$

κ: base length ratio (=separation between centroids of blur due to output of first and second images/blur diameter (dimensionless)).
f: focal length
$L_0$: distance between an imaging-subject and imaging lens when in focus (perfect focus)
L: distance between an imaging-subject and imaging lens when the imaging-subject is in front of (toward the image pick-up device) the in focus (perfect focus) position
F: F number Equation (2)

$$\Delta = z\kappa \tag{2}$$

Equation (3)

$$z : f / F = y : f \cdot L / (L - f) \tag{3}$$

$$z = (L_0 - \kappa) f^2 / (L \cdot F \cdot (L_0 - f))$$

Equation (4)

$$y = f \cdot L / (L - f) - f \cdot \frac{L_0}{(L_0 - f)} \tag{4}$$

As expressed in Equation (1), the image displacement amount Δ increases as the F number decreases. Thus the optimum values for the first and second specific values employed by the identification section 28C also change along with the F number. The identification section 28C accordingly derives a threshold value ϵ1 that is an example of the first specific value and a threshold value ϵ2 that is an example of the second specific value by employing a threshold value derivation table 260 illustrated in the example of FIG. 10. In the threshold value derivation table 260 illustrated in FIG. 10, predetermined values for the optimum values of the threshold values ϵ1, ϵ2 are associated with each of plural F numbers. Thus the identification section 28C can derive an appropriate value from the threshold value derivation table 260 for the threshold values ϵ1, ϵ2 to correspond to the F number currently set.

As expressed in Equation (1), the image displacement amount Δ has units of length, and it is determined that there is displacement from in focus (an out of focus state) when this length is greater than the diameter of a single pixel of the image pick-up device 20. Thus threshold values ϵ1, ϵ2 may be determined according to the size of a single pixel of the image pick-up device 20. Moreover, since the image displacement amount Δ depends on the distance between the imaging lenses 16 and the imaging-subject as expressed by Equation (1), the threshold values ϵ1, ϵ2 may be determined according to the distance between the imaging lenses 16 and the imaging-subject. The threshold values ϵ1, ϵ2 may be determined according to a combination of at least two items out of the F number, the size of single pixels of the image pick-up device 20, and the distance between the imaging lenses 16 and the imaging-subject, and in such cases the threshold values ϵ1, ϵ2 may also be derived from a table.

Figure 11:
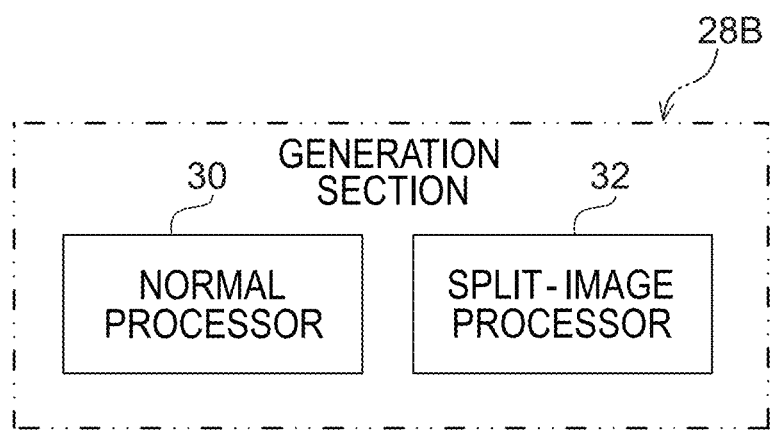
FIG. 11 is a functional block diagram illustrating an example of relevant configuration of a generation section included in the image processing section illustrated in FIG. 8.

As illustrated in the example in FIG. 11, the generation section 28B includes a normal processor 30 and a split-image processor 32. The normal processor 30 generates a chromatic normal image, serving as an example of a first display image, by processing the R, G, B signals corresponding to the third pixel group. The split-image processor 32 generates an achromatic split-image, serving as an example of a second display image, by processing the G signals corresponding to the first pixel group and the second pixel group.

Returning to FIG. 3, the encoder 34 converts the input signal into a signal of another format and outputs the converted signal. The HYBRID FINDER 220 includes an LCD 247 that displays an electronic image. The number of pixels in a specific direction in the LCD 247 (for example the number of pixels in the row direction that is the parallax generation direction), is less than the number of pixels in the same direction of the display section 213. The display controller 36A is connected to the display section 213, the display controller 36B is connected to the LCD 247, and images are displayed on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus and an autofocus mode using the dial 212 (the focus mode switching section). When one of the focus modes has been selected, the display controller 36 displays on the display devices a live-view image onto which the split-images have been synthesized. Moreover, when the autofocus mode has been selected using the dial 212, the CPU 12 operates as a phase difference detection section and an automatic focal point adjusting section. The phase difference detection section detects the phase difference between the first image output from the first pixel group and the second image output from the second pixel group. The automatic focal point adjusting section controls the motor 304 from the device controller 22 through the mounts 256, 346, based on the detected phase difference, to move the focusing lens 302 to the in-focus position such that the defocus amount of the focusing lens 302 becomes zero. The "defocus amount" referred to above indicates, for example, a phase displacement amount between the first image and the second image.

The eyepiece detection section 37 detects a user (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to the printer and printing. When connected to a display as an external device, the imaging device 100 is capable of outputting captured still images and live-view images to the display, and displaying thereon.

Figure 12:
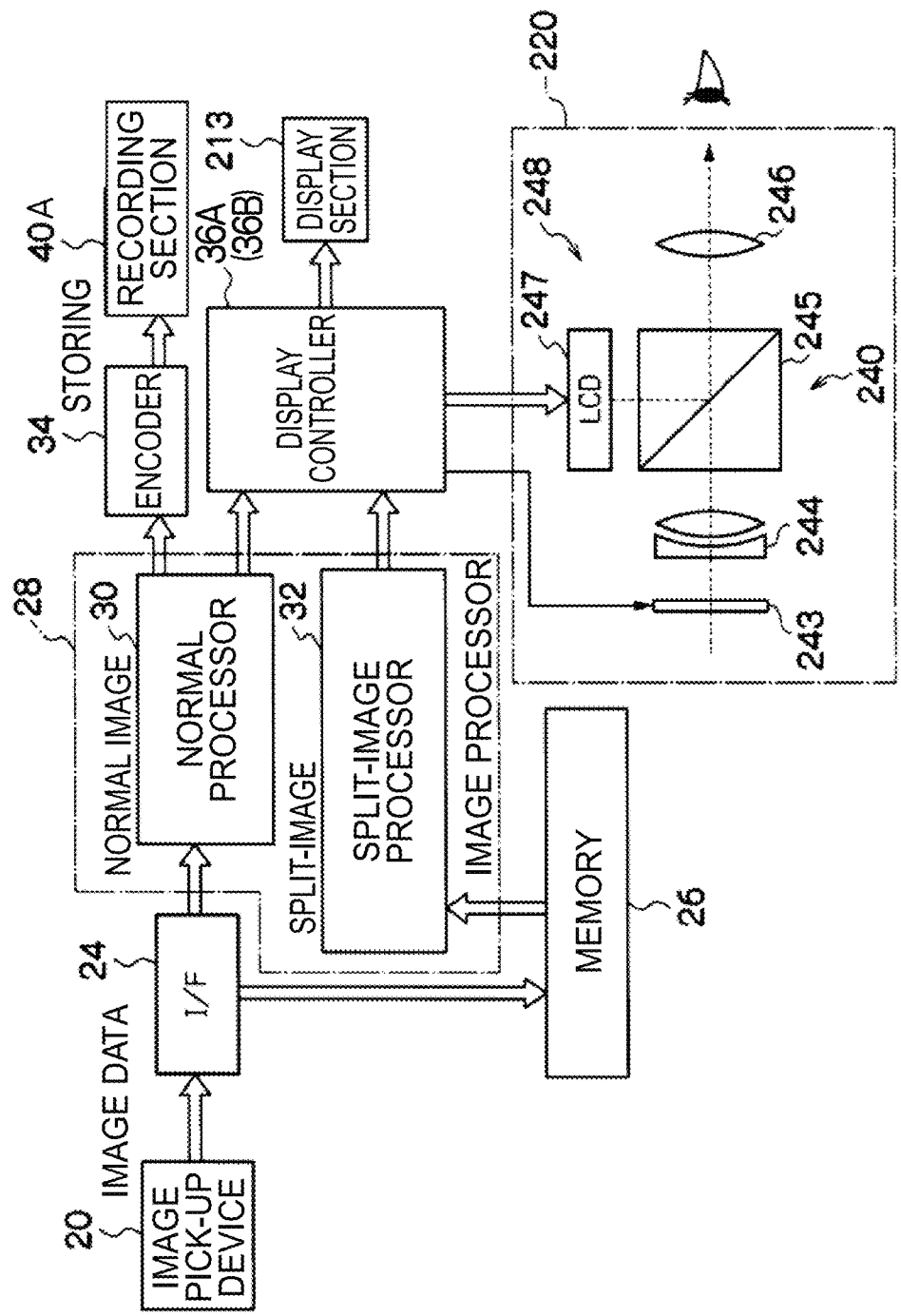
FIG. 12 is a functional block diagram illustrating an example of relevant configuration of the imaging device illustrated in FIG. 1.

FIG. 12 is a functional block diagram illustrating an example of relevant functions of the imaging device 100 according to the first exemplary embodiment. Common portions to the block diagram illustrated in FIG. 3 are appended with the same reference numerals.

The normal processor 30 and the split-image processor 32 each include a WB gain section, a gamma correction section, and a synchronization processor (not illustrated in the drawings), and perform serial signal processing in each of the processors on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processor performs color interpolation processing corresponding to the color filter array of the image pick-up device 20, and generates synchronized R, G, B signals. The normal processor 30 and the split-image processor 32 perform parallel image processing on the RAW images each time one screen's worth of RAW image is acquired by the image pick-up device 20.

The normal processor 30 is input with the R, G, B RAW images from the interface section 24, and generates a normal image for recording by interpolating R, G, B pixels for the third pixel group using peripheral pixels of the same color as the first pixel group and the second pixel group (for example the adjacent G pixels).

The normal processor 30 outputs image data of the generated normal image for recording to the encoder 34. The R, G, B signals processed by the normal processor 30 are converted (encoded) by the encoder 34 into a recording signal and recorded in a recording section 40A. Moreover, a normal image for display that is an image based on the third image processed by the normal processor 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under exposure conditions at the same time. Consequently, the image processor 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processor 32 extracts the G signals of the first pixel group and the second pixel group from the RAW images temporarily stored in the memory 26, and generates an achromatic split-image based on the G signals of the first pixel group and the second pixel group. The pixel groups corresponding to both the first pixel group and the second pixel group extracted from the RAW images are pixel groups from the G filter pixels as described above. The split-image processor 32 is accordingly able to generate an achromatic left parallax image and an achromatic right parallax image based on the G signals of the pixel groups corresponding to the first pixel group and the second pixel group. In the following, for convenience of explanation, the above "achromatic left parallax image" is referred to as the "left eye image", and the above "achromatic right parallax image" is referred to as the "right eye image".

The split-image processor 32 generates a split image. The split image is generated by combining the left eye image based on the first image output from the first pixel group together with the right eye image based on the second image output from the second pixel group alternately along a specific direction (such as a direction intersecting the parallax generation direction). Image data of the generated split-image is output to the display controller 36.

The display controller 36 generates image data of a normal image for display based on the image data of the normal image for display input from the normal processor 30, and image data of the split-image corresponding to the first and second pixel groups input from the split-image processor 32. For example, the display controller 36 synthesizes a split-image represented by image data input from the split-image processor 32 in a display region of a normal image represented by image data corresponding to the third pixel group input from the normal processor 30. The image data obtained by synthesizing is then output to the display devices. Namely, the display controller 36A outputs the image data to the display section 213, and the display controller 36B outputs the image data to the LCD 247. The display devices thereby consecutively display normal images as video images, and consecutively display split images as video images in the display region of the normal images.

Figure 13:
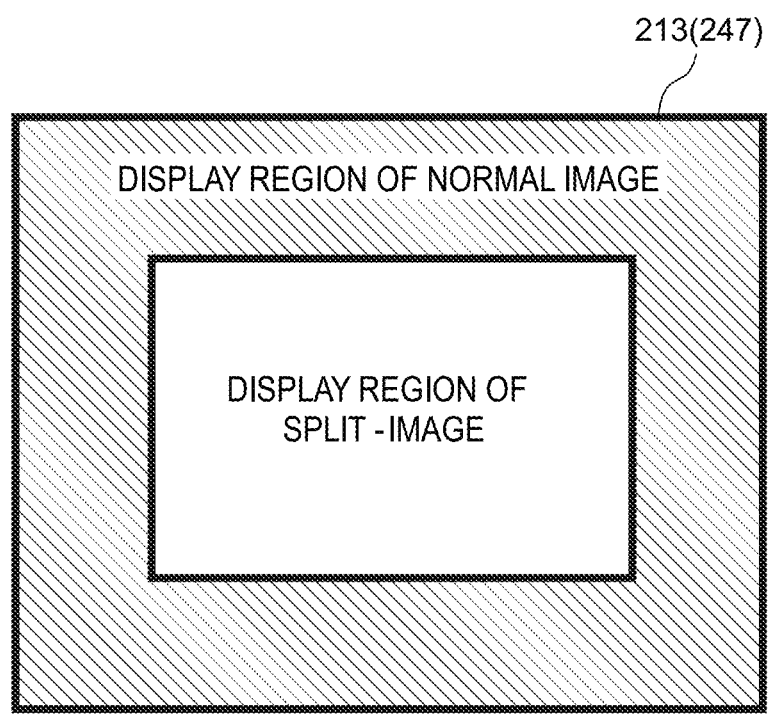
FIG. 13 is a schematic diagram illustrating an example of a display region of a split-image and a display region of a normal image on a display device included in the imaging device illustrated in FIG. 1.

As illustrated in the example in FIG. 13, the split-image is displayed within a rectangular frame at a central portion of the screen of the display device, and the normal image is displayed in a peripheral region outside the split-image. The edge line representing the rectangular frame illustrated in FIG. 13 is illustrated in FIG. 13 for ease of explanation, and is not actually displayed.

In the first exemplary embodiment the split-image is fitted in place of an image of a portion of a normal image so as to synthesize the split-image onto the normal image; however there is no limitation thereto. For example, a synthesis method may be employed in which the split-image is superimposed on the normal image. Moreover, when superimposing the split-image, a synthesis method may be employed in which transparencies, of the image of a portion of a normal image onto which the split-image is to be superimposed and of the split-image, are appropriately adjusted for superimposition. In this manner the live-view image representing the subject-image that is successively captured is displayed on the screen of the display device, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made at each turn between the OVF mode that enables a visual check to be made on an optical image using the OVF 240, and the EVF mode that enables a visual check to be made on the electronic image using the EVF 248.

In the OVF mode, the display controller 36B controls so that the liquid crystal shutter 243 is in a non-light blocking state, enabling a visual check to be made on an optical image through the eyepiece section. Moreover, only the split-image is displayed on the LCD 247. This thereby enables a finder image to be displayed in which the split-image is superimposed on a portion of the optical image.

In the EVF mode, the display controller 36B controls so that the liquid crystal shutter 243 is in a light blocking state, enabling a visual check to be made through the eyepiece section of an electronic image displayed alone on the LCD 247. Similar image data to the image data synthesized with the split-image for output on the display section 213 is input to the LCD 247. This enables the electronic image synthesized with the split-image to be displayed on a portion of the normal image, similarly to with the display section 213.

Figure 14:
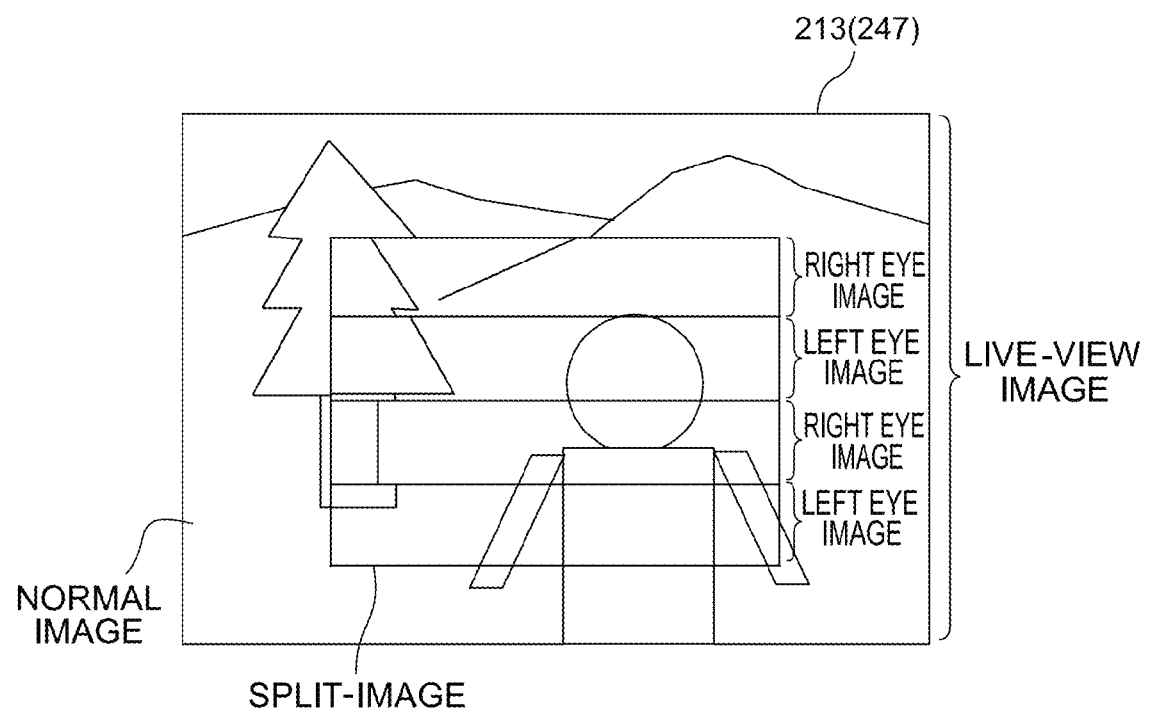
FIG. 14 is a screen view illustrating an example of a live-view image including a normal image and a split-image displayed on a display section of the imaging device illustrated in FIG. 1 (when in a focused state)
Figure 15:
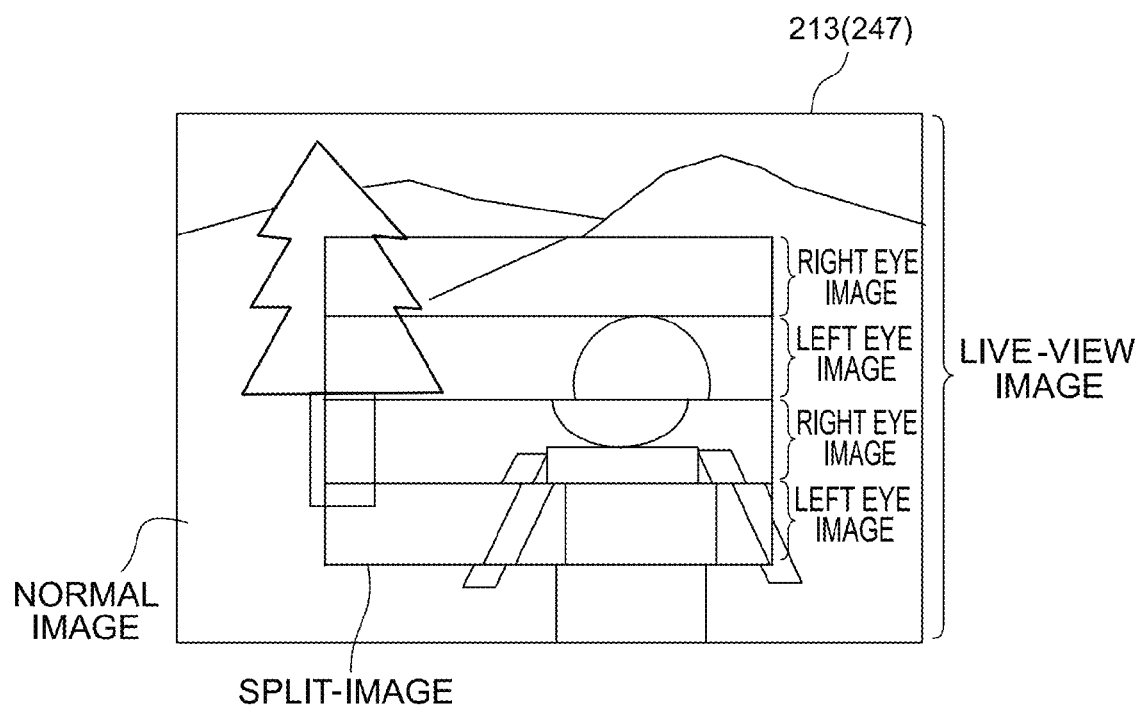
FIG. 15 is a screen view illustrating an example of a live-view image including a normal image and a split-image displayed on a display section of the imaging device illustrated in FIG. 1 (when in an unfocused state)

Generally a split-image is an image, such as those illustrated in the example in FIG. 14 and FIG. 15, divided into plural divisions (4 divisions in the example illustrated in FIG. 14 and FIG. 15) with the left eye image and the right eye image combined alternately along a direction intersecting with the parallax generation direction (along the up-down direction facing the page in the example illustrated in FIG. 14 and FIG. 15). The left eye image and the right eye image included in the split-image are displaced in a specific direction according to the state of focus (the parallax generation direction in the example illustrated in FIG. 14 and FIG. 15 (the left-right direction facing the page)). The example illustrated in FIG. 14 illustrates an example of a state in which a person is out of focus and a peripheral region to the person (for example, a tree) is out of focus. The example illustrated in FIG. 15 illustrates a state in which a tree is in focus, and a peripheral region to the tree (for example a person) is out of focus.

However, in a focusing determination method utilizing a split-image, determination by sight as to whether or not the displacement has been eliminated needs to be performed while visually checking continuously moving image displacement, so that time is required to perform focusing. A focusing determination method utilizing focus peaking is a known focusing determination method other than focusing determination methods utilizing a split-image. In a focusing determination method utilizing focus peaking, determination as to whether or not there is a high contrast region (whether or not there is a region with a specific contrast or greater) can be performed in a shorter time than in a focusing determination method utilizing a split-image. However, due to all high contrast regions being displayed with emphasis, there is a concern that a user might mis-determine a high contrast region that is not in an in-focus state as being in an in-focus state.

Figure 16:
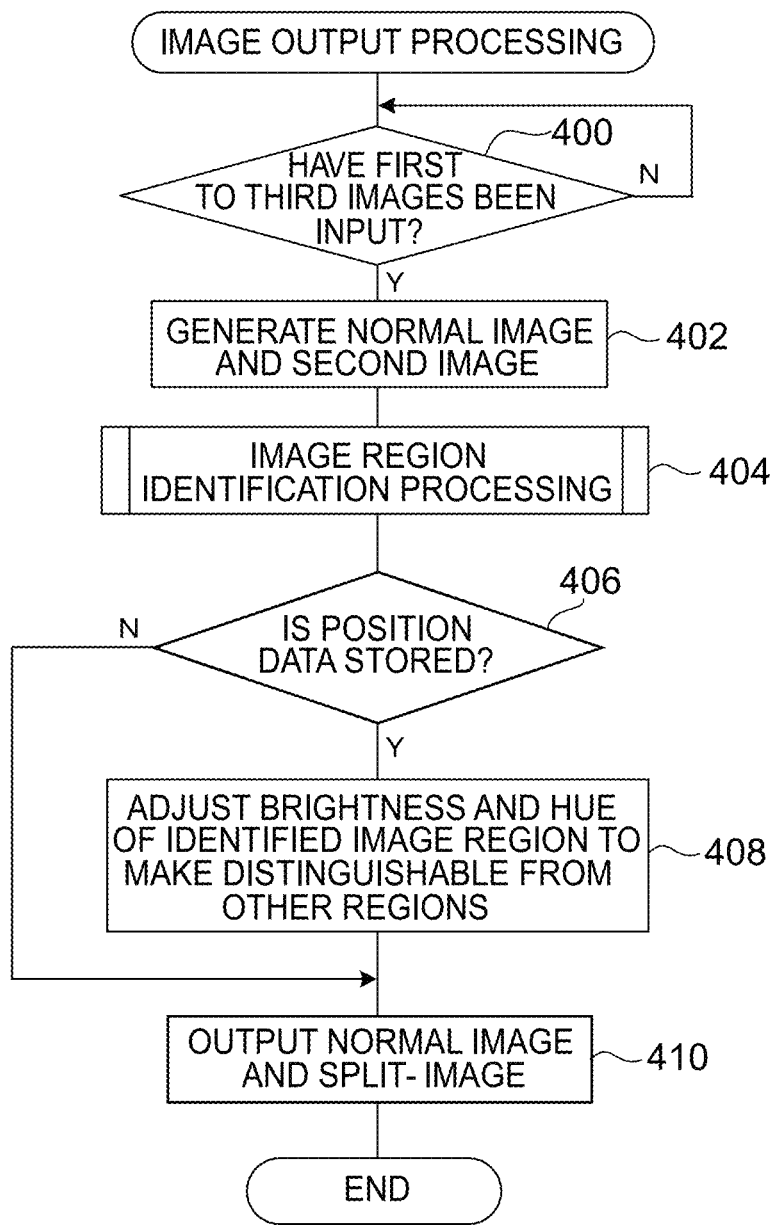
FIG. 16 is a flow chart illustrating an example of a flow of image output processing according to the first exemplary embodiment.

In the imaging device 100 according to the first exemplary embodiment, when in manual focus mode, the image processor 28 performs image output processing of the example illustrated in FIG. 16. Explanation next follows regarding the image output processing performed by the image processor 28 in manual focus mode, with reference to FIG. 16. In the following an example is given of a case in which the image processor 28 performs the image output processing, however the present invention is not limited thereto, and, for example, the CPU 12 may perform the image output processing in the imaging device 100 by executing an image output processing program.

In the image output processing illustrated in FIG. 16, first, at step 400, determination is made as to whether or not the first to third images have been input by the generation section 28B. Negative determination is made at step 400 in cases in which the first to third images have not been input, and the determination of step 400 is performed again. Affirmative determination is made at step 400 in cases in which the first to third images have been input, and processing proceeds to step 402.

At step 402, a normal image is generated by the generation section 28B based on the third image input at step 400. At step 402, a left eye image and a right eye image are also generated by the generation section 28B based on the first and second images input at step 400, and a split-image is generated based on the generated left eye image and right eye image.

Figure 17:
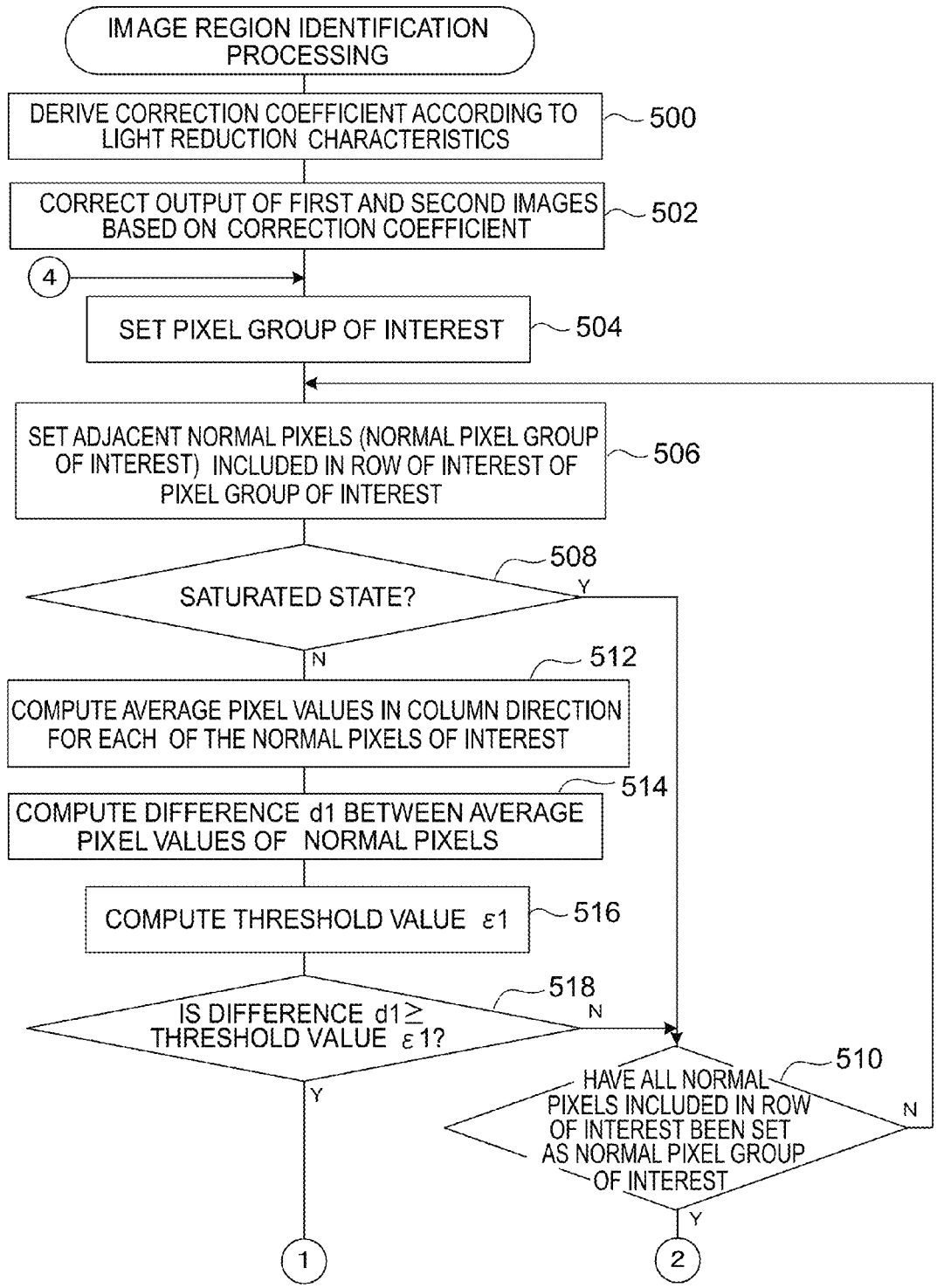
FIG. 17 is a flowchart illustrating an example of a flow of image region identification processing according to the first exemplary embodiment.
Figure 18:
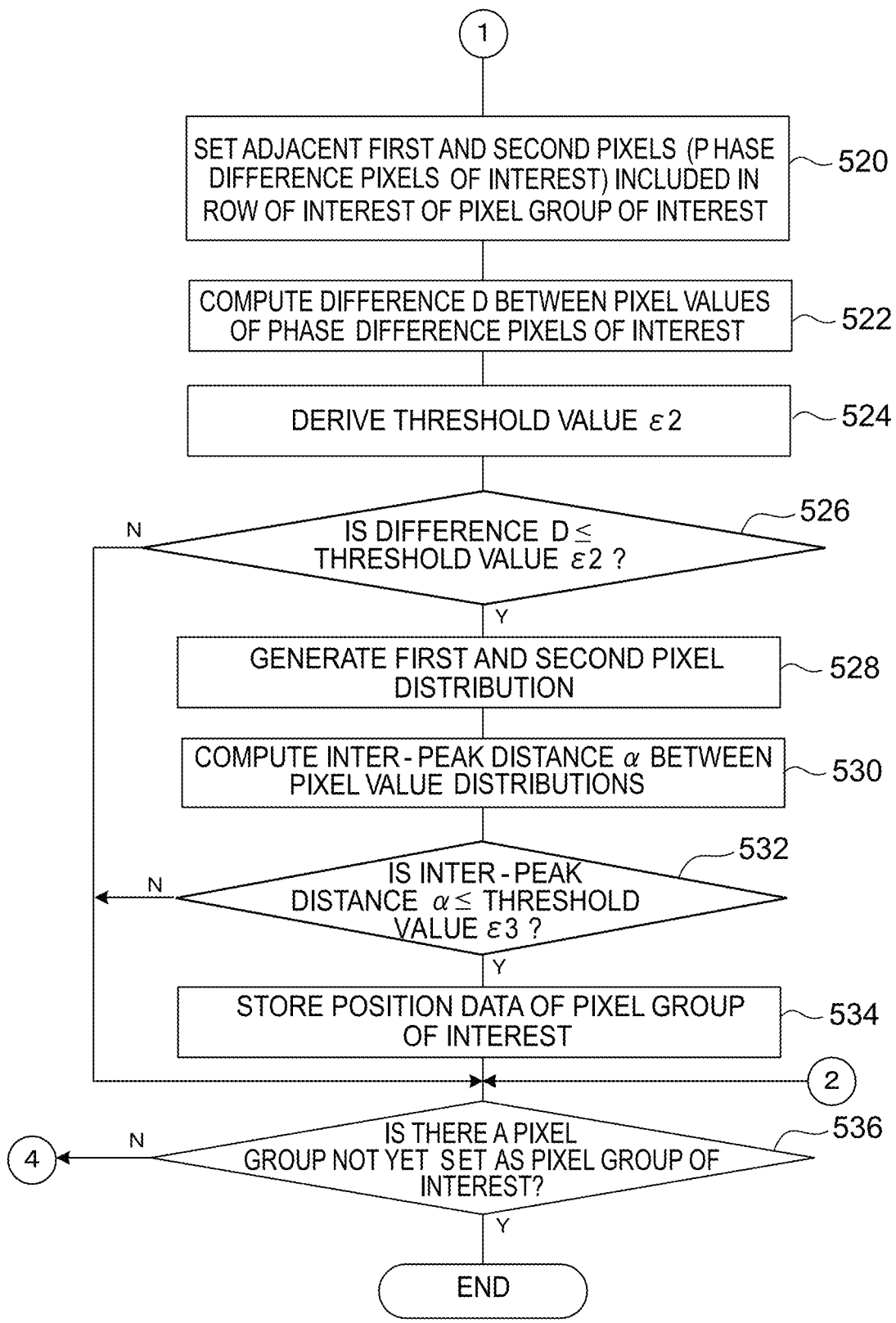
FIG. 18 is continuation of the flow chart illustrated in FIG. 17.

At the next step 404, the image region identification processing illustrated in the example of FIG. 17 and FIG. 18 is performed by the correction section 28A and the identification section 28C (processing to identify image regions corresponding to where both the first condition and the second condition are satisfied between pixels), then processing proceeds to step 406.

Figure 19:
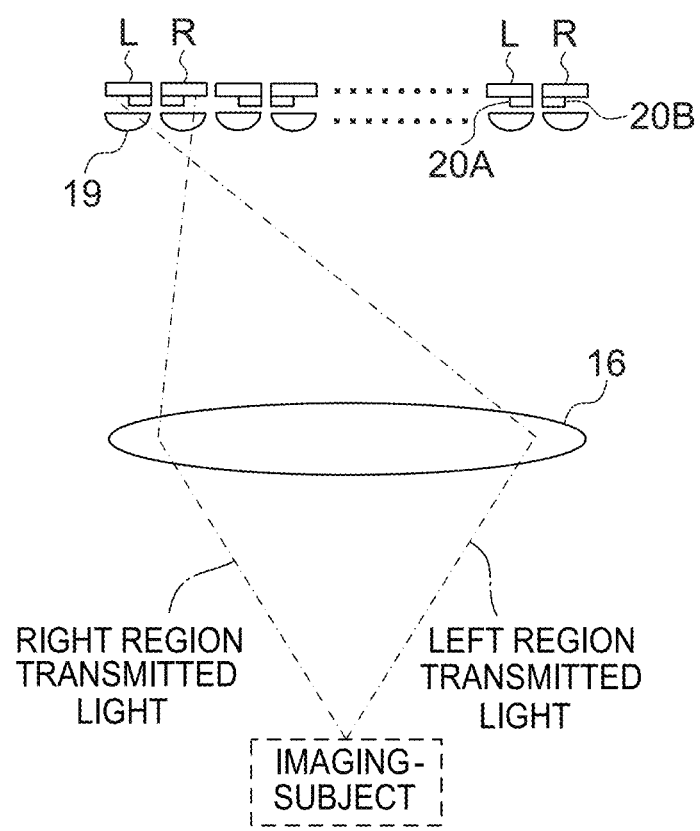
FIG. 19 is an explanatory diagram to accompany explanation of the principles of light reduction characteristics of left region transmitted light and right region transmitted light (an example of paths of light rays respectively incident to first and second pixels)
Figure 20:
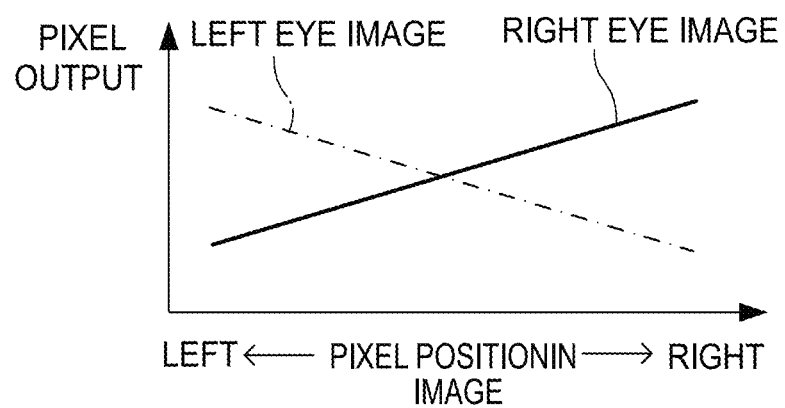
FIG. 20 is a graph illustrating an example of the effect imparted by linear light reduction characteristics in the pupil division direction to the output of each pixel in a direction equivalent to the pupil division direction in a left eye image and a right eye image.

As illustrated in the example in FIG. 19, in the imaging device 100, the left region transmitted light that has passed through the imaging lenses 16 during imaging a subject, pass through the microlenses 19 corresponding to first pixels L and are incident to the first pixels L. However, the left region transmitted light that passes through the microlens 19 corresponding to the second pixels R, is blocked by the light-blocking members 20B1, and so is not incident to the second pixels R. The right region transmitted light that has passed through the imaging lenses 16, passes through the microlenses 19 corresponding to the second pixels R and is incident to the second pixels R. However, the right region transmitted light that passes through the microlenses 19 corresponding to the first pixels L is blocked by the light-blocking members 20A1, and so is not incident to the first pixels L. Thus by placing the light-blocking members over half portions of the pixels, the respective centers of the left region transmitted light and the right region transmitted light are displaced from the optical path of the imaging lenses 16, and the light reduction characteristics for each of the first pixel group and the second pixel group change linearly according to pixel position in the pupil division direction. The change in light reduction characteristics appears as a change in output in the left eye image and the right eye image. Namely, in a case in which light is incident to the imaging lenses 16 at a uniform amount from straight in front, the output in the left-right direction (the direction corresponding to the pupil division direction) of the obtained left eye image and right eye image changes linearly according to pixel position. For example, as illustrated in FIG. 20, in the left eye image, the output is less the further the pixel position is toward the right, and in the right eye image, the output is less the further the pixel position is toward the left. The substantially linear change in opposite directions, to the left or to the right, in the output of the left eye image and the right eye image also affects the image quality of the split-image.

In the image region identification processing illustrated in FIG. 17, first, at step 500, the correction section 28A derives a correction coefficient according to light reduction characteristics as a correction coefficient to correct output of the first image and second image input at step 400. The correction coefficient here is, for example, derived based on a correction straight line. The correction straight line indicates, for example, a first order function so as to minimize the sum of squares of distance between a regression line for the output of plural pixels included in one particular row, and a target sensitivity ratio (for example, 1.0), and a dependent variable of the correction straight line is employed as the correction coefficient. The correction coefficient is not limited thereto, and a default value obtained in advance by experimentation using an actual device or by simulation etc. (a correction coefficient to pre-cancel out predicted light reduction characteristics) may be employed. Although an example is given here of a case in which outputs of the first image and the second image are corrected, there is no limitation thereto, and configuration may be made such that the sensitivity of the first pixels L and the second pixels R are corrected.

At the next step 502, the correction section 28A corrects the outputs of the first image and the second image based on the correction coefficient derived at step 500. As illustrated as an example in FIG. 21, the linear change in output of the first image and the second image caused by linear sensitivity change in the pixels along the pupil division direction in the respective first and second pixel groups is thereby reduced in comparison to cases in which no correction is performed based on the correction coefficient.

Figure 22:
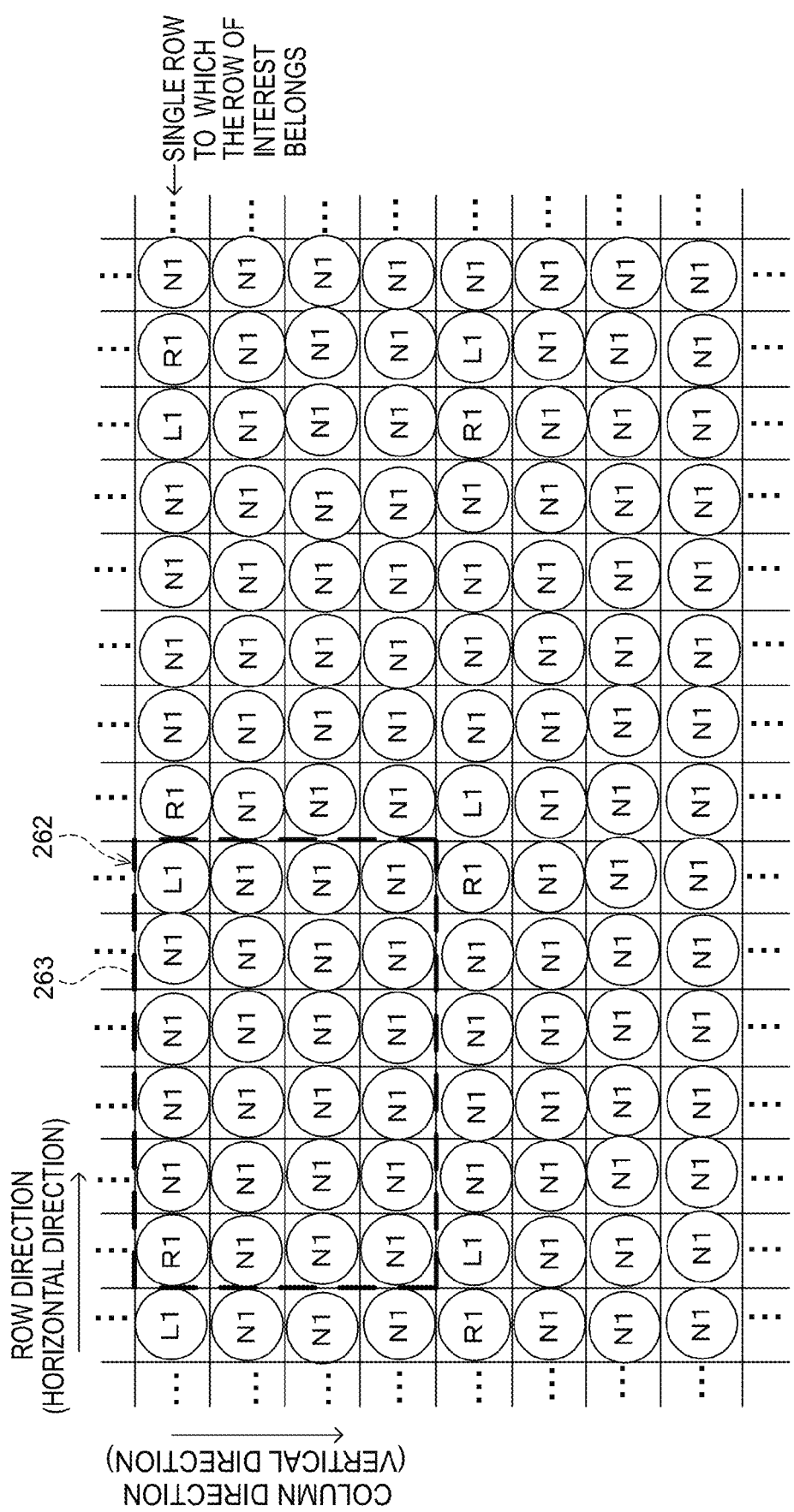
FIG. 22 is a schematic layout diagram illustrating an example of placement of pixels (first pixels, second pixels, and normal pixels) included in a processing target image generated by the image output processing according to the first exemplary embodiment.

At the next step 504, the identification section 28C sets a pixel group (pixel group of interest) 262 to be subjected to processing, such as the example illustrated in FIG. 22, from out of all the pixels included in the first to third images input at step 400.

For convenience of explanation, the first to third images will be referred to collectively as a "processing target image" hereafter in cases in which it is not necessary to distinguish between the first to third images input at step 400. For convenience of explanation, the pixels at positions on the image pick-up device 20 corresponding to the positions of the first pixels L from out of the pixels included in the processing target image will be referred to as first pixels L1 hereafter. The pixels at positions on the image pick-up device 20 corresponding to the positions of the second pixels R from out of the pixels included in the processing target image will be referred to as second pixels R1 hereafter. The pixels at positions on the image pick-up device 20 corresponding to the positions of the normal pixels N from out of the pixels included in the processing target image will be referred to as normal pixels N1 hereafter. In the first exemplary embodiment, the first to third images input at step 400 are the processing target image, however there is no limitation thereto, and partial images from out of the first to third images input at step 400 may be employed as the processing target image. For example, the image at positions corresponding to the position of the split-image display region in the first to third images input at step 400 may be employed as the processing target image, or the image at positions corresponding to the position of a partial region of the split-image display region in the first to third images input at step 400 may be employed as the processing target image. In such cases, the time required for processing can be shortened in comparison to cases in which processing is performed on an entire screen image.

The pixel group of interest 262 indicates, for example, a pixel group that has not yet been subject to the processing of step 506 to step 534, described later, from out of all the pixels included in the processing target image. For example, in the first exemplary embodiment, the pixel group of interest 262 is determined by a pixel group of interest stipulation frame 263 as illustrated in the example in FIG. 22. The pixel group of interest stipulation frame 263 illustrated in FIG. 22 is a rectangular frame segmented into 4×6 division regions (division regions of size corresponding to the size of a single pixel). In the example illustrated in FIG. 22, the first pixel L1 corresponding to the first pixel L included in the first pixel row 150 (the first pixel L included in one group out of a pair of adjacent first pixel groups) is positioned at the division region at the top right corner facing the page. The second pixel R1 corresponding to the second pixel R included in the first pixel row 150 (the second pixel R included in another group out of a pair of adjacent first pixel groups) is positioned at the division region at the top left corner facing the page. The normal pixels N1 corresponding to normal pixels N included in the first pixel rows 150 and the third pixel rows 154 are positioned at each of the remaining division regions of the pixel group of interest stipulation frame 263.

At the next step 506, the identification section 28C sets adjacent normal pixels N1 included in the row of interest of the pixel group of interest 262 set at step 504 (referred to below as the "normal pixel group of interest"), as illustrated as an example in FIG. 23. The row of interest of the pixel group of interest 262 indicates, for example, a row included in the pixel group of interest 262 set at step 504 to which phase difference pixels belong. The normal pixel group of interest includes the normal pixels N1 that have not yet been subject to the processing of step 508 to 518, described later, and indicates two adjacent normal pixels N1 disposed between the first pixel L1 and the second pixel R1 included in the row of interest.

At the next step 508, the identification section 28C determines whether or not the output from any of the normal pixels N1 included in the normal pixel group of interest set at step 506 is in a saturated state (for example, whether the output is in a state that has reached the maximum value). Affirmative determination is made at step 508 in cases in which the output of any of the normal pixels N1 included in the normal pixel group of interest set at step 506 is in a saturated state, and processing proceeds to step 510. Negative determination is made at step 508 in cases in which the outputs of all of the normal pixels N1 included in the normal pixel group of interest set at step 506 are not in a saturated state, and processing proceeds to step 512.

At step 510, the identification section 28C determines whether or not all the normal pixels N1 included in the row of interest of the pixel group of interest 262 set at step 504 have been set as the normal pixel group of interest. Affirmative determination is made at step 510 in cases in which all of the normal pixels N1 included in the row of interest in the pixel group of interest 262 set at step 504 have been set as the normal pixel group of interest, and processing proceeds to step 536. Negative determination is made at step 510 in cases in which not all of the normal pixels N1 included in the row of interest in the pixel group of interest 262 set at step 504 have been set as the normal pixel group of interest, and processing proceeds to step 506.

At step 512, the identification section 28C calculates an average value of the pixel values in the column direction for each of the normal pixels N1 included in the normal pixel group of interest set at step 506 (also referred to below as "average pixel value". In the example illustrated in FIG. 23, one of the adjacent normal pixels N1 included in the normal pixel group of interest belongs to a row A, and the other belongs to row B, so the average pixel value of the normal pixels N1 belonging to the row A in the pixel group of interest 262, and the average pixel value of the normal pixels N1 belonging to the row B, are computed.

At the next step 514, the identification section 28C computes a difference (for example, absolute value difference) d1 between the average pixel values of the normal pixels N1 included in the normal pixel group of interest set at step 506 (the average pixel values computed at step 512), then processing proceeds to step 516.

Figure 10:
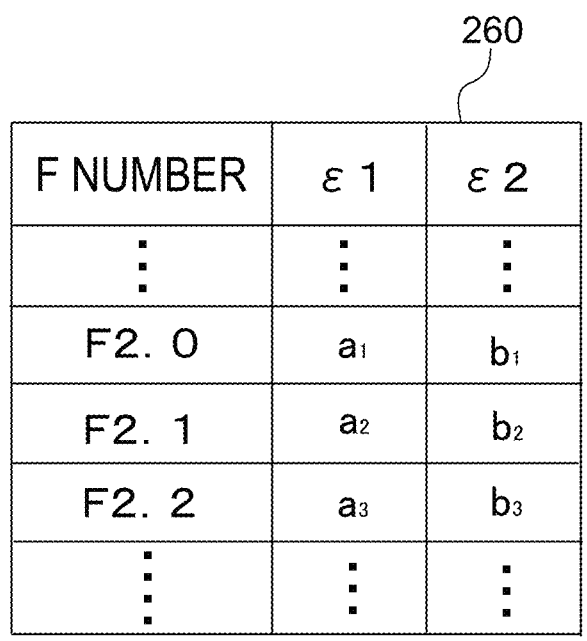
FIG. 10 is a schematic diagram illustrating an example of a configuration of a threshold value derivation table employed by an identification section included in the image processing section illustrated in FIG. 8.

At step 516, the threshold value derivation table 260 illustrated as an example in FIG. 10 is employed by the identification section 28C to derive the threshold value $\epsilon1$ corresponding to the currently set F number, and then processing proceeds to step 518.

At step 518, the identification section 28C determines whether or not the difference d1 computed at step 514 is the threshold value $\epsilon1$ derived at step 516 or greater. Negative determination is made at step 518 in cases in which the difference d1 computed at step 514 is less than the threshold value $\epsilon1$ computed at step 516, and processing proceeds to step 510. Affirmative determination is made at step 518 in cases in which the difference d1 computed at step 514 is the threshold value $\epsilon1$ computed at step 516 or greater, and processing proceeds to step 520.

Figure 23:
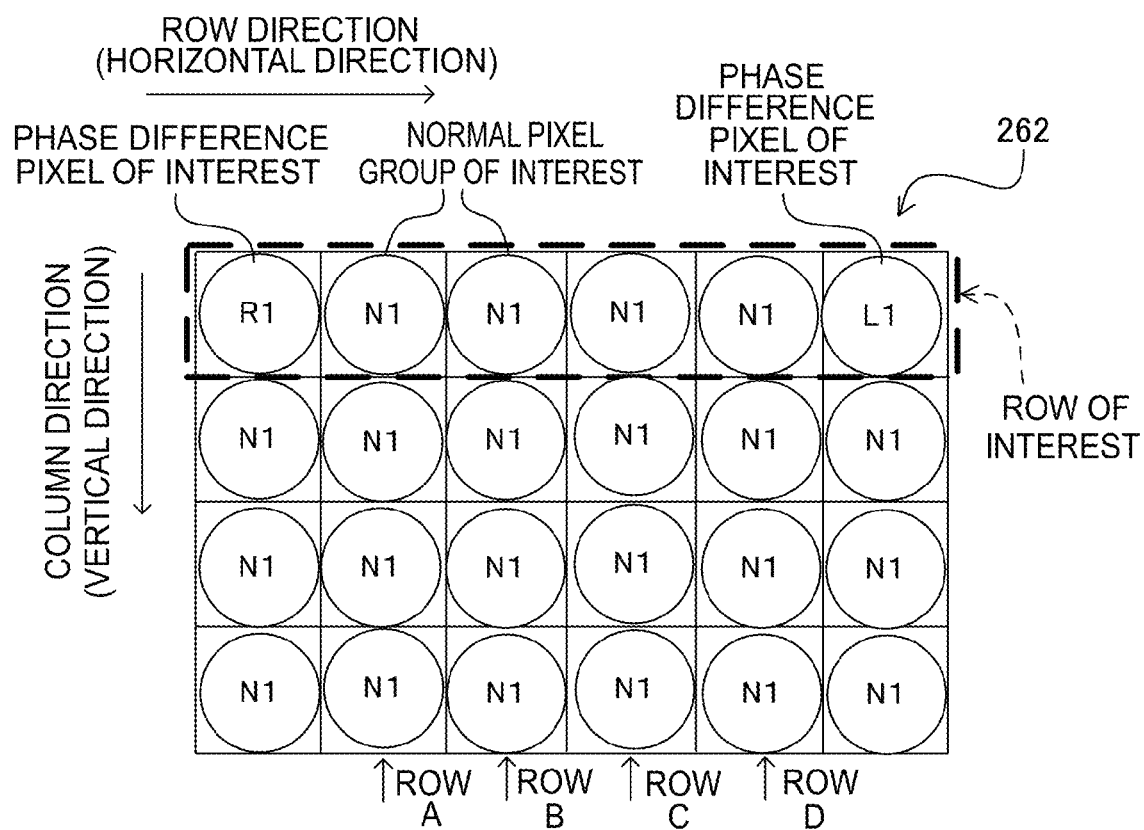
FIG. 23 is a schematic diagram illustrating an example of a configuration of a pixel group of interest set by image region identification processing according to the first exemplary embodiment.

At step 520, as illustrated in the example of FIG. 23, the identification section 28C sets a pair of phase difference pixels of interest included in the row of interest of the pixel group of interest 262 set at step 504. The phase difference pixels of interest indicates the first pixel L1 and the second pixel R1 included in the row of interest in the pixel group of interest 262 positioned at the two ends thereof. Note that in the following reference is made to the "phase difference pixels of interest" when there is no need to discriminate between the first pixel L1 and the second pixel R1.

At step 522, a difference D is computed by the identification section 28C between the pixel values of the pair of phase difference pixels of interest set at step 520 (between the corrected pixel values of the phase difference pixels in the left eye image and the right eye image output at step 502), then processing proceeds to step 524.

At the next step 524, the threshold value derivation table 260 illustrated as an example in FIG. 10 is employed by the identification section 28C to derive the threshold value $\epsilon2$ corresponding to the currently set F number, then processing proceeds to step 526.

At step 526, the identification section 28C determines whether or not the difference D computed at step 522 is the threshold value $\epsilon2$ computed at step 524 or lower. Negative determination is made at step 526 in cases in which the difference D computed at step 522 exceeds the threshold value $\epsilon2$ computed at step 524, and processing proceeds to step 536. Affirmative determination is made at step 526 in cases in which the difference D computed at step 522 is the threshold value $\epsilon2$ computed at step 524 or lower, and processing proceeds to step 528.

Figure 24:
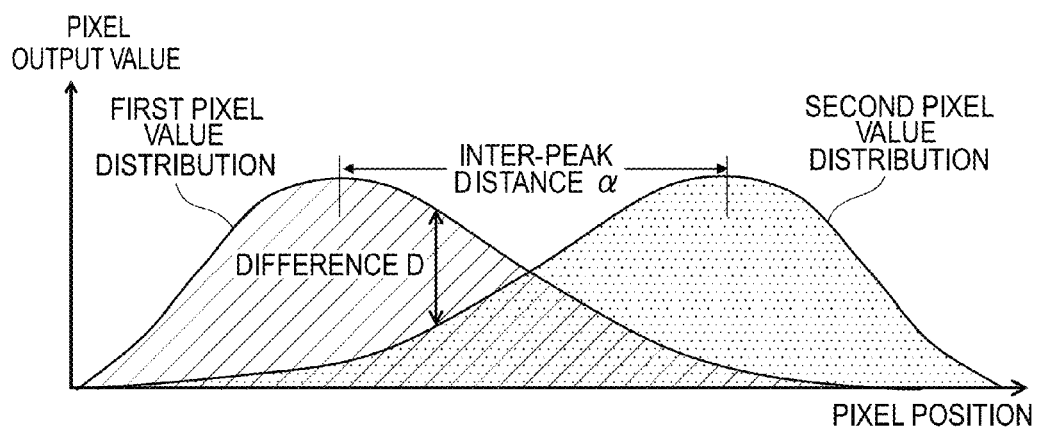
FIG. 24 is a graph illustrating an example of a first and second pixel value distribution generated by image region identification processing according to the first exemplary embodiment (in an unfocused state)

At step 528, the identification section 28C generates a first pixel value distribution and a second pixel value distribution as illustrated as an example in FIG. 24. The first pixel value distribution indicates a distribution of pixel values in all of the first pixels L1 included in a single row to which the row of interest belongs, illustrated as an example in FIG. 22 (for example, the single row corresponding to the first pixel row 150). The second pixel value distribution indicates a distribution of pixel values in all of the second pixels R1 included in a single row to which the row of interest belongs.

At the next step 530, the identification section 28C computes a distance (inter-peak distance) $\alpha$ between the peak in the first pixel value distribution and the peak in the second pixel value distribution generated at step 528 as illustrated in the example of FIG. 24, then processing proceeds to step 532. The inter-peak distance a indicates, for example, a distance between pixels having the maximum value of signal level in the pupil division direction (the parallax generation direction), namely the phase difference (or a physical quantity equivalent to the phase difference).

At step 532, the identification section 28C determines whether or not the inter-peak distance a computed at step 530 is the threshold value $\epsilon3$ or lower. A value equivalent to twice the distance between phase difference pixels included in the row of interest in the pixel group of interest 262 illustrated in FIG. 23 is employed here as the threshold value $\epsilon3$; however, obviously another value may be employed therefor, or a value stipulated by a user may be employed.

Figure 25:
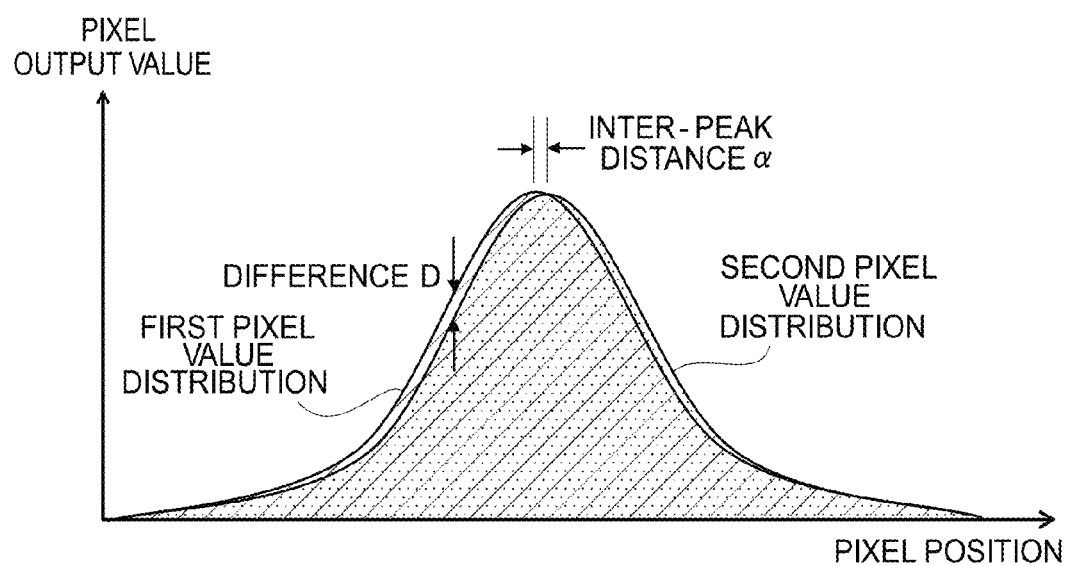
FIG. 25 is a graph illustrating an example of a first and second pixel value distribution generated by image region identification processing according to the first exemplary embodiment (in a focused state)

At step 532, negative determination is made in cases in which the inter-peak distance a computed at step 530 exceeds the threshold value $\epsilon3$ (for example, in the case of the first pixel value distribution and the second pixel value distribution illustrated in FIG. 24), and processing proceeds to step 536. Affirmative determination is made at step 532 in cases in which the inter-peak distance a computed at step 530 is the threshold value $\epsilon3$ or lower (for example, in the case of the first pixel value distribution and the second pixel value distribution illustrated in FIG. 25), and processing proceeds to step 534.

At step 534, position data indicating the position of the pixel group of interest 262 set at step 504 (for example, two dimensional coordinates capable of identifying a position within the processing target image) are stored by the identification section 28C in a specific storage region (for example, the memory 26).

At the next step 536, the identification section 28C determines whether or not there are no pixel groups present in all the pixels included in the processing target image that have not been set as the pixel group of interest 262. Negative determination is made at step 536 in cases in which there is a pixel group present in all the pixels included in the processing target image that has not been set as the pixel group of interest 262, and processing transitions to step 504. Affirmative determination is made at step 536 in cases in which there are no pixel groups present in all the pixels included in the processing target image that have not been set as the pixel group of interest 262, and the present image region identification processing is ended.

Returning to FIG. 16, at step 406, the identification section 28C determines whether or not there is position data stored in the specific storage region (whether or not position data was stored in the specific storage region at step 534). Negative determination is made at step 406 in cases in which there is no position data stored in the specific storage region, and processing proceeds to step 410. Affirmative determination is made at step 406 in cases in which there is position data stored in the specific storage region, and processing proceeds to step 408.

At step 408, the brightness and hue (or the brightness or hue) of an identified image region (an example of an image region according to the present invention) are adjusted by the identification section 28C so as to enable the identified image region to be distinguishable from other regions in the split-image generated at step 402. The identified image region here indicates, for example, a region included in the split-image from out of the image region (the region corresponding to the pixel group of interest 262) represented by the position data stored in the specific storage region (position data stored in the specific storage region at step 534).

At the next step 410, the normal image and split-image generated at step 402, or the split-image with the identified image region adjusted in brightness and hue at step 408 and the normal image generated at step 402, are output to the display controller 36 by the identification section 28C. The display controller 36 thereby performs control to continuously display the normal image on the display device as a video image, and to continuously display the split-image within the display region of the normal image as a video image. In response thereto, the display device displays a live-view image.

Figure 26:
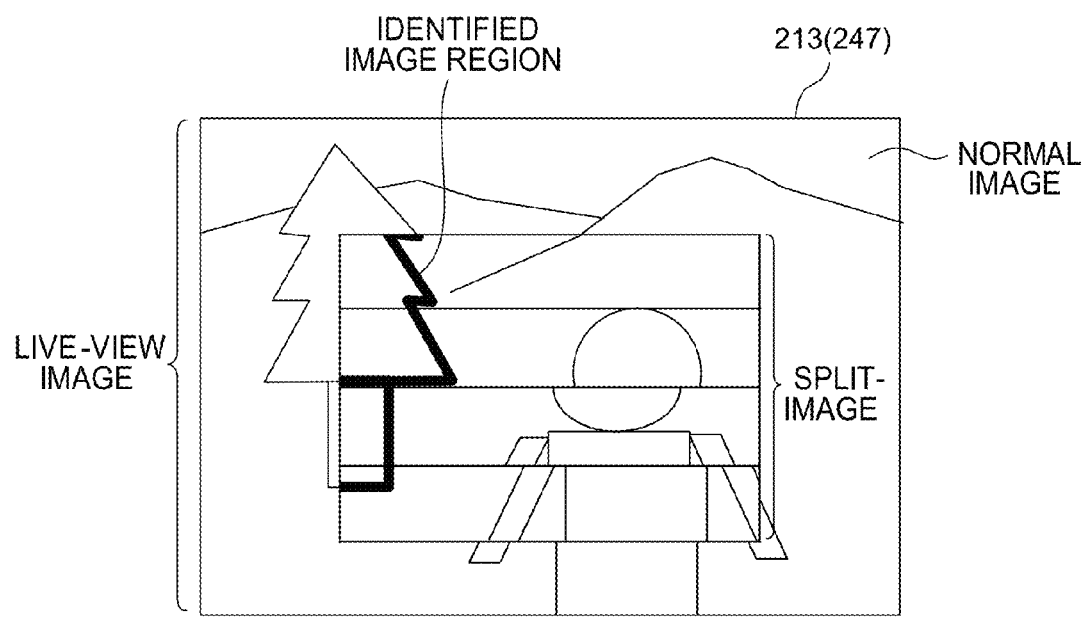
FIG. 26 is a screen view illustrating an example of a screen when a processing target image output by image output processing according to the first exemplary embodiment is displayed by a display section.

When input with the split-image, with identified image region adjusted in brightness and hue at step 408, and the normal image generated at step 402, the display controller 36 performs control to display the identified image region on the display device so as to be distinguishable from other regions. As illustrated in the example in FIG. 26, the display device thereby displays the identified image region so as to be distinguishable from the other regions in the live view image (emphatic display (peaking)). Examples of the method by which the identified image region is displayed distinguishable from the other regions include a method that raises the output of the identified image region to a maximum value, and a method that displays the identified image region in a predetermined special color. In the example illustrated in FIG. 26, the bold line region in the split-image corresponds to the identified image region. The screen region inside the frame stipulated by the outline of the identified image region as illustrated in FIG. 26 (the region surrounded by the outline of the identified image region and the outer frame of the split-image in the example illustrated in FIG. 26) may be displayed as a patch pattern distinguishable from the region outside the frame.

As explained above, in the imaging device 100 according to the first exemplary embodiment, the identification section 28C identifies an image region (the identified image region) in which both a first condition of the difference d1 being $\epsilon 1$ or greater, and a second condition of the difference D being the threshold value $\epsilon 2$ or lower, are satisfied. The normal image and the split-image are displayed by the display device, and the identified image region is displayed in the split-image so as to be distinguishable from the other regions. Thus the imaging device 100 according to the first exemplary embodiment is capable of making visual checking of whether or not an in focus state has been achieved easier than in cases lacking the present configuration.

In the imaging device 100 according to the first exemplary embodiment the difference d1 is determined based on the pixel values of the normal pixels N1. The imaging device 100 according to the first exemplary embodiment is accordingly capable of identifying an image region satisfying the first condition (that the difference d1 is $\geq$ the threshold value $\epsilon 1$) at higher precision than in cases in which the difference d1 is determined without employing the pixel values of the normal pixels N1.

Moreover, in the imaging device 100 according to the first exemplary embodiment, the difference d1 is determined based on the pixel values of the normal pixels N1 disposed between the first pixel L1 and the second pixel R1. The imaging device 100 according to the first exemplary embodiment is accordingly capable of identifying the image region satisfying the first condition at higher precision than in cases in which the difference d1 is determined without employing the pixel values of the normal pixels N1 disposed between the first pixel L1 and the second pixel R1.

Moreover, in the imaging device 100 according to the first exemplary embodiment, the difference d1 is determined based on the average pixel values of specific pixels (4 pixels in the example illustrated in FIG. 22) worth in the column direction of the normal pixels N1. The imaging device 100 according to the first exemplary embodiment is accordingly capable of identifying the image region satisfying the first condition at higher precision than in cases not configured to determine the difference d1 based on the average pixel values.

Moreover, in the imaging device 100 according to the first exemplary embodiment, the magnitude of the contrast is determined based on the normal pixels N1 in a non-saturated state. The imaging device 100 according to the first exemplary embodiment is accordingly capable of suppressing mis-identification of the image region that possibly occurs in cases in which saturated state pixels are included compared to cases lacking the present configuration.

In the imaging device 100 according to the first exemplary embodiment, the correction coefficient is derived according to the light reduction characteristics, and the difference D is computed based on the left eye image and the right eye image that have been corrected using the derived correction coefficient. The imaging device 100 according to the first exemplary embodiment is accordingly capable of suppressing mis-identification of the identified image region caused by light reduction characteristics compared to cases lacking the present configuration.

In the imaging device 100 according to the first exemplary embodiment, an image region satisfying the second condition (difference D $\geq$ threshold value $\epsilon 2$) (for example, a region corresponding to the first pixels L and the second pixels R satisfying the second condition) is identified based on the inter-peak distance a. The imaging device 100 according to the first exemplary embodiment is accordingly capable of identifying the image region satisfying the second condition at higher precision than in cases lacking configuration to identify the image region where the second condition is satisfied based on the inter-peak distance $\alpha$.

Figure 27:
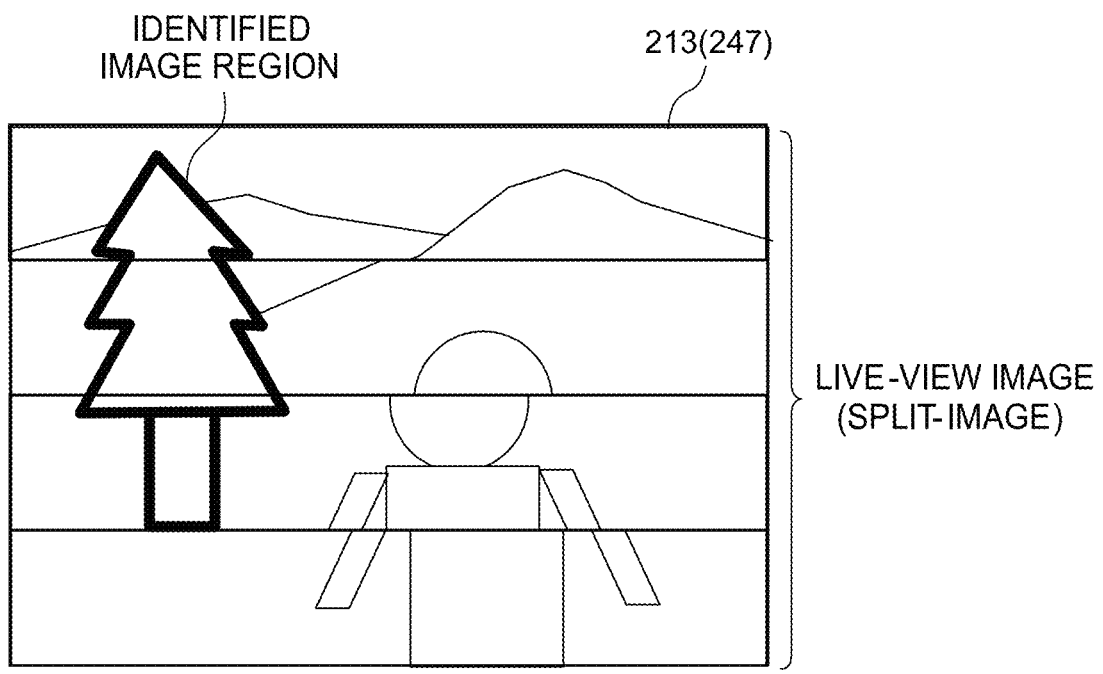
FIG. 27 is a screen view illustrating an example of a screen when a split-image within a processing target image output by image output processing according to the first exemplary embodiment is displayed by a display section.

In the first exemplary embodiment described above, explanation has been given of an example in which the split-image is displayed in a central portion of a screen of the display device in order to dispose plural phase difference pixels in a predetermined layout pattern in a central portion of the image pick-up device 20; however, the present invention is not limited thereto. In cases in which plural phase difference pixels are disposed in a predetermined layout pattern for all regions of the image pick-up device 20, as illustrated in the example of FIG. 27, the split-image may, for example, be displayed on the whole screen of the display device. Such cases enable, with a simple configuration, easier visual checking as to whether or not the in focus state has been achieved than in configuration in which both the normal image and the split-image are displayed.

Moreover, although an example has been given in the first exemplary embodiment of the image region identification processing illustrated in FIG. 18 in a case in which the inter-peak distance a between the first pixel value distribution and the second pixel value distribution is computed, the present invention is not limited thereto. For example, as illustrated in FIG. 28, steps 558, 560, 562 may be performed by the identification section 28C in place of steps 528, 530, 532 of the image region identification processing illustrated in FIG. 18.

Figure 28:
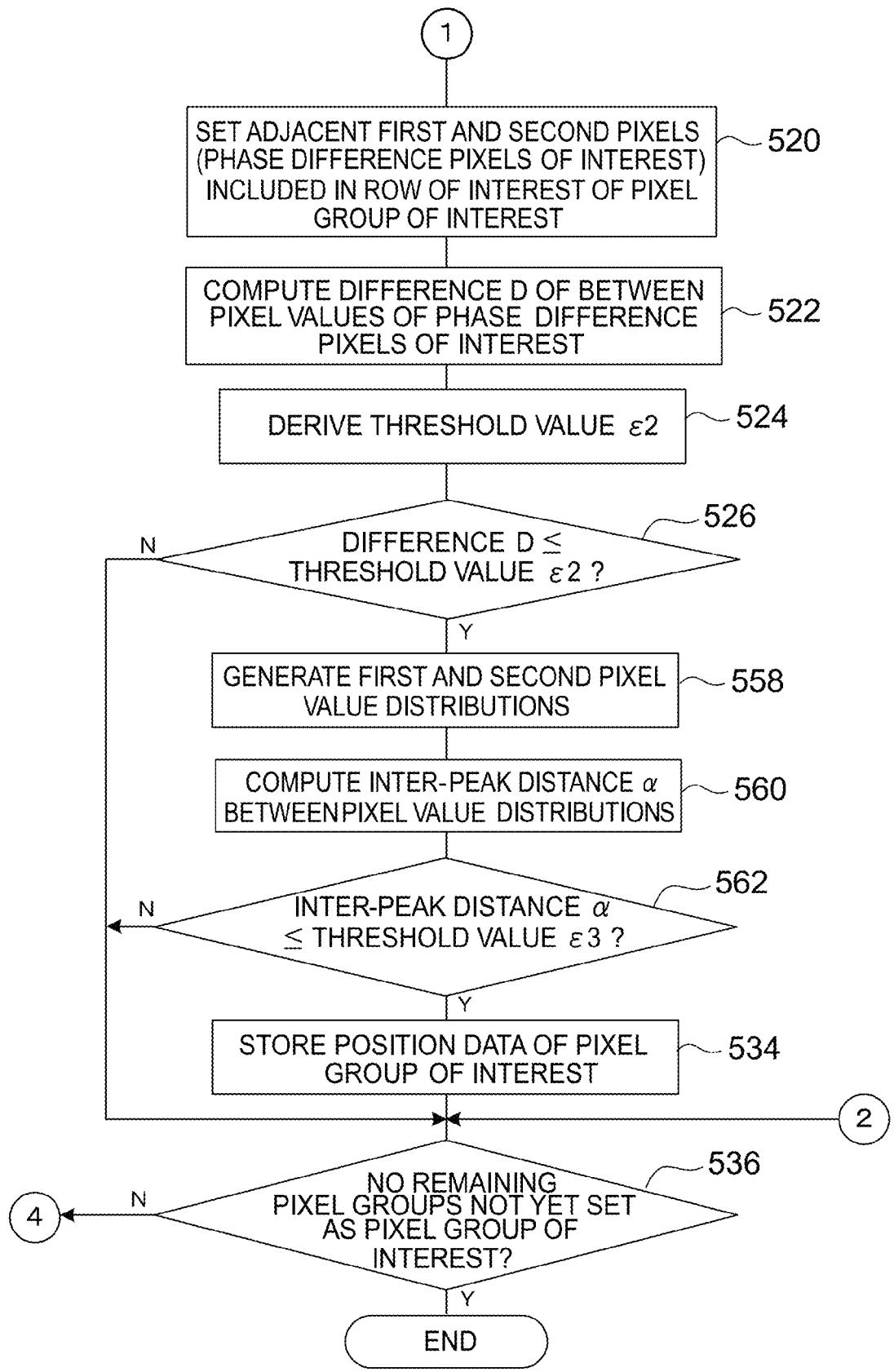
FIG. 28 is a flowchart illustrating a modified example of flow of image region identification processing according to the first exemplary embodiment.

In the image region identification processing illustrated in FIG. 28, at step 558, the identification section 28C differentiates the pixel values of each of the first pixels L and the second pixels R included in the single row to which the row of interest belongs with respect to position. Then at the next step 560, the identification section 28C computes a distance between the differential peak value for the first pixels L and the differential peak value for the second pixels R obtained by the differentiation of step 558 (inter-differential peak distance) β. Then at the next step 562, the identification section 28C determines whether or not the inter-differential peak distance β is a threshold value ∈4 (a value equivalent to the threshold value ∈2) or lower. Negative determination is made at step 562 in cases in which the inter-differential peak distance β exceeds the threshold value ∈4, and processing proceeds to step 536. Affirmative determination is made at step 562 in cases in which the inter-differential peak distance β is the threshold value ∈4 or lower, and processing proceeds to step 534.

The inter-differential peak distance β is equivalent to a value in which noise in the inter-peak distance a has been reduced, and so employing the inter-differential peak distance β enables the image region satisfying the second condition (for example, the region corresponding to the first pixels L and the second pixels R where the second condition is satisfied) to be identified with high precision.

In the first exemplary embodiment, an example has been given in which the image region identification processing incorporates the steps 528, 530, 532; however, the present invention is not limited thereto, and the steps 528, 530, 532 may be omitted from the image region identification processing illustrated in FIG. 18. In such cases an increase in image output processing speed can be expected. Moreover, the steps 522, 524, 526 may be omitted from the image region identification processing illustrated in FIG. 18. An increase in image output processing speed can also be expected in such cases.

In the first exemplary embodiment, an example has been given of a case in which the difference d1 between the average pixel values of the normal pixels N is computed; however, the present invention is not limited thereto. For example, a difference between a pair of normal pixels N1 included in the normal pixel group of interest may be computed. In such cases there is no need to determine the average of the pixel values, and so an increase in image output processing speed can be expected in such cases.

Moreover, in the first exemplary embodiment, explanation has been given of a case in which the pixel group of interest 262 is set in the image region identification processing illustrated in FIG. 17. However, there is no limitation thereto, and a pixel group of interest 262A as illustrated in FIG. 29, a pixel group of interest 262B as illustrated in FIG. 30, or a pixel group of interest 262C as illustrated in FIG. 31 may be set.

Figure 29:
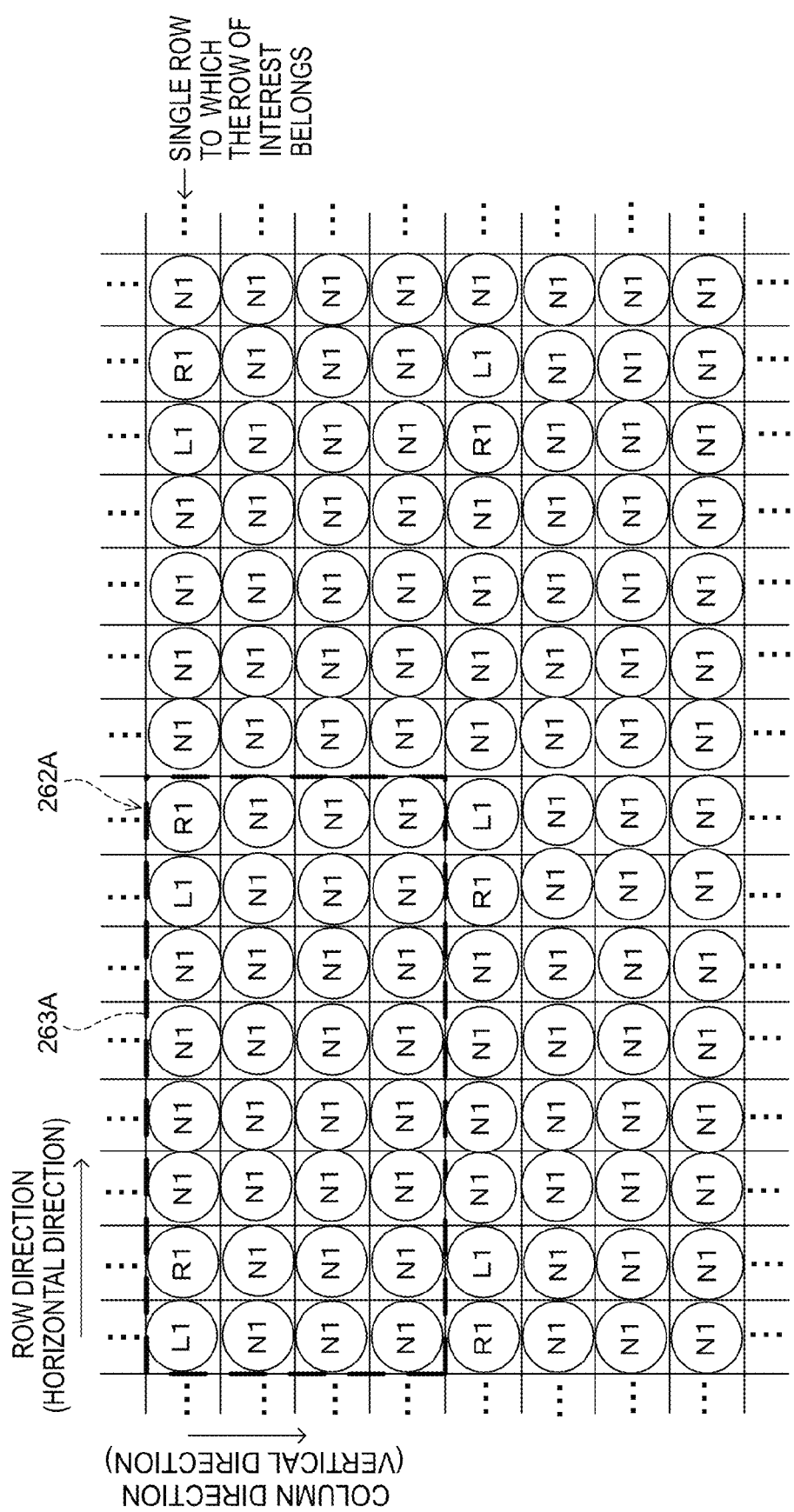
FIG. 29 is a schematic diagram illustrating a first modified example of a pixel group of interest set by image region identification processing according to the first exemplary embodiment.

The pixel group of interest 262A illustrated in FIG. 29 is stipulated by a pixel group of interest stipulation frame 263A. The pixel group of interest stipulation frame 263A is a rectangular frame segmented into 4×8 division regions, with first pixels L1 and second pixels R1 corresponding to the first pixel groups positioned at the division regions at the top right corner and the top left corner facing the page, and with normal pixels N1 positioned in the remaining division regions. In cases in which the pixel group of interest 262A illustrated in FIG. 29 is set by the image region identification processing, the first pixel L1 at the top left corner of the pixel group of interest 262A facing the page and the second pixel R1 at the top right corner of the pixel group of interest 262A facing the page are, for example, employed as the phase difference pixels of interest. The second pixel R1 adjacent to the first pixel L1 at the top left corner of the pixel group of interest 262A facing the page and the first pixel L1 adjacent to the second pixel R1 at the top right corner of the pixel group of interest 262A facing the page may also be employed as the phase difference pixels of interest.

In the example illustrated in FIG. 29, the phase difference pixels of interest are not limited to the first pixel L1 at the top left corner of the pixel group of interest 262A facing the page and the second pixel R1 at the top right corner of the pixel group of interest 262A facing the page, and any combination may be employed in which there is a pair of the first pixel L1 and the second pixel R1.

Figure 30:
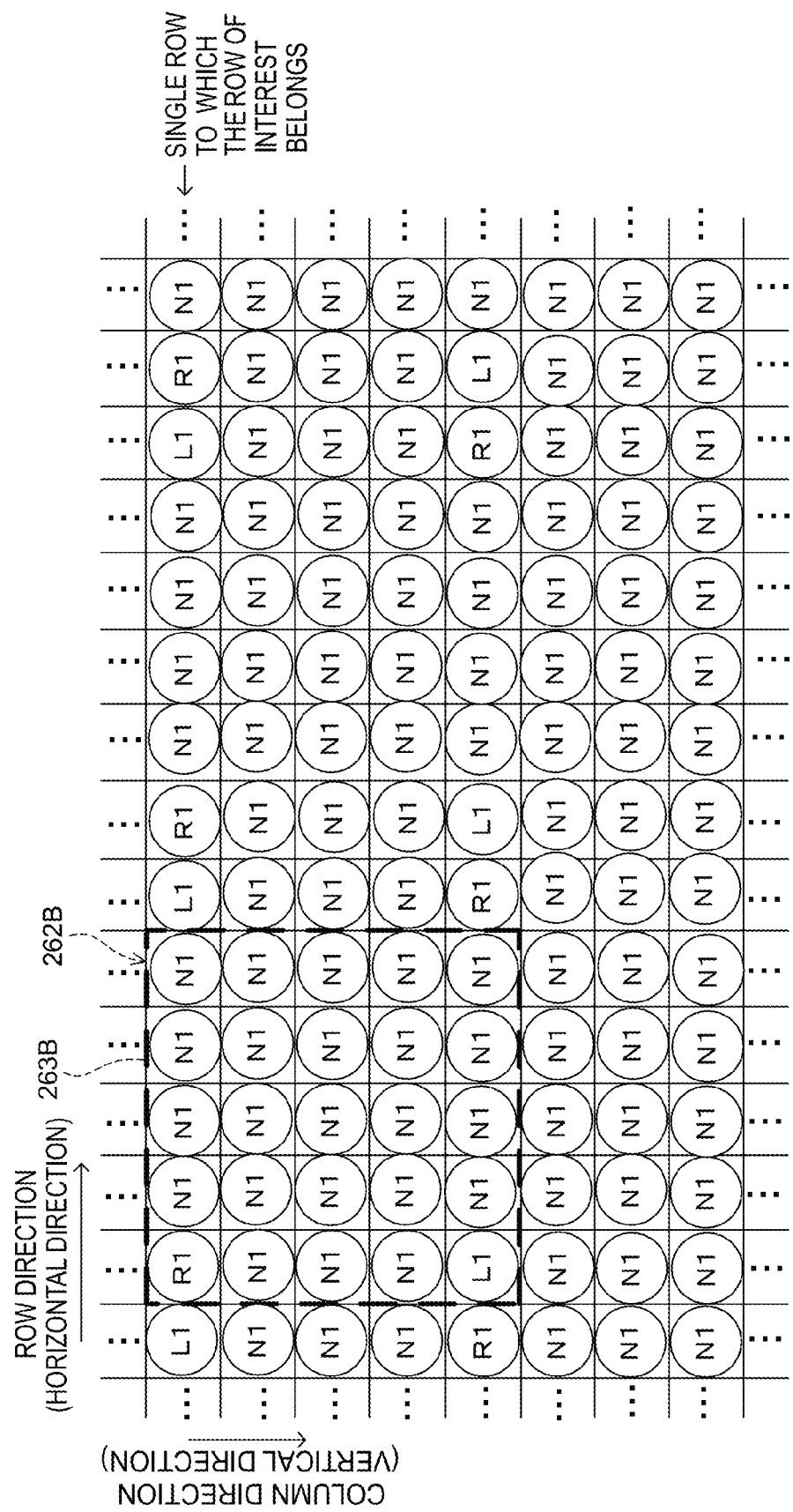
FIG. 30 is a schematic diagram illustrating a second modified example of a pixel group of interest set by image region identification processing according to the first exemplary embodiment.
Figure 31:
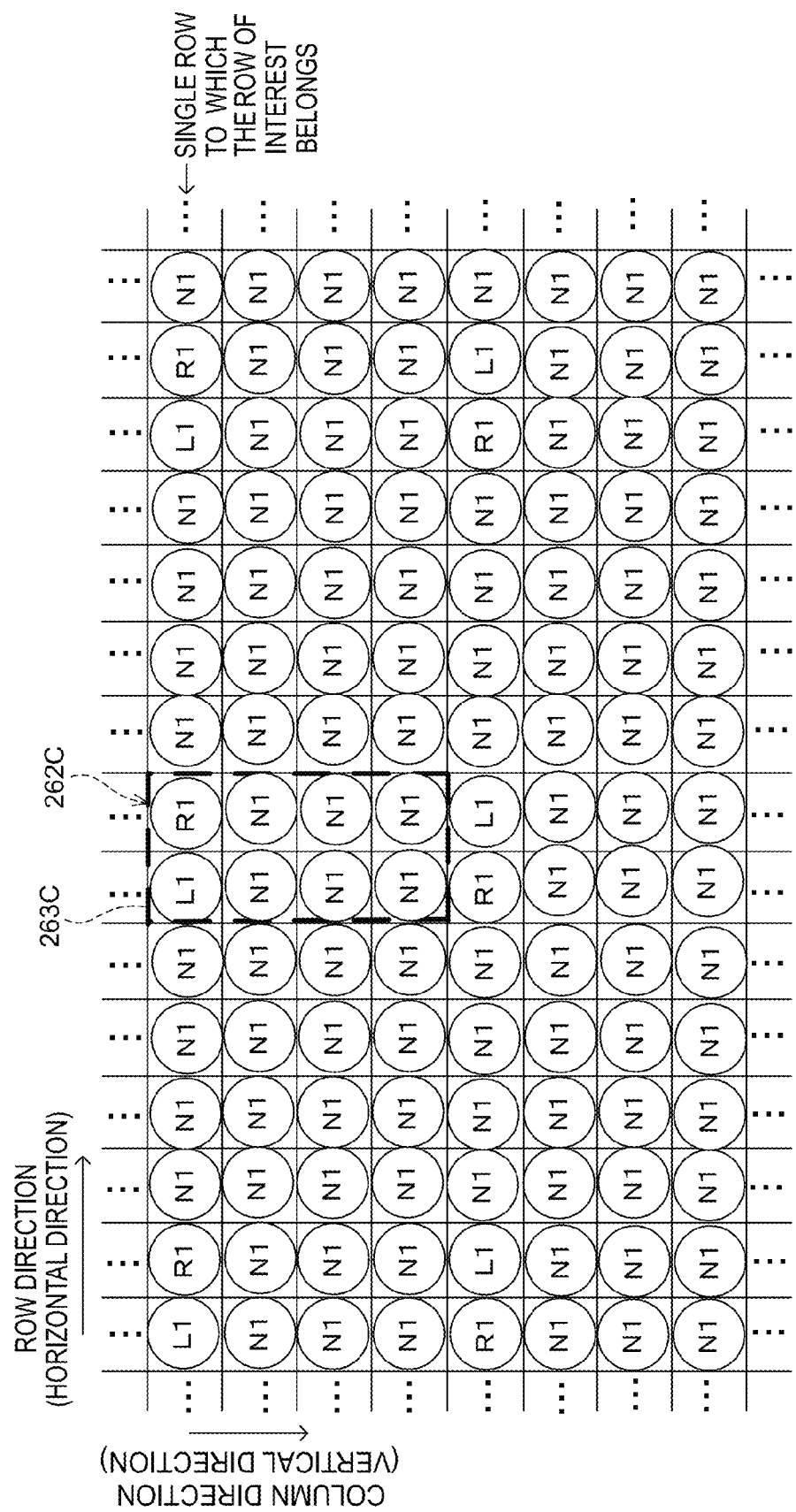
FIG. 31 is a schematic diagram illustrating a third modified example of a pixel group of interest set by image region identification processing according to the first exemplary embodiment.

The pixel group of interest 262B illustrated in FIG. 30 is stipulated by a pixel group of interest stipulation frame 263B. The pixel group of interest stipulation frame 263B is a rectangular frame segmented into 5×5 division regions, with a first pixel L1 positioned at the division region at the bottom left corner facing the page, a second pixel R1 positioned at the division region at the top left corner facing the page, and with normal pixels N1 positioned at the remaining division regions. In cases in which the pixel group of interest 262B illustrated in FIG. 30 is set by the image region identification processing, the second pixel R1 at the top left corner of the pixel group of interest 262B facing the page and the first pixel L1 at the bottom left corner of the pixel group of interest 262B facing the page are, for example, employed as the phase difference pixels of interest. A pair of adjacent normal pixels N1 included in the row of the pixel group of interest 262B to which the second pixel R1 belongs, or a pair of adjacent normal pixels N1 included in the row of the pixel group of interest 262B to which the first pixel L1 belongs may also, for example, be employed as the normal pixels of interest.

The pixel group of interest 262C illustrated in FIG. 31 is stipulated by a pixel group of interest stipulation frame 263C. The pixel group of interest stipulation frame 263C is a rectangular frame segmented into 4×2 division regions, with a first pixel L1 positioned at the division region at the top left corner facing the page, a second pixel R1 positioned at the division region at the top right corner facing the page, and with normal pixels N1 positioned at the remaining division regions. In cases in which the pixel group of interest 262C illustrated in FIG. 31 is set by the image region identification processing, the first pixel L1 at the top left corner of the pixel group of interest 262C facing the page and the second pixel R1 at the top right corner of the pixel group of interest 262C facing the page are, for example, employed as the phase difference pixels of interest. Moreover, a pair of normal pixels N1 adjacent to the first pixel L1 and the second pixel R1 in the pixel group of interest 262C may also, for example, be employed as the normal pixels of interest.

In the first exemplary embodiment, an example has been given of the image pick-up device 20 including the first to the third pixel groups; however, the present invention is not limited thereto, and an image pick-up device including only a first pixel group and a second pixel group may be employed. In such cases, generation of the normal image may be implemented by performing interpolation processing using pixels of the same color that mutually appear in the first image and the second image. Moreover, the first image or the second image may be employed as the normal image without performing interpolation processing. Computation of the difference d1 may be implemented using, for example, a pixel value obtained by adding together a pixel value of the first pixel L1 and a pixel value of the second pixel R1 instead of using the pixel values of the normal pixels N1. Such cases enable better detection of high spatial frequency regions than when the normal pixels N1 are employed. A pixel value of the first pixel L1 or a pixel value of the second pixel R1 may also be employed instead of the pixel value arrived at by adding together a pixel value of the first pixel L1 and a pixel value of the second pixel R1. Such cases enable detection of higher spatial frequency regions.

In the first exemplary embodiment, the threshold values $\epsilon 1$, $\epsilon 2$ are derived employing the threshold value derivation table 260; however there is no limitation thereto, and the threshold values $\epsilon 1$, $\epsilon 2$ may be derived employing an equation.

Moreover, in the first exemplary embodiment, explanation has been given of an example in which the differences d1, D are computed, however a ratio of pixel values may be computed instead of a difference.

Second Exemplary Embodiment

In the first exemplary embodiment, explanation has been given of an example in which the image region is identified using the difference d1 between the average pixel values of the normal pixels N1. In the second exemplary embodiment, explanation follows regarding a case in which an image region is identified using a change ratio in pixel values from plural normal pixels N1. The same reference numerals are appended to configuration in the following that is the same as in the first exemplary embodiment, and further explanation thereof is omitted.

Figure 32:
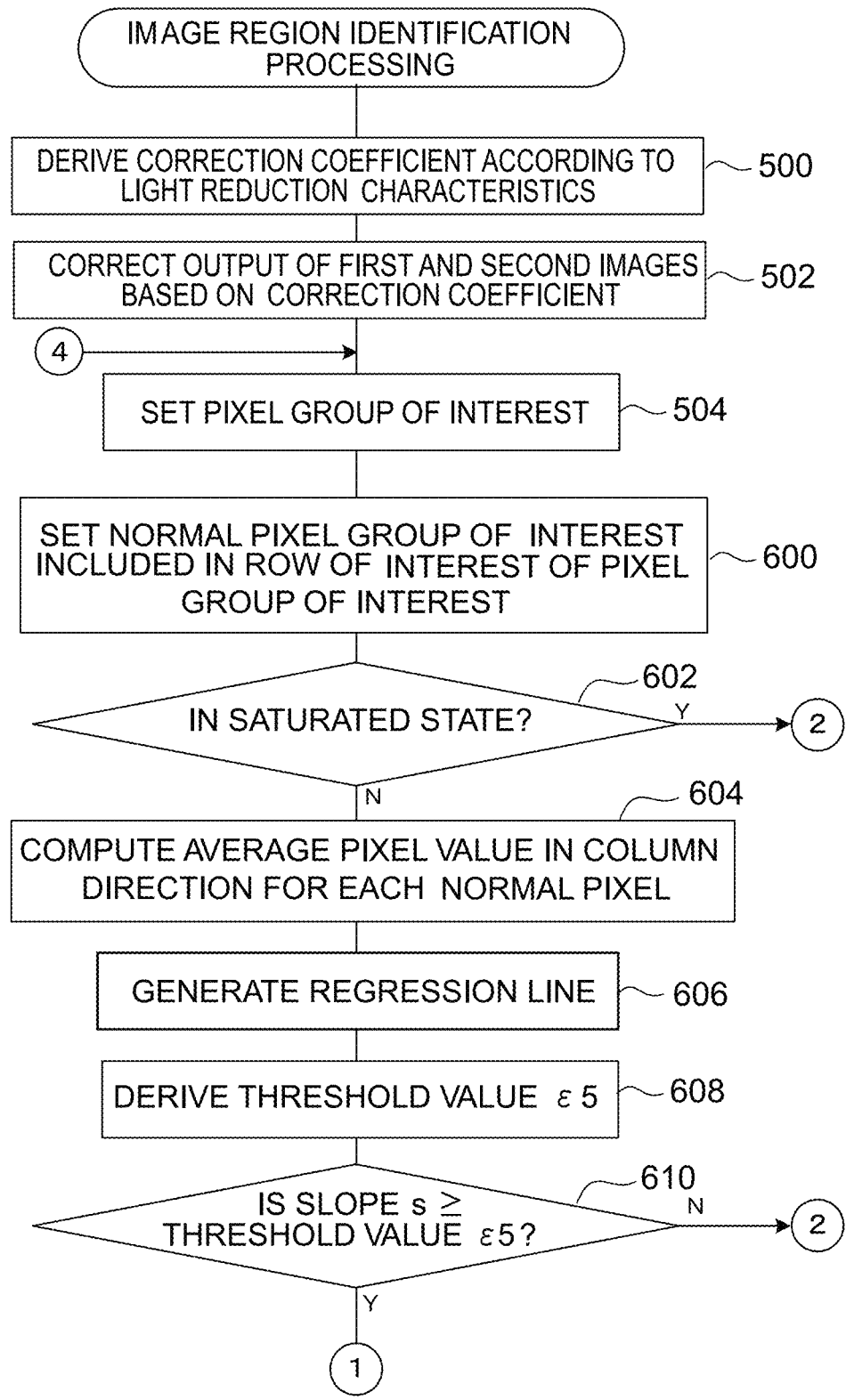
FIG. 32 is a flowchart illustrating an example of flow of image region identification processing according to a second exemplary embodiment.

An imaging device 100A according to the second exemplary embodiment illustrated in FIG. 1 to FIG. 3 differs from the imaging device 100 explained in the first exemplary embodiment in the point that the image processor 28 performs the image region identification processing illustrated in FIG. 32 instead of the image region identification processing illustrated in FIG. 17. The image region identification processing illustrated in FIG. 32 differs from the image region identification processing illustrated in FIG. 17 in the point that steps 600 to 610 are included instead of the steps 506 to 518.

Figure 33:
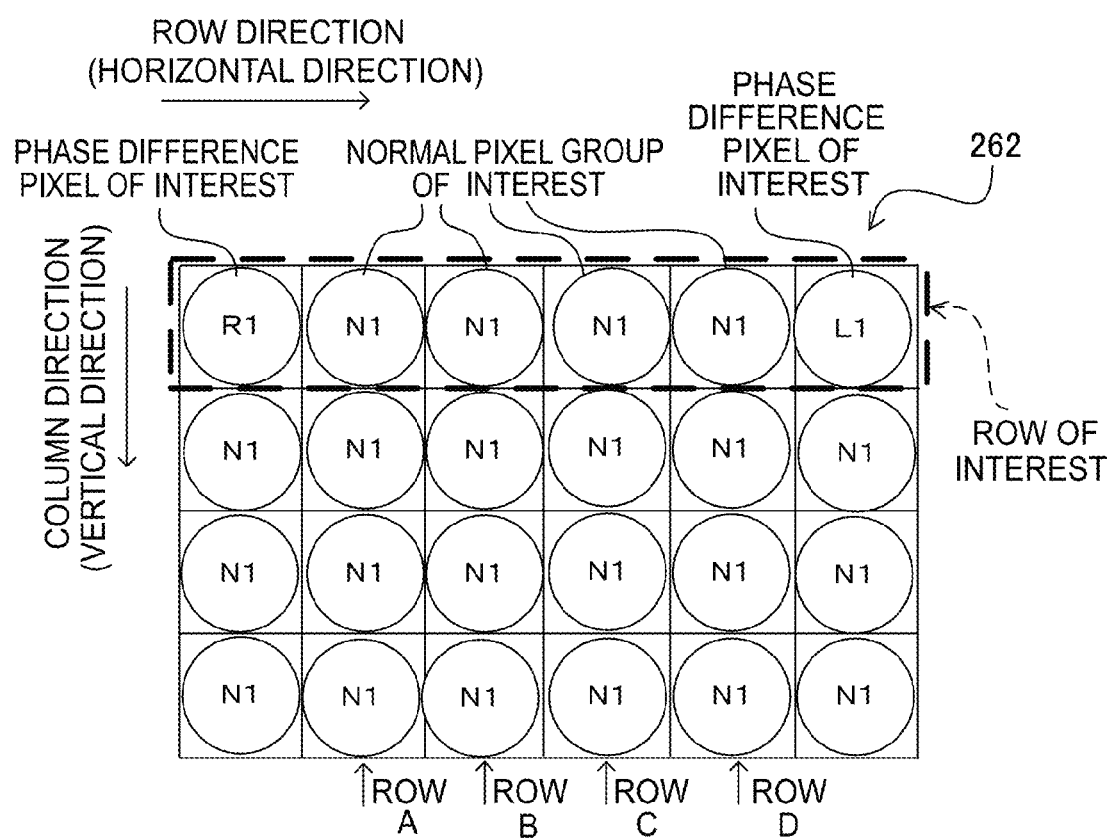
FIG. 33 is a schematic diagram illustrating an example of a configuration of a pixel group of interest set by image region identification processing according to the second exemplary embodiment.

In the image region identification processing illustrated in FIG. 32, at step 600, an identification section 28C sets a normal pixel group of interest included in a row of interest of a pixel group of interest 262 set at step 504, as illustrated as an example in FIG. 33. The normal pixels of interest according to the second exemplary embodiment include the normal pixels N1 that have not yet been subjected to the processing of steps 600 to 610 as described below, and indicates all of the normal pixels N1 included in the row of interest of the pixel group of interest 262 set at step 504.

At the next step 602, the identification section 28C determines whether or not output of any of the normal pixels N1 included in the normal pixel group of interest set at step 600 is in a saturated state. Affirmative determination is made at step 602 in cases in which the output of any of the normal pixels N1 included in the normal pixel group of interest set at step 600 is in a saturated state, and processing proceeds to step 536. Negative determination is made at step 602 in cases in which the output of none of the normal pixels N1 included in the normal pixel group of interest set at step 600 is in a saturated state, and processing proceeds to step 604.

At step 604, the identification section 28C computes an average pixel value in the column direction for each normal pixels N1 included in the normal pixel group of interest set at step 600. In the example illustrated in FIG. 33, the 4 normal pixels N1 included in the normal pixel group of interest respectively belong to a column A, a column B, a column C, and a column D, and so the average pixel values for each of the columns is computed. Namely, in the pixel group of interest 262, the average pixel value of the normal pixels N1 belonging to the column A, the average pixel value of the normal pixels N1 belonging to the column B, the average pixel value of the normal pixels N1 belonging to the column C, and the average pixel value of the normal pixels N1 belonging to the column D are computed.

At the next step 606, the identification section 28C generates a regression line for the average pixel values for each of the normal pixels N1 included in the normal pixel group of interest set at step 600 (the average pixel values computed at step 604), and then processing proceeds to step 608.

At step 608, a threshold value $\epsilon 5$ corresponding to the currently set F number is derived by the identification section 28C, and then processing proceeds to step 610. The threshold value $\epsilon 5$ is predetermined for each of the F numbers similarly to the threshold value $\epsilon 1$ explained in the first exemplary embodiment, and correspondence relationships to the F numbers are tabulated.

At step 610, the identification section 28C determines whether or not the slope s of the regression line generated at step 606 is the threshold value $\epsilon 5$ derived at step 608 or greater. Negative determination is made at step 610 in cases in which the slope s is less than the threshold value $\epsilon 5$ derived at step 608, and processing proceeds to step 536. Affirmative determination is made at step 610 in cases in which the slope s is the threshold value $\epsilon 5$ derived at step 608 or greater, and processing proceeds to step 520.

As explained above, in the imaging device 100A according to the second exemplary embodiment, the magnitude of the contrast is determined based on the change ratio in pixel values from plural normal pixels N1 disposed between the first pixel L1 and the second pixel R1. Thus the imaging device 100A according to the second exemplary embodiment is able to identify the image region satisfying the first condition with a higher precision than in cases lacking the present configuration.

In the imaging device 100A according to the second exemplary embodiment, the magnitude of the contrast is determined based on the change ratio in average pixel values for specific pixels worth (4 pixels worth in the example illustrated in FIG. 33) in the column direction for each of the plural normal pixels N1. The imaging device 100A of the second exemplary embodiment is thereby able to identify the image region satisfying the first condition with even higher precision.

Third Exemplary Embodiment

Explanation has been given in the first and second exemplary embodiments of examples in which the pixel placement pattern illustrated in FIG. 22 and FIG. 33 is employed in the image region identification processing. Explanation follows regarding the third exemplary embodiment of an example in which the image region identification processing employs the pixel placement pattern illustrated as an example in FIG. 34. The same reference numerals are appended to configuration in the following that is the same as in the first and second exemplary embodiments, and further explanation thereof is omitted.

An imaging device 100B according to the third exemplary embodiment illustrated in FIG. 1 to FIG. 3 differs from the imaging device 100 explained in the first exemplary embodiment in including an image pick-up device 20A instead of the image pick-up device 20. The image pick-up device 20A includes phase difference pixel rows 270 and normal pixel rows 272 as illustrated as an example in FIG. 34. The phase difference pixel rows 270 include first pixels L and second pixels R but do not include normal pixels N. The normal pixel rows 272 include normal pixels N but do not include phase difference pixels. The phase difference pixel rows 270 and the normal pixel rows 272 are disposed alternately along the column direction. The phase difference pixel rows 270 include first pixels L and second pixels R alternately disposed within the same row.

Figure 35:
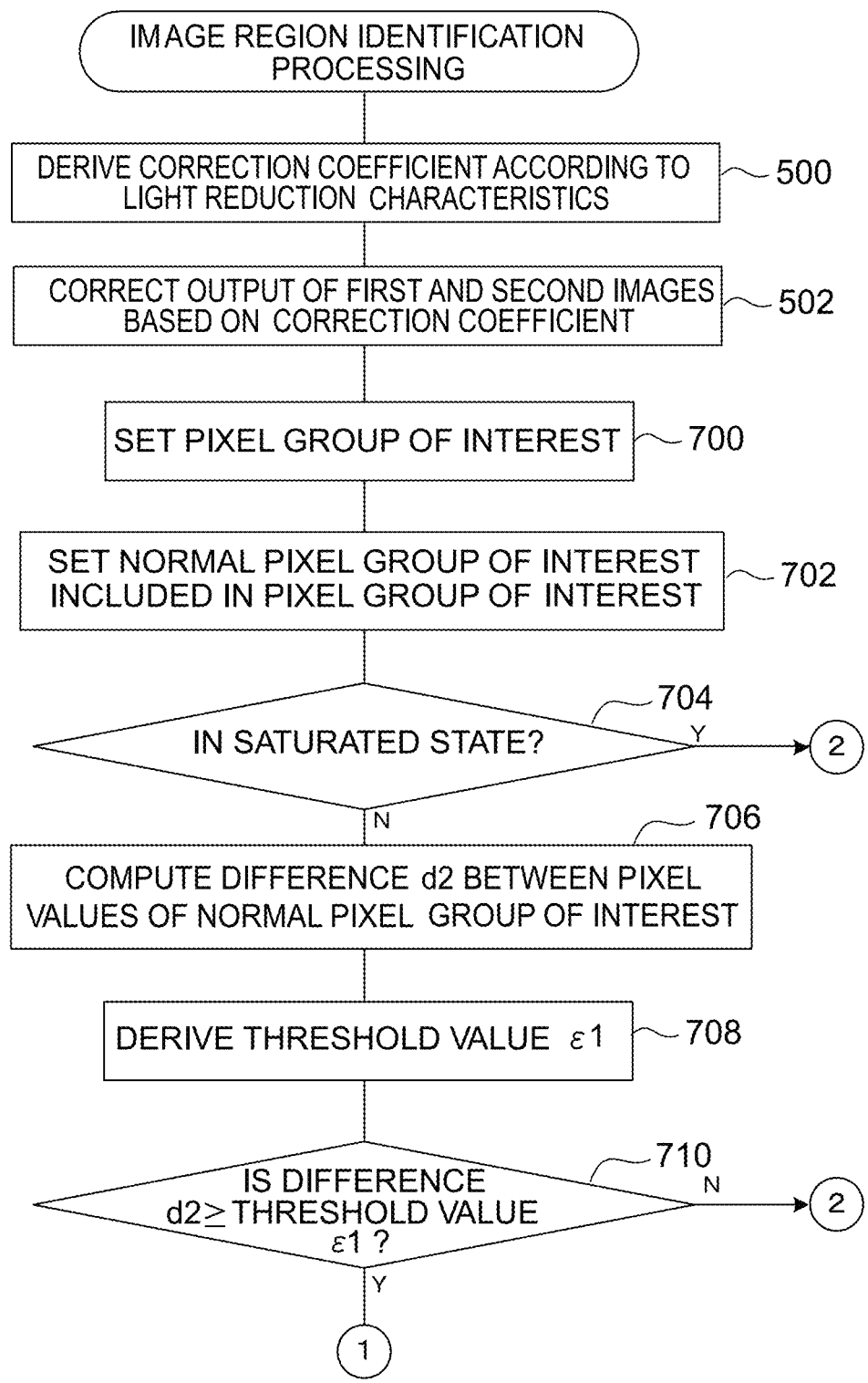
FIG. 35 is a flowchart illustrating an example of a flow of image region identification processing according to the third exemplary embodiment.

The imaging device 100B according to the third exemplary embodiment illustrated in FIG. 1 to FIG. 3 differs from the imaging device 100 explained in the first exemplary embodiment in that the image processor 28 performs the image region identification processing illustrated in FIG. 35 instead of the image region identification processing illustrated in FIG. 17. The image region identification processing illustrated in FIG. 35 differs from the image region identification processing illustrated in FIG. 17 in including step 700 to step 710 instead of the steps 504 to 518.

Figure 34:
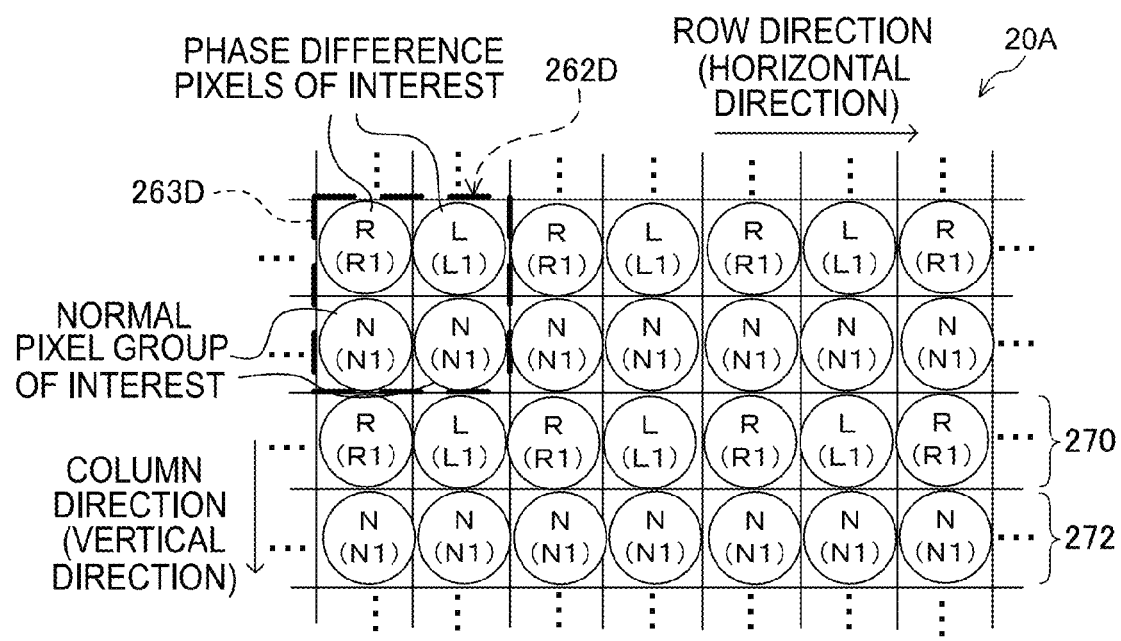
FIG. 34 is a schematic diagram illustrating an example of an image pick-up device included in an imaging device according to a third exemplary embodiment, and pixel placement in a processing target image.

In the image region identification processing illustrated in FIG. 35, at step 700, the identification section 28C sets a pixel group of interest 262D illustrated as an example in FIG. 34 from out of all the pixels included in the processing target image, then processing proceeds to step 702. The pixel group of interest 262D indicates, for example, a pixel group from out of all of the pixels included in the processing target image that has not yet been subject to the processing that follows. For example, in the third exemplary embodiment, the pixel group of interest 262D is determined by a pixel group of interest stipulation frame 263D as illustrated as an example in FIG. 34. The pixel group of interest stipulation frame 263D illustrated in FIG. 34 is a rectangular frame segmented into 2×2 division regions, and different phase difference pixels are positioned in the division regions at the top right corner and the top left corner facing the page, and normal pixels N are positioned in the remaining division regions. In the example illustrated in FIG. 34, a first pixel L1 is positioned in the division region at the top right corner facing the page, and a second pixel R1 is positioned in the division region at the top left corner facing the page.

At step 702, as illustrated as an example in FIG. 34, the identification section 28C sets a normal pixel group of interest included in the row of interest of the pixel group of interest 262D set at step 700 (a pair of normal pixels N1 included in the pixel group of interest 262D illustrated in the example of FIG. 34). The normal pixel group of interest here indicates a pair of normal pixels N1 that have not yet been subject to the processing that follows.

At the next step 704, the identification section 28C determines whether or not the output of any of the normal pixels N1 included in the normal pixel group of interest set at step 702 is in a saturated state. Affirmative determination is made at step 704 in cases in which the output of any of the normal pixels N1 included in the normal pixel group of interest set at step 702 is in a saturated state, and processing proceeds to step 536 illustrated in FIG. 18. Negative determination is made at step 704 in cases in which the output of none of the normal pixels N1 included in the normal pixel group of interest set at step 702 is in a saturated state, and processing proceeds to step 706.

At step 706, the identification section 28C computes a difference (for example an absolute difference value) d2 between pixel values of the pair of normal pixels N1 included in the normal pixel group of interest set at step 702, and processing then proceeds to step 708.

At step 708, a threshold value ϵ1 corresponding to the currently set F number is derived by the identification section 28C employing the threshold value derivation table 260 illustrated as an example in FIG. 10, and then processing proceeds to step 710.

At step 710, the identification section 28C determines whether or not the difference d2 computed at step 706 is the threshold value ϵ1 derived at step 708 or greater. Negative determination is made at step 710 in cases in which the difference d2 computed at step 706 is less than the threshold value ϵ1 derived at step 708, and processing proceeds to step 536 of FIG. 18. Affirmative determination is made at step 710 in cases in which the difference d2 computed at step 706 is the threshold value ϵ1 derived at step 708 or greater, and processing proceeds to step 520 of FIG. 18.

As explained above, in the imaging device 100B according to the third exemplary embodiment, the first pixels L1 and the second pixels R1 are disposed alternately and adjacently to each other in the row direction. Thus the imaging device 100B according to the third exemplary embodiment is capable of identifying an image region with an even higher spatial frequency as the identified image region than cases lacking the present configuration.

Figure 36:
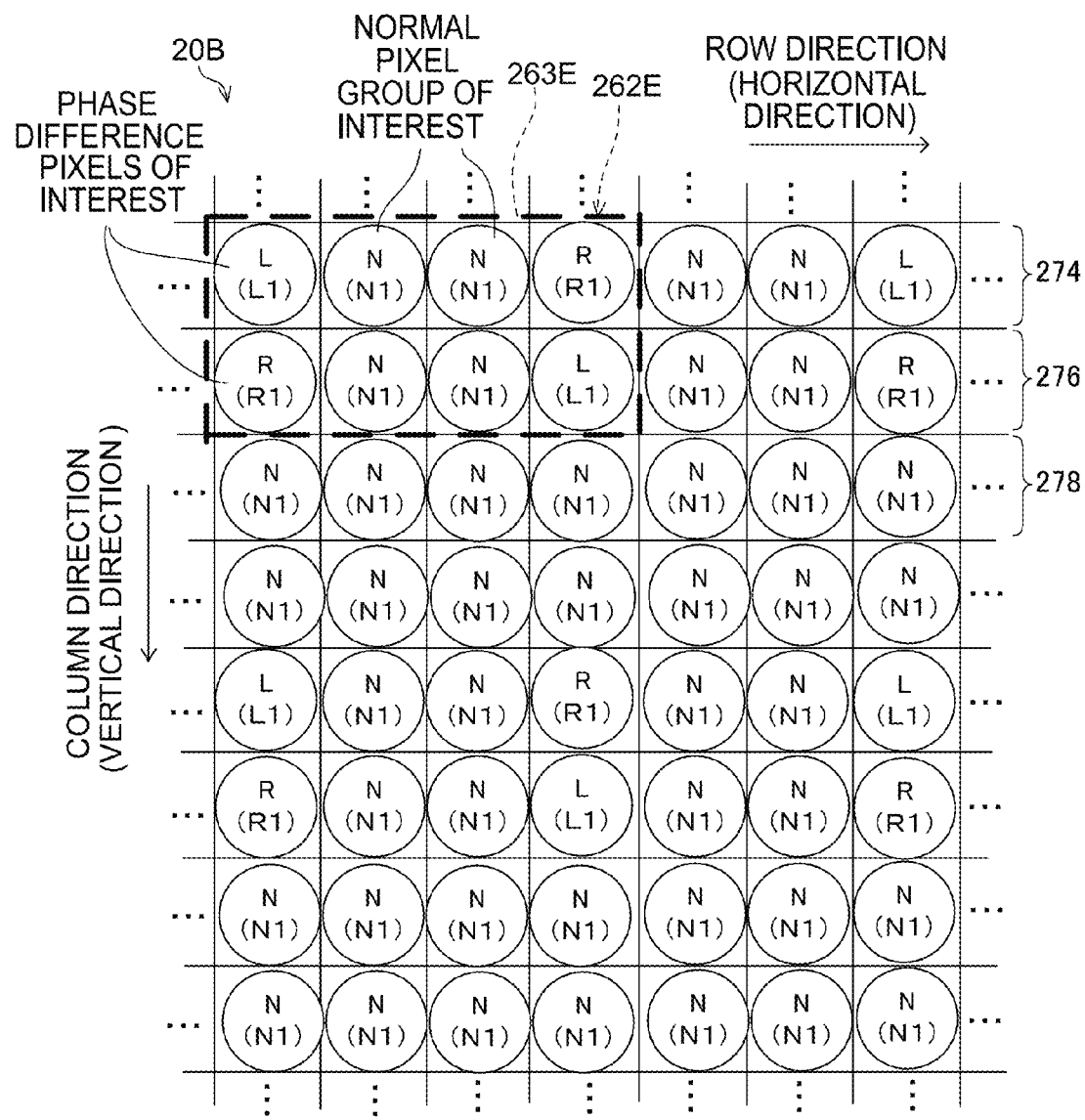
FIG. 36 is a schematic diagram illustrating a first modified example of an image pick-up device according to the third exemplary embodiment and a pixel group of interest set by image region identification processing.
Figure 37:
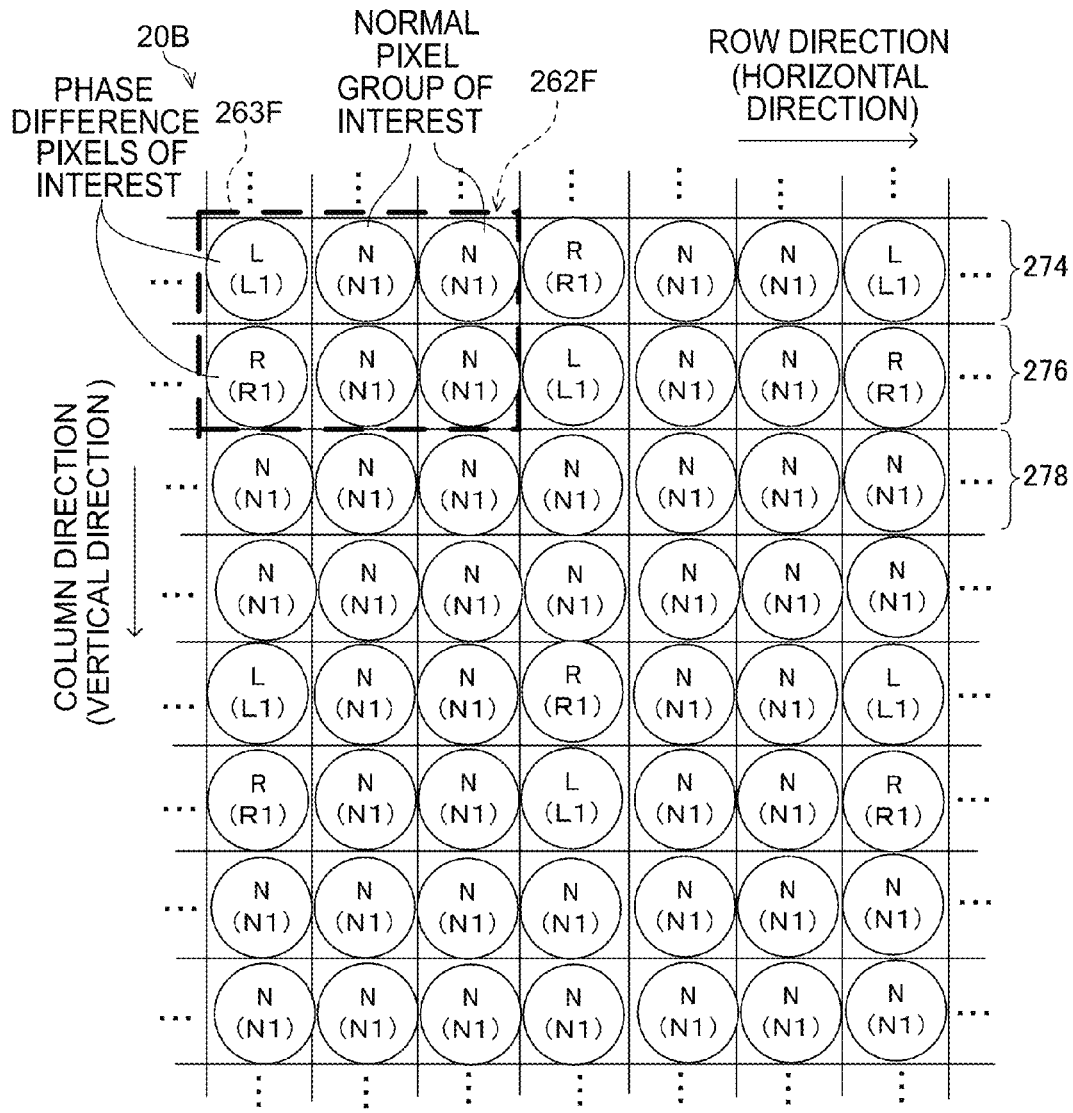
FIG. 37 is a schematic diagram illustrating a second modified example of an image pick-up device according to the third exemplary embodiment and a pixel group of interest set by image region identification processing.
Figure 38:
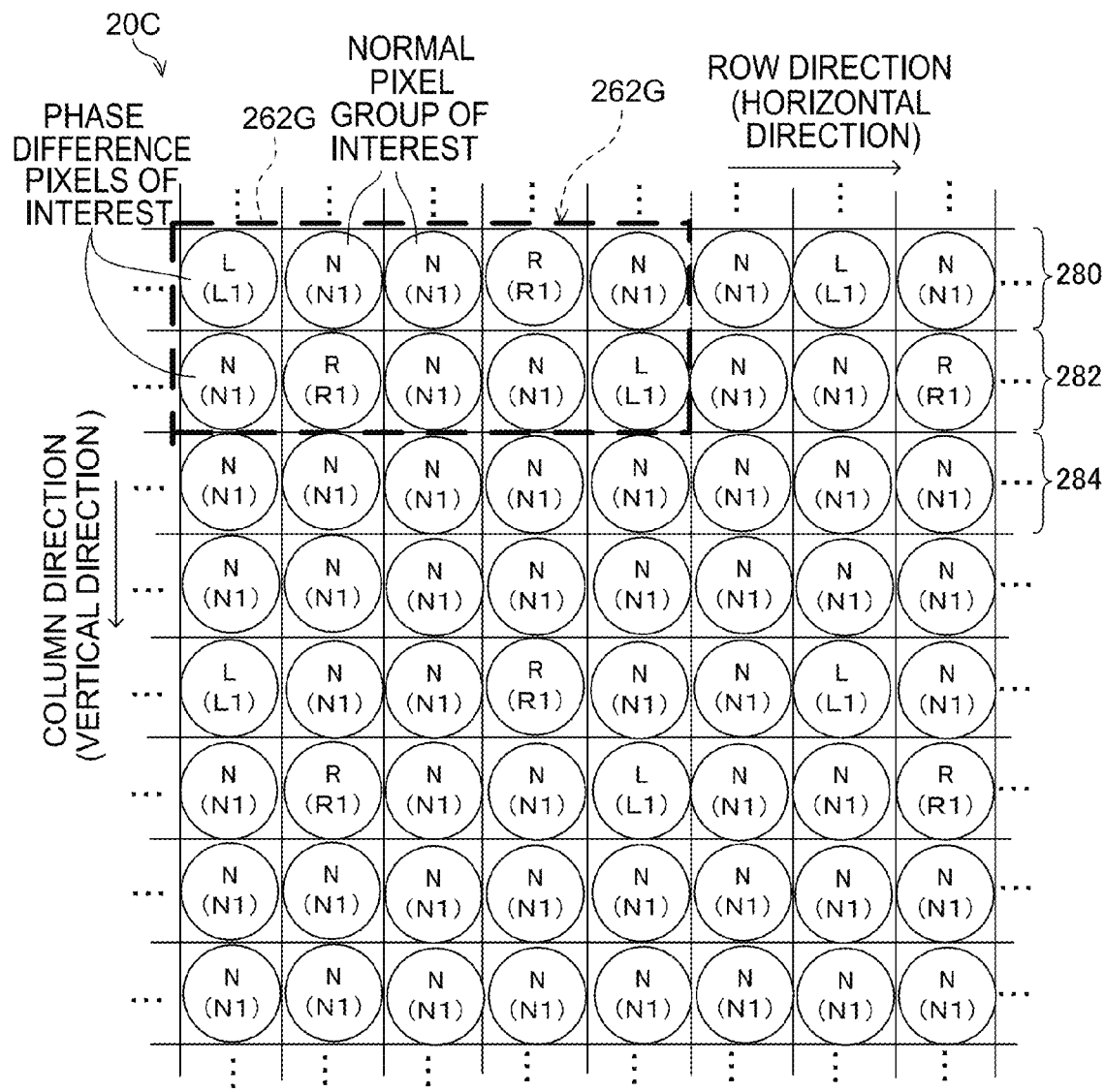
FIG. 38 is a schematic diagram illustrating a third modified example of an image pick-up device according to the third exemplary embodiment and a pixel group of interest set by image region identification processing.
Figure 39:
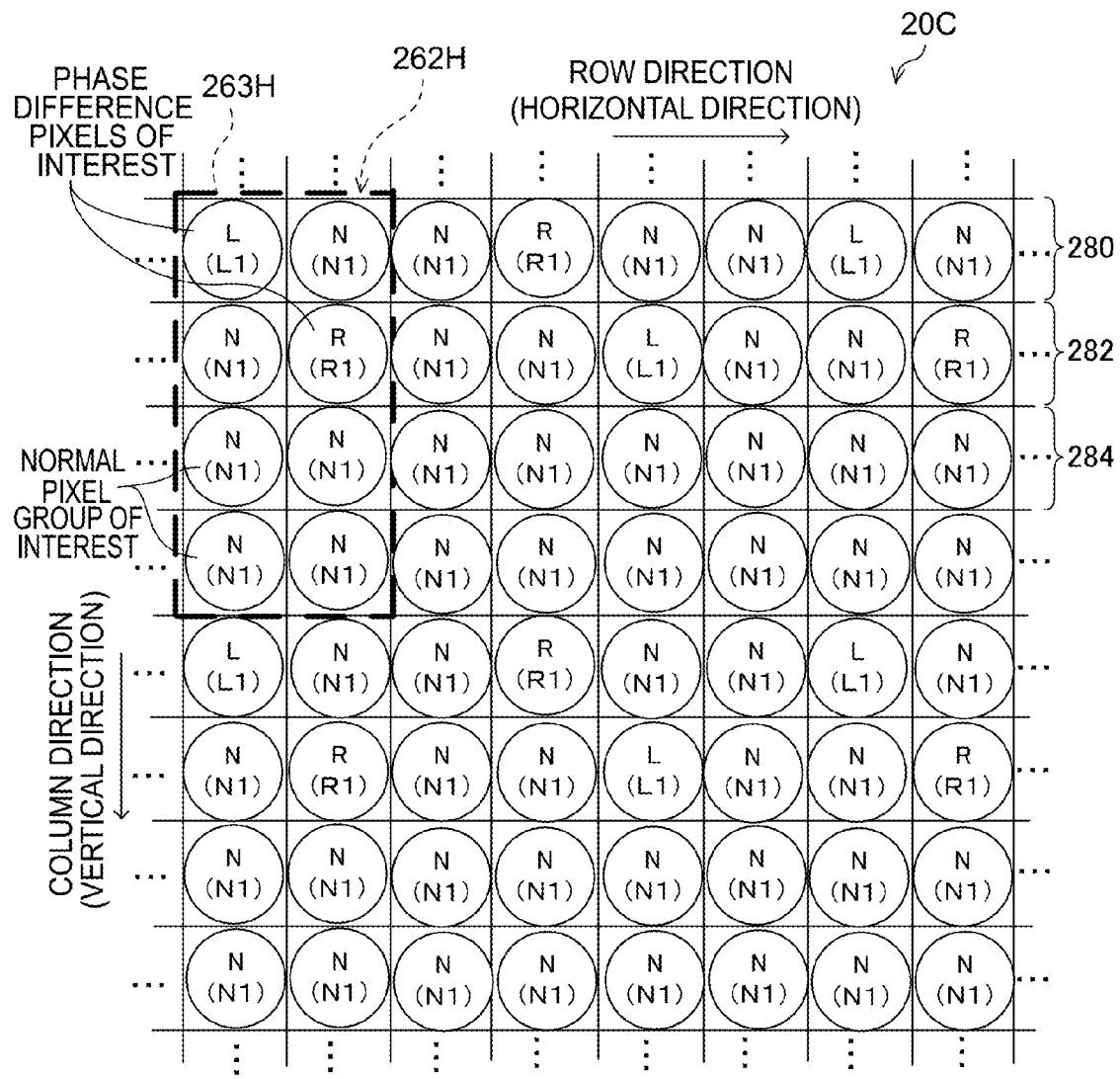
FIG. 39 is a schematic diagram illustrating a fourth modified example of an image pick-up device according to the third exemplary embodiment and a pixel group of interest set by image region identification processing.

An example has been given in the third exemplary embodiment in which the image pick-up device 20A includes the phase difference pixel rows 270 and the normal pixel rows 272; however, the present invention is not limited thereto, and, for example, an image pick-up device 20B illustrated in FIG. 36 and FIG. 37, or an image pick-up device 20C illustrated in FIG. 38 and FIG. 39, may be employed.

The image pick-up device 20B illustrated as an example in FIG. 36 and FIG. 37 includes first pixel rows 274, second pixel rows 276, and third pixel rows 278. The first pixel rows 274 and the second pixel rows 276 are adjacent to each other in the column direction, and are periodically disposed in the row direction with plural rows (2 rows in the example illustrated in FIG. 36 and FIG. 37) of the third pixel rows 278 interposed therebetween. The first pixel rows 274 include first pixels L and second pixels R alternately disposed within the same row, with plural normal pixels N (2 normal pixels N in the example illustrated in FIG. 36 and FIG. 37) disposed between the first pixels L and the second pixels R. The second pixel rows 276 include first pixels L and second pixels R alternately disposed within the same row, with the opposite placement sequence to that of the first pixel rows 274, with plural normal pixels N (2 normal pixels N in the example illustrated in FIG. 36 and FIG. 37) disposed between the first pixels L and the second pixels R. The first pixels L included in the first pixel rows 274 and the second pixels R included in the second pixel rows 276 are disposed within the same column as each other, and the second pixels R included in the first pixel rows 274 and the first pixels L included in the second pixel rows 276 are disposed within the same column as each other. The third pixel rows 278 include plural normal pixels N disposed adjacent to each other within the same row.

In cases in which the image pick-up device 20B is employed, at step 700 of the image region identification processing according to the third exemplary embodiment, a pixel group of interest 262E as illustrated as an example in FIG. 36, or a pixel group of interest 262F as illustrated as an example in FIG. 37, is set. The pixel group of interest 262E illustrated in FIG. 36 is stipulated by a pixel group of interest stipulation frame 263E. The pixel group of interest stipulation frame 263E is a rectangular frame segmented into 2×4 division regions, and first pixels L1 are positioned in each of the division regions at the top left corner and the bottom right corner facing the page, second pixels R1 are positioned in each of the division regions at the top right corner and the bottom left corner facing the page, and normal pixels N1 are positioned in the remaining division regions. In such cases, a pair of normal pixels N1 adjacent between the first pixel L1 at the top left corner facing the page and the second pixel R1 at the top right corner facing the page of the pixel group of interest 262E may, for example, be employed as a normal pixel group of interest. The first pixel L1 at the top left corner facing the page and the second pixel R1 at the bottom left corner facing the page of the pixel group of interest 262E may, for example, be employed as phase difference pixels of interest. However, there is no limitation thereto, and the second pixel R1 at the top right corner facing the page and the first pixel L1 at the bottom right corner facing the page of the pixel group of interest 262E may be employed as the phase difference pixels of interest.

The pixel group of interest 262F illustrated in FIG. 37 is stipulated by a pixel group of interest stipulation frame 263F. The pixel group of interest stipulation frame 263F is a rectangular frame segmented into 2×3 division regions, with a first pixel L1 positioned in the division region at the top left corner facing the page, a second pixel R1 positioned in the division region at the bottom left corner facing the page, and normal pixels N1 positioned in the remaining division regions. In such cases, the adjacent pair of normal pixels N1 in the same row as the first pixel L1 included in the pixel group of interest 262F may, for example, be employed as a normal pixel group of interest. The first pixel L1 and the second pixel R1 included in the pixel group of interest 262F may, for example, be employed as the phase difference pixels of interest.

The configuration illustrated in FIG. 36 and FIG. 37 enables an image region with an even higher spatial frequency to be identified than cases in which the first pixel L1 and the second pixel R1 disposed adjacent to each other in the row direction are employed as the phase difference pixels of interest.

The image pick-up device 20C illustrated as an example in FIG. 38 and FIG. 39 includes first pixel rows 280, second pixel rows 282, and third pixel rows 284. The first pixel rows 280 and the second pixel rows 282 are disposed adjacent to each other in the column direction, and plural rows (2 rows in the example illustrated in FIG. 38 and FIG. 39) of the third pixel rows 284 are periodically interposed therebetween in the column direction. The first pixel rows 280 include first pixels L and second pixels R alternately disposed within the same row, and plural normal pixels N (2 normal pixels N in the example illustrated in FIG. 38 and FIG. 39) are disposed between the first pixels L and the second pixels R. The second pixel rows 282 includes the first pixels L and the second pixels R alternately disposed within the same row in the reverse sequence to that of the first pixel rows 280, and plural normal pixels N (2 normal pixels N in the example illustrated in FIG. 38 and FIG. 39) are disposed between the first pixels L and the second pixels R. The first pixels L included in the first pixel rows 280 and the second pixels R included in the second pixel rows 282 are disposed at positions offset from each other by 1 pixel worth in the row direction. The second pixels R included in the first pixel rows 280 and the first pixels L included in the second pixel rows 282 are disposed at positions offset from each other by 1 pixel worth in the row direction. The third pixel rows 284 include plural adjacent normal pixels N disposed within the same row.

In cases in which the image pick-up device 20C is employed, at step 700 of the image region identification processing according to the third exemplary embodiment, a pixel group of interest 262G illustrated as an example in FIG. 38, or a pixel group of interest 262H illustrated as an example in FIG. 39, is set. The pixel group of interest 262G illustrated in FIG. 38 is stipulated by a pixel group of interest stipulation frame 263G. The pixel group of interest stipulation frame 263G is a rectangular frame segmented into 2×5 division regions, with a first pixel L1 of the first pixel row 280 positioned in the division region at the top left corner facing the page, and a first pixel L1 of the second pixel row 282 positioned in a division region at the bottom right corner facing the page. In such cases, a pair of adjacent normal pixels N1 between the first pixel L1 at the top left corner facing the page of the pixel group of interest 262G, and the second pixel R1 present within the same row as this first pixel L1 in the pixel group of interest 262G, may, for example, be employed as the normal pixel group of interest. The first pixel L1 at the top left corner facing the page of the pixel group of interest 262G, and the second pixel R1 diagonally adjacent to this first pixel L1 (the second pixel R1 of the second pixel rows 282 included in the pixel group of interest 262G) may, for example, be employed as the phase difference pixels of interest. There is no limitation thereto, and the first pixel L1 at the bottom right corner facing the page of the pixel group of interest 262G and the second pixel R1 diagonally adjacent to this first pixel L1 (the second pixel R1 of the first pixel rows 280 included in the pixel group of interest 262G) may be employed as the phase difference pixels.

The pixel group of interest 262H illustrated in FIG. 39 is stipulated by a pixel group of interest stipulation frame 263H. The pixel group of interest stipulation frame 263H is a rectangular frame segmented into 4×2 division regions, with a first pixel L1 of the first pixel row 280 positioned in the division region at the top left corner facing the page. In such cases, for example, the pair of normal pixels N1 corresponding to the pair of normal pixels N included in one row out of the two rows of third pixel rows 284 included in the pixel group of interest 262H may be employed as the normal pixel group of interest. The first pixel L1 at the top left corner facing the page of the pixel group of interest 262G, and the second pixel R1 diagonally adjacent to this pixel (the second pixel R1 corresponding to the second pixel R of the second pixel row 282 included in the pixel group of interest 262H) may, for example, be employed as the phase difference pixels of interest.

The configuration illustrated in FIG. 38 and FIG. 39 enables an image region with higher spatial frequency to be identified that cases in which a first pixel L1 and a second pixel R1 disposed plural pixels worth away from each other in the row direction are employed as the phase difference pixels of interest.

The pixel group of interest 262E illustrated in FIG. 36, and the pixel group of interest 262G illustrated in FIG. 38 also respectively include plural first pixels L1 and plural second pixels R1. In such cases, any combination may be made of the first pixels L1 and the second pixels R1 to employ as the phase difference pixels of interest.

Fourth Exemplary Embodiment

In each of the exemplary embodiments above, examples are given of the imaging device 100 (100A, 100B), however mobile terminal devices that are modified examples of the imaging device 100 (100A, 100B) include mobile phones and smartphones including a camera function. Other examples include personal digital assistants (PDAs) and mobile gaming machines. In the fourth exemplary embodiment, detailed explanation follows regarding an example of a smartphone, with reference to the drawings.

Figure 40:
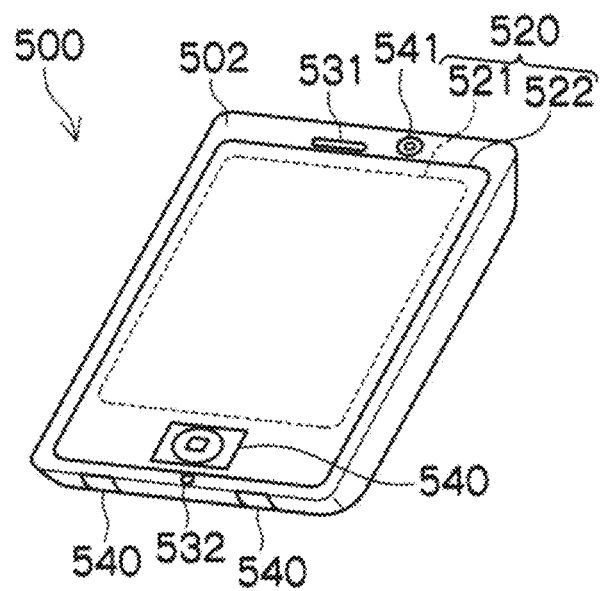
FIG. 40 is a perspective view illustrating an example of the external appearance of a smartphone according to a fourth exemplary embodiment.

FIG. 40 is a perspective view illustrating an example of the external appearance of a smartphone 500. The smartphone 500 illustrated in FIG. 40 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 41:
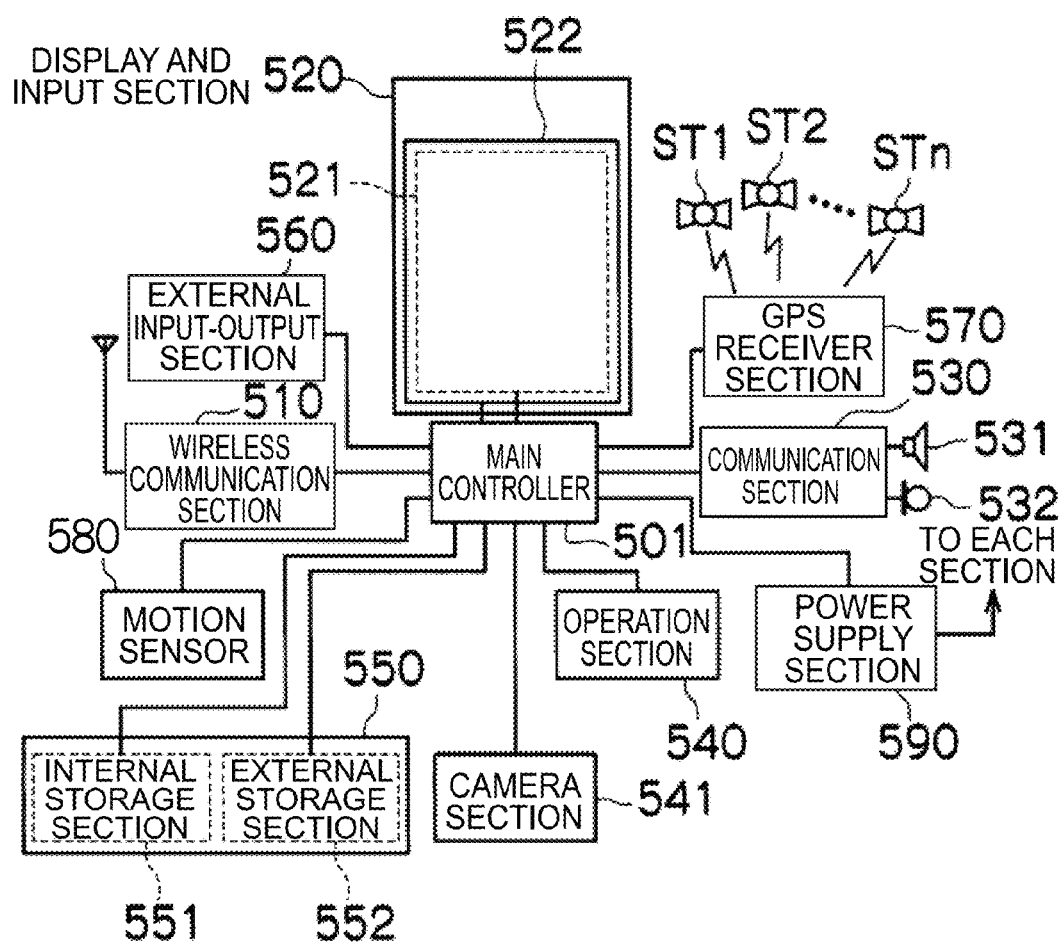
FIG. 41 is a block diagram illustrating an example of relevant configuration of an electrical system of a smartphone according to the fourth exemplary embodiment.

FIG. 41 is a block diagram illustrating an example of a configuration of the smartphone 500 illustrated in FIG. 40. As illustrated in FIG. 40, main configuration elements of the smartphone 500 include a wireless communication section 510, the display and input section 520, a communication section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 40, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily match each other. The operating panel 522 may include two sensitive regions, at the outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The communication section 530 includes the speaker 531 and the microphone 532. The communication section 530 converts the voice of the user input through the microphone 532 into voice data capable of being processed by the main controller 501, then outputs this to the main controller 501. The communication section 530 decodes voice data received by the wireless communication section 510 or by the external input-output section 560, and outputs the voice data from the speaker 531. As illustrated in FIG. 41, for example, the speaker 531 may be installed in the same face as the face at which the display and input section 520 is provided, and the microphone 532 may be installed in a side face of the casing 502.

The operation section 540 is a hard key that employs a key switch or the like, and is a section that receives instructions from a user. For example, as illustrated in FIG. 40, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include a universal serial bus (USB), and IEEE1394. Examples of networks include the internet, wireless LAN, BLUETOOTH (registered trademark), radio frequency identification (RFID), and infrared data association (IrDA, (registered trademark)) communication. Other examples of networks include ULTRA WIDEBAND (UWB, (registered trademark)), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, a wired/wirelessly connected personal computer, or earphones or the like may also be applied.

The external input-output section is capable of transmitting received data transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position of the smartphone 500 in latitude, longitude, and altitude. The GPS receiver section 570 is also capable of detecting the position by using positional data when it is possible to acquire positional data from the wireless communication section 510 or the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (omitted from illustration in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540 and the operating panel 522.

By executing display control the main controller 501 displays icons to startup application software, and soft keys such as scroll bars, or displays windows to generate emails. Scroll bars are soft keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). The main controller 501 also includes a touch panel control function to receive the determination result, and to control the sensitive region of the operating panel 522, and the display position of the soft key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 etc.

The camera section 541 is capable of switching between a manual focus mode and an automatic focus mode. When the manual focus mode has been selected, focusing of the imaging lens of the camera section 541 can be performed by operating the operation section 540 or a focus icon button or the like displayed on the display and input section 520.

Moreover, during manual focus mode, a live-view image synthesized with a split-image is displayed on the display panel 521, thereby enabling the focus state to be verified during manual focus. The HYBRID FINDER 220 illustrated in FIG. 12 may be provided to the smartphone 500.

Under control of the main controller 501, rhe camera section 541 converts image data obtained by image capture into, for example, compressed image data, such as image data compressed by joint photographic coding experts group (JPEG). Then the image data obtained by conversion can be stored in the storage section 550, and output through the input-output section 560 and the wireless communication section 510. In the smartphone 500 illustrated in FIG. 40, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 with image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the current usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the input-output section 560 and the wireless communication section 510. Reference here to "various data" is, for example, positional data acquired by the GPS receiver section 570, and voice data acquired by the microphone 532 (which may be speech converted to text data arising from speed to text conversion performed by the main controller or the like), for adding to image data of still images or video images. It may moreover be orientation data acquired by the motion sensor 580, and so on.

Moreover, although each of the above exemplary embodiments an example has been given in which the split-images are divided in two in the up-down direction, there is no limitation thereto, and a split-image configuration may be applied of an image divided into plural divisions along the left-right direction or a diagonal direction.

Figure 42:
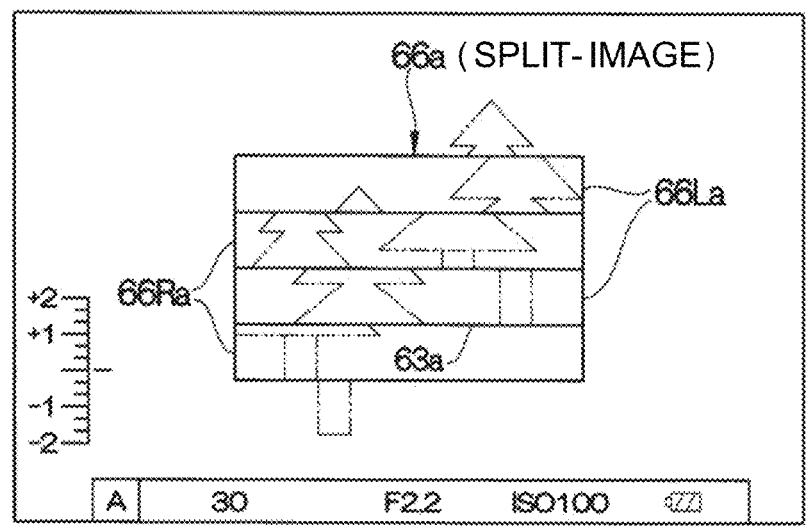
FIG. 42 is a schematic diagram illustrating a modified example of a split-image according to the first to the fourth exemplary embodiments, and is an example of a split-image formed by splitting a first image and a second image into odd lines and even lines and placing the lines alternately in a row.

A split-image 66a illustrated in the example in FIG. 42 is divided into odd numbered lines and even numbered lines by plural dividing lines 63a parallel to the row direction. In the split-image 66a, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 43:
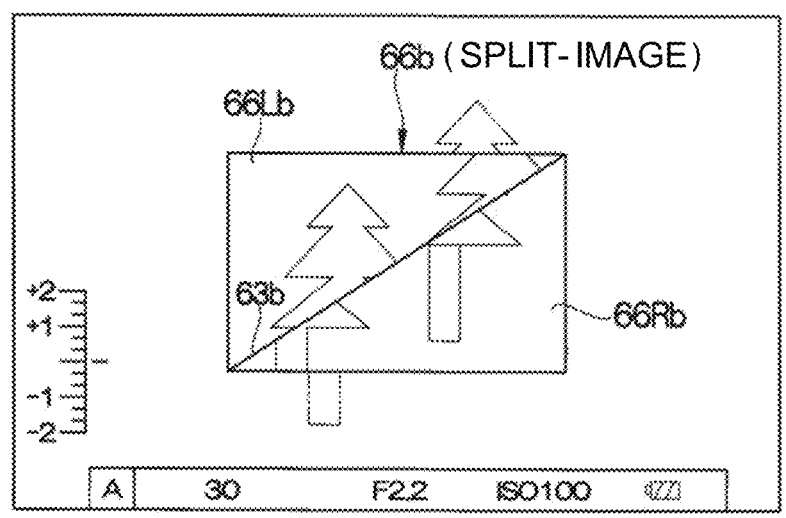
FIG. 43 is a schematic diagram illustrating a modified example of a split-image according to the first to the fourth exemplary embodiments, and is an example of a split-image divided along a sloping dividing line inclined with respect to a row direction.

A split-image 66b illustrated in FIG. 43 is divided into two by a dividing line 63b angled so as to slope with respect to the row direction (for example a diagonal line of the split-image 66b). In the split-image 66b, a phase difference image 66Lb generated based on the output signal output from the first pixel group is displayed in one region. A phase difference image 66Rb generated based on the output signal output from the second pixel group is displayed in the other region.

Figure 44A:
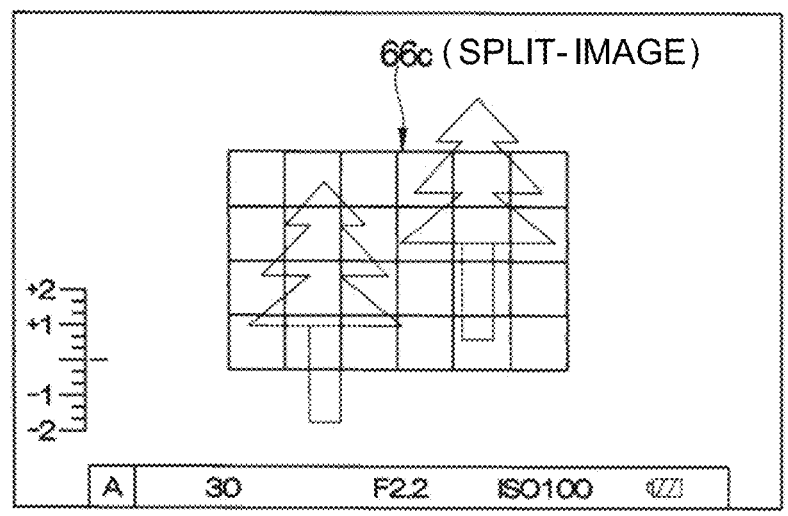
FIG. 44A is a schematic diagram illustrating a modified example of a split-image according to the first to the fourth exemplary embodiments, and is an example of a split-image divided by lattice shaped dividing lines.
Figure 44B:
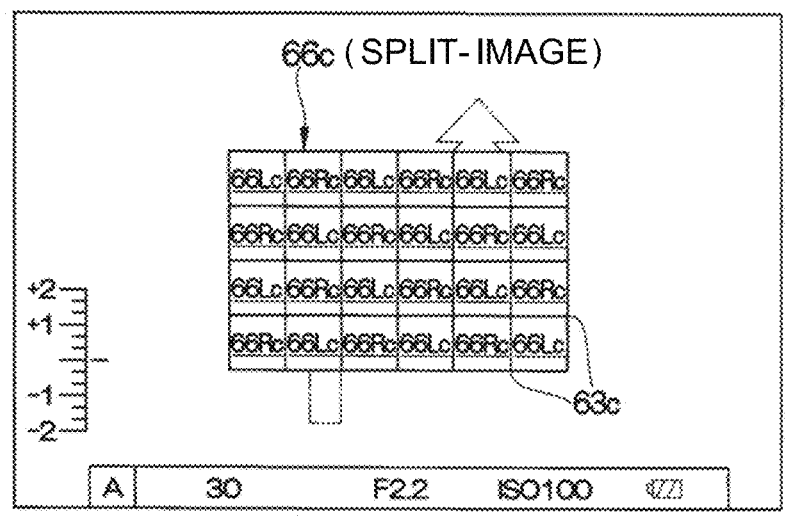
FIG. 44B is a schematic diagram illustrating a modified example of a split-image according to the first to the fourth exemplary embodiments, and is an example of a split-image formed in a chess-board pattern.

A split-image 66c illustrated in FIG. 44A and FIG. 44B is divided by lattice shaped dividing lines 63c parallel to the row direction and column direction, respectively. In the split-image 66c, a phase difference image 66Lc generated based on the output signals output from the first pixel group is displayed arranged in a chess board pattern (checker pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and to display as a clear image when in a focused state.

In each of the above exemplary embodiments, an example is given in which the image pick-up device 20 (20A) includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the above exemplary embodiments, examples have been given in which both the normal image and the split-image are displayed at the same time on the same screen of a display device when the first to the third images are input to the image processor 28, however the present invention is not limited thereto. For example, the display controller 36 may control so as to inhibit continuous display of the normal image as a video image on the display device, and to continuously display the split-image as a video image on the display device. Reference here to "inhibit . . . display of the normal image" means, for example, that the normal image is not displayed on the display device. More specifically, is means not displaying the normal image on the display device by not outputting the normal image to the display device even though the normal image is generated, and also not displaying the normal image on the display device by not generating the normal image. The split-image may also be displayed on the display device by using the whole of the screen, or the split-image may be displayed by using the whole of a split-image display region as illustrated as an example in FIG. 13. Reference here to "split-image" is, in cases in which a specific image pick-up device is employed, for example a split-image based on images output from phase difference pixel groups (for example the first image output from the first pixel group and the second image output from the second pixel group). An example of "cases in which a specific image pick-up device is employed" is a case in which an image pick-up device is employed that is configured by only phase difference pixel groups (for example the first pixel group and the second pixel group). Another example is a case in which an image pick-up device is employed that has phase difference pixels (for example the first pixel group and the second pixel group) arranged at a specific proportion with respect to the normal pixels.

Moreover, there are various conceivable conditions as conditions to inhibit display of the normal image and to display the split-image. For example, the display controller 36 may perform control to display the split-image without displaying the normal image on the display device in cases in which a normal image display instruction is cancelled in a state in which display of a split-image is being instructed. Moreover, for example, the display controller 36 may perform control to display the split-image without displaying the normal image on the display device in cases in which a photographer is looking into the HYBRID FINDER. Moreover, for example, the display controller 36 may perform control to display the split-image without displaying the normal image on the display device in cases in which the release button 211 is in a half pressed state. Moreover, for example, the display controller 36 may perform control to display the split-image without displaying the normal image on the display device in cases in which press operation of the release button 211 is not being performed. Moreover, for example, the display controller 36 may perform control to display the split-image without displaying the normal image on the display device in cases in which a face detection function has been activated to detect faces in an imaging-subject. A modified example has been given here in which the display controller 36 inhibits display of the normal image, however there is no limitation thereto, and, for example, the display controller 36 may perform control so as to display the split-image as over-write display on the full screen of the normal image.

The imaging device 100 (100A, 100B) explained in each of the above exemplary embodiments may have a function to confirm the depth of field (depth of field confirmation function). In such cases, for example, the imaging device 100 includes a depth of field confirmation key. The depth of field confirmation key may be a hard key or may be a soft key. In cases in which instruction is by a hard key, preferably, for example, a momentary operation switch (non-hold switch) is applied. Reference here to a momentary operation switch denotes, for example, a switch that maintains a specific operation state of the imaging device 100 only while pressed to a specific position. A depth of field confirmation key changes the aperture number on pressing. While continuous pressing is being performed on the depth of field confirmation key (while being pressed to the specific position), the aperture number continues to change until a limit aperture number is reached. Thus due to the aperture number changing while the depth of field confirmation key is being pressed, the phase difference required to obtain a split-image is sometimes not obtainable. Thus configuration may be made such that when the depth of field confirmation key has been pressed in a state in which a split-image is being displayed, during pressing the split-image changes to a normal live-view display. Moreover, configuration may be made such that CPU performs processing to switch the screen image so as to display the split-image again when the pressed state has been released. Explanation has been given of cases in which a momentary operation switch is applied as an example of the depth of field confirmation key, however there is no limitation thereto, and an alternating operation switch (hold switch) may be applied.

The flows of the image output processing (see FIG. 16) and image region identification processing (see FIG. 17, FIG. 18, FIG. 32, and FIG. 35) explained in each of the above exemplary embodiments are merely examples thereof. Accordingly, it goes without saying that steps not required may be eliminated, new steps may be added, and the processing sequence may be rearranged within a range not departing from the spirit. Each type of processing included in the image output processing and image region identification processing explained for each of the above exemplary embodiments may be realized by a software configuration utilizing a computer by executing a program, or may be realized by a hardware configuration. Implementation may also be made with a combination of a hardware configuration and a software configuration.

Note that in the image output processing and the image region identification processing explained in each of the above exemplary embodiments, in cases in which implementation is by executing a program with a computer, the program may be pre-stored in a specific storage region (for example the memory 26). Initial storage in the memory 26 is not always necessary. For example, a program may first be stored on a freely selectable "portable storage medium" such as a Solid State Drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. An image processing device comprising:
an image pick-up device including first and second pixel groups outputting first and second image signals due to respective images being formed by a pupil-divided subject-image that has passed through first and second regions of an imaging lens;
a generation section that generates a first display image based on an image signal output from the image pick-up device, and generates a second display image for use in focus verification based on the first and second image signals;
an identification section that identifies an image region in the second display image satisfying both a first condition of a magnitude of contrast being a first specific value or greater, and a second condition of a degree of matching between the first image signal and the second image signal being a second specific value or greater;
a display section that displays images; and
a display controller that performs control to display the first display image on the display section, to display the second display image within a display region of the first display image, and to display the image region identified by the identification section so as to be distinguishable from other regions in the second display image.

2. An image processing device comprising:
an image pick-up device including first and second pixel groups outputting first and second image signals due to respective images being formed by a pupil-divided subject-image that has passed through first and second regions of an imaging lens;
a generation section that generates a first display image based on an image signal output from the image pick-up device, and generates a second display image for use in focus verification based on the first and second image signals;
an identification section that identifies an image region in the second display image satisfying both a first condition of a magnitude of contrast being a first specific value or greater, and a second condition of a degree of matching between the first image signal and the second image signal being a second specific value or greater;
a display section that displays images; and
a display controller that performs control to display the second display image on the display section, and to display the image region identified by the identification section so as to be distinguishable from other regions in the second display image.

3. The image processing device of claim 1, wherein:
the image pick-up device further includes a third pixel group, on which an image of a subject-image that has passed through the imaging lens is formed without being pupil-divided,
and that outputs a third image signal; and
the generation section generates the first display image based on the third image signal.

4. The image processing device of claim 3, wherein the magnitude of contrast is determined based on the third image signal.

5. The image processing device of claim 4, wherein:
the first pixel group includes a plurality of first pixels disposed in a pupil division direction and a direction orthogonal to the pupil division direction;
the second pixel group includes a plurality of second pixels respectively disposed in alternation with the plurality of first pixels in at least the pupil division direction from among the pupil division direction and the orthogonal direction;
the third pixel group includes third pixels disposed in between the first pixels and the second pixels in at least the pupil division direction from among the pupil division direction and the orthogonal direction; and
the magnitude of contrast is determined based on a signal level of the third pixels.

6. The image processing device of claim 5, wherein the magnitude of contrast is determined based on an average signal level of a specific number of pixels of the third pixels in the orthogonal direction.

7. The image processing device of claim 4, wherein:
the first pixel group includes a plurality of first pixels that are disposed in a pupil division direction and a direction orthogonal to the pupil division direction;
the second pixel group includes a plurality of second pixels respectively disposed in alternation with the plurality of first pixels in at least the pupil division direction from among the pupil division direction and the orthogonal direction;
the third pixel group includes a plurality of third pixels that are disposed between the first pixels and the second pixels in at least the pupil division direction from among the pupil division direction and the orthogonal direction; and the magnitude of contrast is determined based on a change ratio in signal level of the plurality of third pixels disposed between the first pixels and the second pixels in the pupil division direction.

8. The image processing device of claim 7, wherein the magnitude of contrast is determined based on the change ratio in average signal level of a specific number of pixels in the orthogonal direction for each of the plurality of third pixels.

9. The image processing device of claim 4, wherein the magnitude of contrast is determined based on the third image signal from pixels in the third pixel group with a signal level in a non-saturated state from out of the third image signal.

10. The image processing device of claim 1, wherein:
the first pixel group includes a plurality of first pixels disposed in a pupil division direction and a direction orthogonal to the pupil division direction; and
the second pixel group includes a plurality of second pixels that are respectively disposed adjacently in alternation with the plurality of first pixels in at least the pupil division direction from among the pupil division direction and the orthogonal direction.

11. The image processing device of claim 1, further comprising:
a correction section that derives a correction coefficient according to light reduction characteristics based on light incident through the first region of pixels in a pupil division direction of the first pixel group, and light incident through the second region of pixels in the pupil division direction of the second pixel group, and corrects the first and second image signals based on the derived correction coefficient;
wherein the second condition is a condition of a degree of matching between the first image signal and the second image signal respectively corrected by the correction section being the second specific value or greater.

12. The image processing device of claim 1, wherein the identification section identifies the image region satisfying the second condition based on a separation in a pupil division direction between pixels identified respectively in the first and second image signals as having maximum values of signal level.

13. The image processing device of claim 12, wherein the identification section estimates the separation based on respective derivative values of the first and second image signals, and identifies the image region satisfying the second condition based on the estimated separation.

14. The image processing device of claim 1, wherein at least one of the first specific value or the second specific value is determined based on an aperture value.

15. An imaging device comprising:
the image processing device of claim 1;
an image pick-up device including the first and second pixel groups; and
a storage section that stores images generated based on image signals output from the image pick-up device.

16. An image processing method comprising:
generating a first display image based on an image signal output from an image pick-up device including first and second pixel groups outputting first and second image signals due to respective images being formed by a pupil-divided subject-image that has passed through first and second regions of an imaging lens, and generating a second display image for use in focus verification based on the first and second image signals;

identifying an image region in the second display image satisfying both a first condition of a magnitude of contrast being a first specific value or greater, and a second condition of a degree of matching between the first image signal and the second image signal being a second specific value or greater; and performing control to display the first display image on a display section that displays images, to display the second display image within a display region of the first display image, and to display the image region identified by the identification section so as to be distinguishable from other regions in the second display image.

17. An image processing method comprising:

generating a first display image based on an image signal output from an image pick-up device including first and second pixel groups outputting first and second image signals due to respective images being formed by a pupil-divided subject-image that has passed through first and second regions of an imaging lens, and generating a second display image for use in focus verification based on the first and second image signals;

identifying an image region in the second display image satisfying both a first condition of a magnitude of contrast being a first specific value or greater, and a second condition of a degree of matching between the first image signal and the second image signal being a second specific value or greater; and performing control to display the second display image on a display section that displays images, and to display the image region identified by the identification section so as to be distinguishable from other regions in the second display image.

18. A non-transitory computer-readable storage medium storing a program for causing a computer to function as the generation section, the identification section, and the display control section of the image processing device of claim 1.

* * * * *